United States Patent 
Zhang et al.

(10) Patent No.: US 12,429,994 B2
(45) Date of Patent: Sep. 30, 2025

(54) INTERACTION METHOD FOR ELECTRONIC DEVICE AND ELECTRONIC DEVICE

(71) Applicant: HUAWEI TECHNOLOGIES CO., LTD., Shenzhen (CN)

(72) Inventors: Yanan Zhang, Shenzhen (CN); Yuzhuo Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/063,506

(22) Filed: Dec. 8, 2022

(65) Prior Publication Data

US 2023/0168784 A1    Jun. 1, 2023

Related U.S. Application Data

(63) Continuation of application No. PCT/CN2021/098165, filed on Jun. 3, 2021.

(30) Foreign Application Priority Data

Jun. 9, 2020   (CN) .......................... 202010526697.1

(51) Int. Cl.
*G06F 3/0481* (2022.01)
*G06F 3/0488* (2022.01)

(52) U.S. Cl.
CPC .......... *G06F 3/0481* (2013.01); *G06F 3/0488* (2013.01)

(58) Field of Classification Search
CPC .............................. G06F 3/0481; G06F 3/0488
See application file for complete search history.

(56) References Cited

U.S. PATENT DOCUMENTS

2012/0194976 A1   8/2012   Golko et al.
2013/0063389 A1   3/2013   Moore
(Continued)

FOREIGN PATENT DOCUMENTS

CN     103500079 A     1/2014
CN     103973877 A     8/2014
(Continued)

OTHER PUBLICATIONS

EP/21822165, Office Action, Oct. 18, 2023.

*Primary Examiner* — William L Bashore
*Assistant Examiner* — Gregory A Distefano
(74) *Attorney, Agent, or Firm* — Leydig, Voit & Mayer, Ltd.

(57) ABSTRACT

Disclosed are an interaction method for an electronic device and an electronic device. After receiving a touch instruction, the electronic device parses a touch manner and a to-be-operated object that correspond to the touch instruction. The touch manner includes at least one type, and each type of touch manner includes a plurality of touch operations. Based on an amplitude of each touch operation, content carried by the to-be-operated object is successively and correspondingly displayed at an upper layer of an operation interface currently browsed by a user. When the user views the content in the to-be-operated object, jumping between the operation interface currently browsed by the user and an app corresponding to the to-be-operated object is avoided, CPU resource occupation of the electronic device due to an application jumping process is avoided, and freezing of the electronic device is also avoided, thereby improving user experience.

20 Claims, 47 Drawing Sheets

(56) References Cited

U.S. PATENT DOCUMENTS

| | | | | |
|---|---|---|---|---|
| 2013/0145303 | A1* | 6/2013 | Prakash | G06F 3/04847 |
| | | | | 715/779 |
| 2013/0346918 | A1 | 12/2013 | Shiplacoff et al. | |
| 2014/0370938 | A1* | 12/2014 | Lee | H04M 1/0266 |
| | | | | 455/566 |
| 2016/0006679 | A1* | 1/2016 | Williams | H04W 4/14 |
| | | | | 455/466 |
| 2016/0070466 | A1* | 3/2016 | Chaudhri | G06F 3/04883 |
| | | | | 715/765 |
| 2016/0260414 | A1* | 9/2016 | Yang | G06F 3/0488 |
| 2016/0306800 | A1* | 10/2016 | Son | G06F 16/86 |
| 2016/0308794 | A1* | 10/2016 | Kim | H04L 51/02 |
| 2017/0124064 | A1* | 5/2017 | Lu | G06Q 10/107 |
| 2017/0329472 | A1* | 11/2017 | Kim | G06F 3/04883 |
| 2018/0183921 | A1* | 6/2018 | Choi | G06F 3/04817 |
| 2019/0342252 | A1* | 11/2019 | Dascola | G06F 3/016 |

FOREIGN PATENT DOCUMENTS

| | | |
|---|---|---|
| CN | 105677167 A | 6/2016 |
| CN | 106250144 A | 12/2016 |
| CN | 106547439 A | 3/2017 |
| CN | 106569679 A | 4/2017 |
| CN | 106598464 A | 4/2017 |
| CN | 107123418 A | 9/2017 |
| CN | 107526509 A | 12/2017 |
| CN | 109857293 A | 6/2019 |
| CN | 110192211 A | 8/2019 |
| CN | 111124587 A | 5/2020 |
| WO | 2017193515 A1 | 11/2017 |
| WO | 2019072178 A1 | 4/2019 |

\* cited by examiner

Xiaodoumiao · 8:27

City Square Social Health Center, Second People's Hospital, XX District
Dear Yaya, the 23-valent pneumonia polysaccharide vaccine that you have reserved...

8:27

Weibo   QQ   Browser   Books

Videos  Taobao  Settings  WeChat

It is well known that, for a large company, it is difficult for hundreds of thousands of employees to gather together. However, A is a great help XXXXXXXXXXXXXXXXXXXXXXXXX A was troubled because the employees worked too hard XXXXXXXXXXXXXXXXXXXXXX

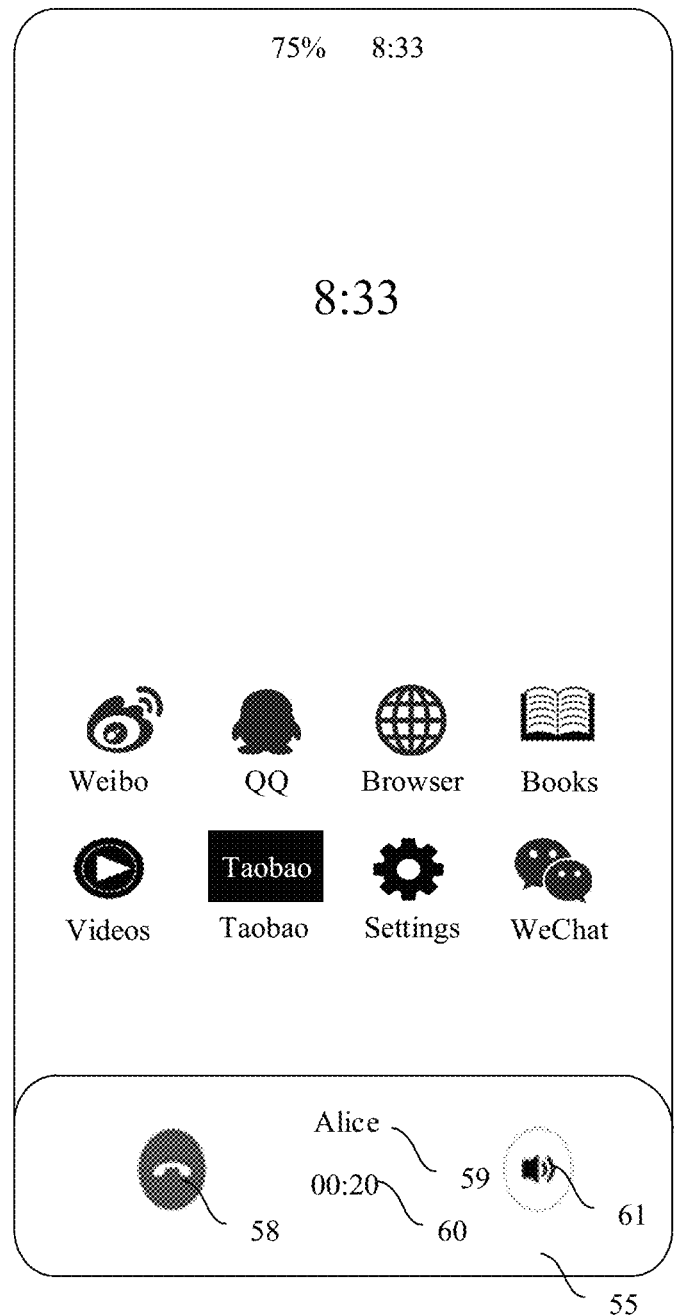
FIG. 5G1(a)

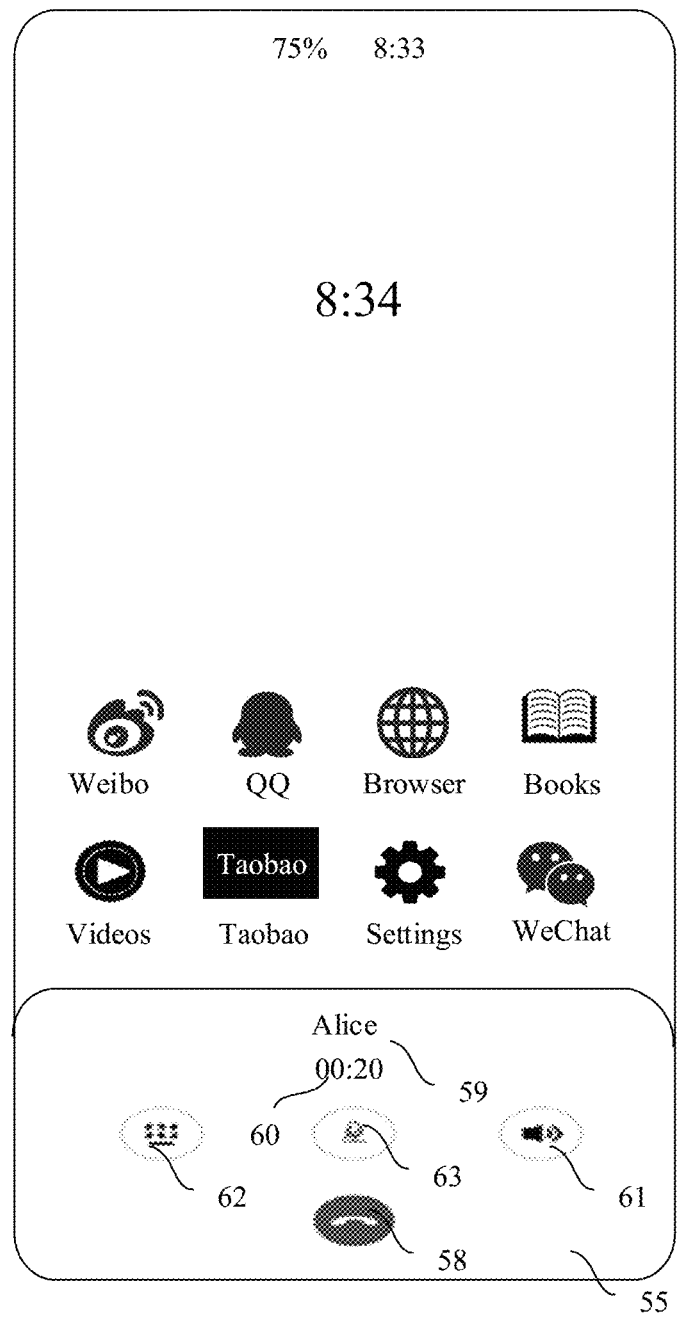
FIG. 5G1(b)

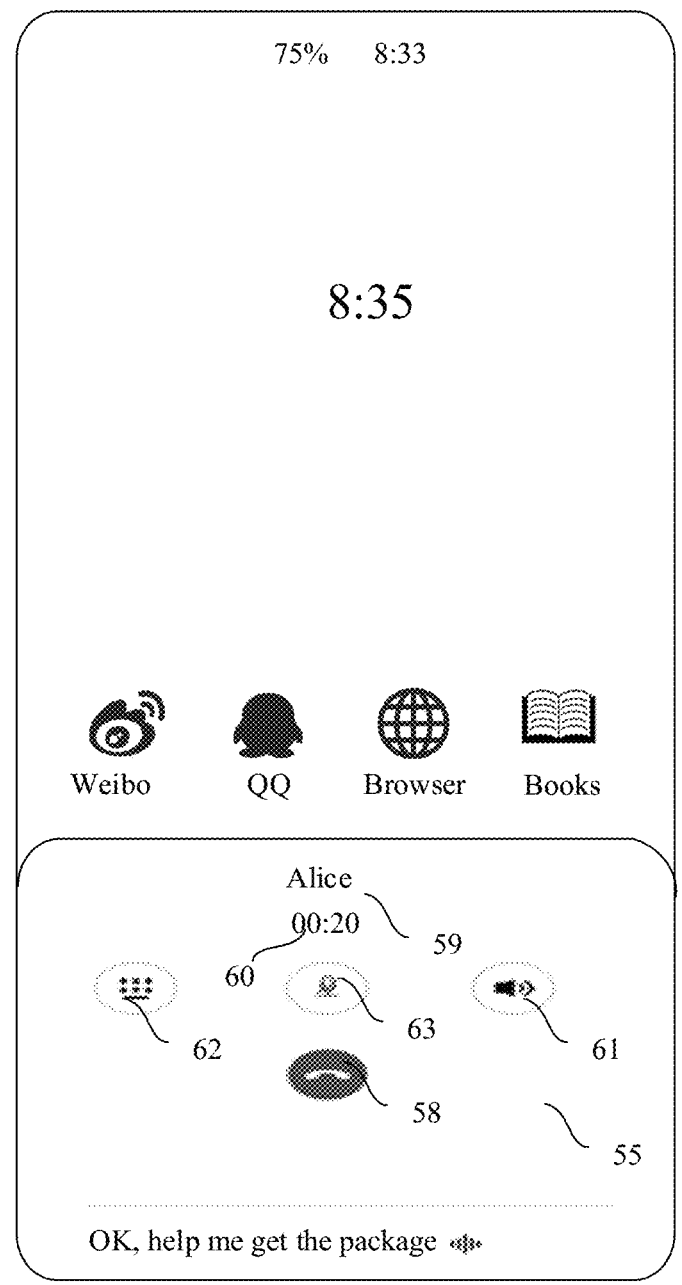
FIG. 5G1(c)

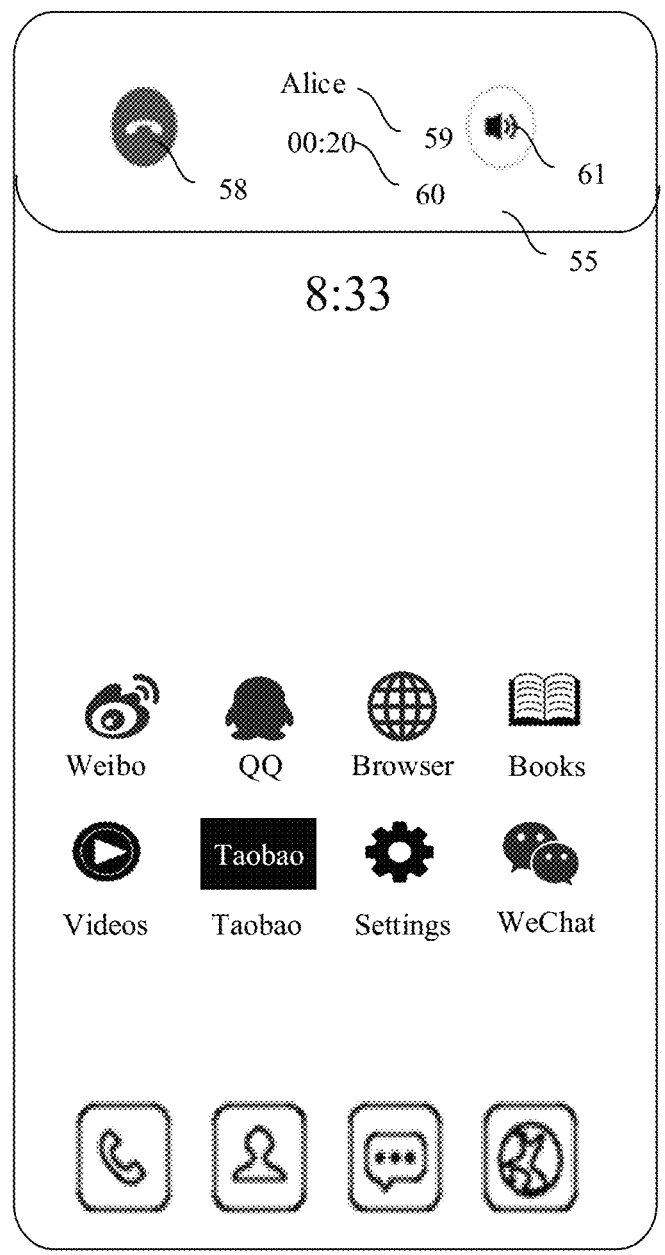
FIG. 5G2(a)

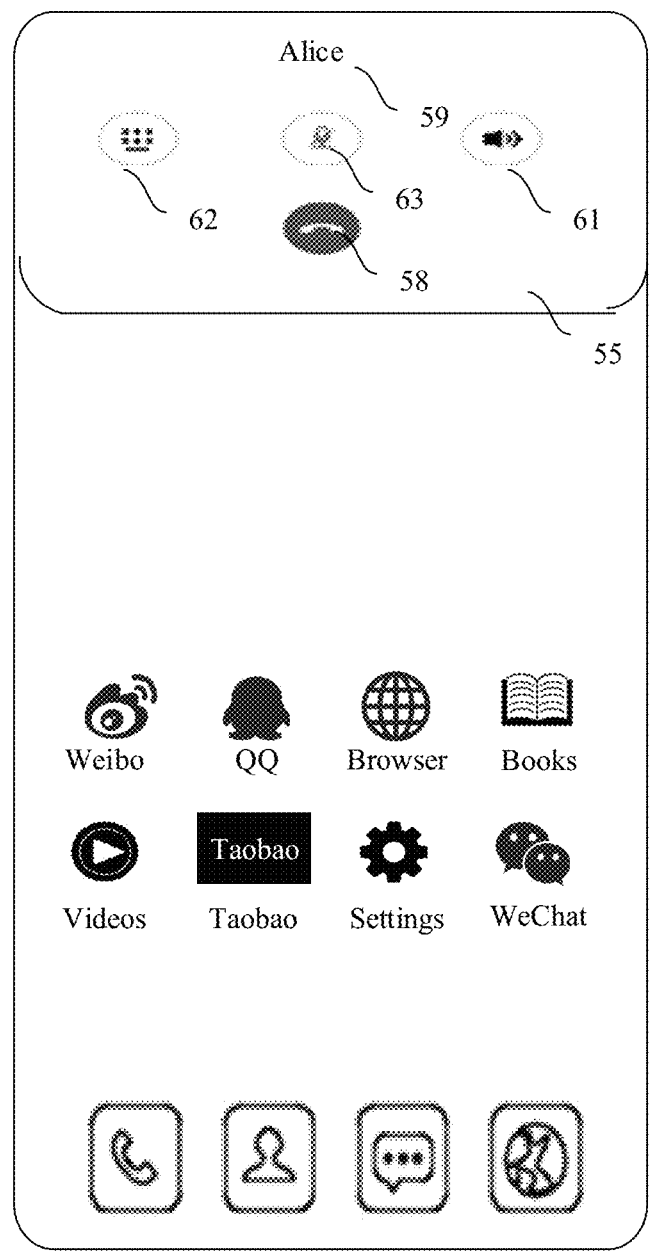
FIG. 5G2(b)

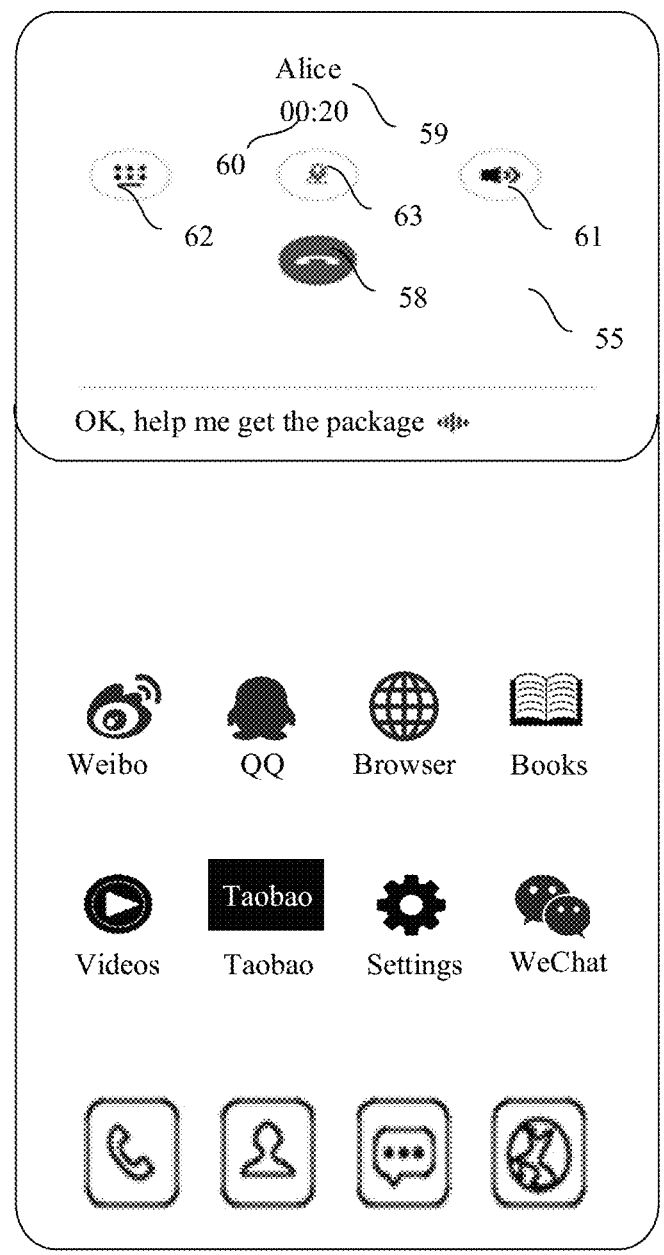
FIG. 5G2(c)

INTERACTION METHOD FOR ELECTRONIC DEVICE AND ELECTRONIC DEVICE

CROSS-REFERENCE TO RELATED APPLICATIONS

This application is a continuation of International Application No. PCT/CN2021/098165, filed on Jun. 3, 2021, which claims priority to Chinese Patent Application No. 202010526697.1, filed on Jun. 9, 2020. The disclosures of the aforementioned applications are hereby incorporated by reference in their entireties.

TECHNICAL FIELD

This application relates to the field of terminal technologies, and in particular, to an interaction method for an electronic device and an electronic device.

BACKGROUND

Electronic devices such as a smartphone, a tablet, and a notebook computer are widely applied in daily life due to portability. A user may download various applications (application, APP) on the electronic device to meet requirements of the user for entertainment, shopping, learning, and the like. After the application is installed on the electronic device, the application pushes various notification messages to the user from time to time. A mobile phone is used as an example. When an application on the mobile phone pushes a notification message to the user, the user taps a notification bar of the notification message. In this case, an application corresponding to the notification message is jumped to. This is convenient for the user to browse complete details of the notification message, and is convenient for the user to perform an operation such as replying to or deleting the notification message. In this way, when viewing or operating the notification message in the notification bar, the user needs to jump to the corresponding application. Therefore, operation performing is excessively cumbersome and takes a relatively long time, thereby causing relatively poor user experience.

SUMMARY

An objective of this application is to provide an interaction method for an electronic device and an electronic device, thereby improving user experience.

According to a first aspect, an embodiment of this application discloses an interaction method for an electronic device. The interaction method includes:

The electronic device receives a touch instruction. The electronic device has a display. The touch instruction indicates that, after a user touches the display of the electronic device, a touch sensor at a touch location at which the user touches the display sends a signal to a processor based on the touch location. The signal may be used as the touch instruction of the processor.

The electronic device parses a touch manner and a to-be-operated object that correspond to the touch instruction. The touch manner includes at least one type, and each type of touch manner includes a plurality of touch operations. The touch manner includes at least one of the following types: a tap, touch duration, a press, a slide, and the like. The to-be-operated object may be a notification message sent by an application installed on the electronic device.

The electronic device successively and correspondingly displays, based on an amplitude of each touch operation, content carried by the to-be-operated object at an upper layer of an operation interface currently browsed by the user.

In a possible implementation of the first aspect of this application, the amplitude of the touch operation indicates a quantity of taps of tapping the to-be-operated object by the user on the display, a sliding distance of a single touch on the to-be-operated object, touch duration of a single touch on the to-be-operated object, and touch strength of tapping the to-be-operated object by the user on the display. For the quantity of taps of tapping the to-be-operated object by the user on the display, a length of the sliding distance of the single touch on the to-be-operated object, or the touch duration of the single touch on the to-be-operated object, the electronic device may display, in response to the quantity of taps of tapping the to-be-operated object by the user on the display, detailed information of the to-be-operated object at the upper layer of the interface currently browsed by the user. The detailed information includes but is not limited to detailed content (a text, a picture, a video, or the like) of the notification message, a function button (such as a reply box or a forwarding function button) for performing an operation on the notification message, a push (such as an article, a video, or a picture) related to a type of the notification message, and the like.

In a possible implementation of the first aspect of this application, the electronic device may be a mobile phone, a tablet, a notebook computer, or the like.

According to the interaction method for an electronic device provided in the first aspect of this application, when the user views the content in the to-be-operated object, jumping between the operation interface currently browsed by the user and an app corresponding to the to-be-operated object is avoided, and CPU resource occupation of the electronic device due to an application jumping process is avoided, and freezing of the electronic device is also avoided, thereby improving user experience.

In a possible implementation of the first aspect of this application, an amplitude of at least one touch operation is determined.

When the amplitude of the touch operation is less than a first threshold, the electronic device displays first content of the to-be-operated object.

When the amplitude of the touch operation is greater than the first threshold but less than a second threshold, the electronic device displays second content of the to-be-operated object.

In a possible implementation of the first aspect of this application, when the amplitude of the touch operation is greater than the second threshold, the electronic device displays third content of the to-be-operated object.

In a possible implementation of the first aspect of this application, the touch manner is a tap performed by the user on the to-be-operated object on the display of the electronic device, and the amplitude of the touch operation is a quantity of taps. Correspondingly, the first threshold is a tap quantity threshold 1, and the second threshold is a tap quantity threshold 2.

Alternatively, the touch manner is a slide performed by the user on the to-be-operated object on the display of the electronic device, and the amplitude of the touch operation is a sliding distance. Correspondingly, the first threshold is a first distance threshold, and the second threshold is a second distance threshold.

Alternatively, the touch manner is a touch performed by the user on the to-be-operated object on the display of the electronic device, and the amplitude of the touch operation is touch duration. Correspondingly, the first threshold is a first duration threshold, and the second threshold is a second duration threshold.

Alternatively, the touch manner is a press performed by the user on the to-be-operated object on the display of the electronic device, and the amplitude of the touch operation is pressing strength. Correspondingly, the first threshold is a first pressure threshold, and the second threshold is a second pressure threshold.

In a possible implementation of the first aspect of this application, the second content includes the first content and additional first content based on the first content, and the third content includes the second content and additional second content based on the second content.

In a possible implementation of the first aspect of this application, for example, the to-be-operated object is the notification message sent by the application installed on the electronic device, and the touch manner is that the user taps the notification message on the display of the electronic device. When the touch manner is that the user taps the to-be-operated object on the display, and the amplitude of the touch operation is the quantity of taps, detailed content of the to-be-operated object is hierarchically displayed based on the quantity of taps.

For example, the user successively taps the to-be-operated object for three times on the display. When the user performs a touch operation such as tapping, pulling down, or pulling up for the first time, the electronic device executes an instruction of displaying detailed content (a text, a picture, a video, or the like) of the notification message (used as the first content) at the upper layer of the interface currently browsed by the user. When the user performs a touch operation such as tapping, pulling down, or pulling up for the second time, the electronic device executes an instruction of displaying, at the upper layer of the operation interface currently browsed by the user, the detailed content (the text, the picture, the video, or the like) of the notification message and a function button (such as a reply box or a forwarding function button) for performing an operation on the notification message (used as the second content, where the second content includes the first content and the additional first content (the additional first content is the function button (such as the reply box or the forwarding function button) for performing the operation on the notification message)). When the user performs a touch operation such as tapping, pulling down, or pulling up for the third time, the electronic device executes an instruction of displaying, at the upper layer of the interface currently browsed by the user, the detailed content (such as the text, the picture, or the video) of the notification message, the function button (such as the reply box or the forwarding function button) for performing the operation on the notification message, the push (such as the article, the video, or the picture) related to a type of the notification message, and the like (used as third content, where the third content includes the second content and the additional second content (the additional second content includes the push (such as the article, the video, or the picture) related to the type of the notification message), and the like). It may be understood that the touch operations may be divided by setting a threshold. For example, one tap is set as the tap quantity threshold 1 (the first threshold), and two taps are set as the tap quantity threshold 2 (the second threshold).

In a possible implementation of the first aspect of this application, the content carried by the to-be-operated object includes an operation control for performing an operation on the to-be-operated object.

In a possible implementation of the first aspect of this application, the content carried by the to-be-operated object includes a voice.

When the user touches the to-be-operated object to trigger the touch instruction, the electronic device converts the voice into a text based on the touch instruction, and hierarchically displays the text and content related to the text.

In a possible implementation of the first aspect of this application, the content carried by the to-be-operated object includes a foreign word.

When the user touches the to-be-operated object to trigger the touch instruction, the electronic device translates the foreign word into a Chinese word based on the touch instruction, and hierarchically displays the Chinese word and content related to the Chinese word.

In a possible implementation of the first aspect of this application, the content carried by the to-be-operated object includes a video.

When the user touches the to-be-operated object to trigger the touch instruction, the electronic device automatically plays the video based on the touch instruction.

In a possible implementation of the first aspect of this application, the electronic device displays notification messages from a same application in an aggregated manner.

The electronic device displays notification messages from a same source of the same application in an aggregated manner. Therefore, the notification messages from the same application can be displayed in the aggregated manner instead of being displayed one by one. This facilitates user processing and improves user experience. The notification messages from the same source of the same application may be displayed in the aggregated manner, so that the user does not need to complete processing of a notification message before processing a next notification message, and no notification message is missed. This further improves user experience.

In a possible implementation of the first aspect of this application, the electronic device synchronizes the to-be-operated object to another electronic device.

The another electronic device successively and correspondingly displays, based on the touch manner corresponding to the touch instruction and a layer of the touch operation, the content carried by the to-be-operated object.

In a possible implementation of the first aspect of this application, the another electronic device may be a mobile phone, a tablet, a notebook computer, or the like.

According to a second aspect, an embodiment of this application discloses an interaction method for an electronic device. The interaction method is applied to an electronic device and includes:

receiving a touch instruction;

parsing a touch manner and a to-be-operated object that correspond to the touch instruction, where the touch manner includes at least one type, and each type of touch manner includes a plurality of touch operations; and successively and correspondingly displaying, based on an amplitude of each touch operation, content carried by the to-be-operated object at an upper layer of an operation interface currently browsed by a user.

According to the interaction method for an electronic device provided in this embodiment of this application, when the user views the content in the to-be-operated object, jumping between the operation interface currently browsed by the user and an app corresponding to the to-be-operated object is avoided, and CPU resource occupation of the electronic device due to an application jumping process is avoided, and freezing of the electronic device is also avoided, thereby improving user experience.

According to a third aspect, an embodiment of this application discloses an information interaction apparatus for an electronic device. The information interaction apparatus includes:

a receiving module, configured to receive a touch instruction;

a parsing module, configured to parse a touch manner and a to-be-operated object that correspond to the touch instruction, where the touch manner includes at least one type, and each type of touch manner includes a plurality of touch operations; and a display module, configured to successively and correspondingly display, based on an amplitude of each touch operation, content carried by the to-be-operated object at an upper layer of an operation interface currently browsed by a user.

According to the information interaction apparatus for the electronic device provided in this embodiment of this application, when the user views the content in the to-be-operated object, jumping between the operation interface currently browsed by the user and an app corresponding to the to-be-operated object is avoided, and CPU resource occupation of the electronic device due to an application jumping process is avoided, and freezing of the electronic device is also avoided, thereby improving user experience.

According to a fourth aspect, an embodiment of this application provides an electronic device, including at least one processor and at least one memory.

The at least one memory stores instructions.

When the instructions are executed by the at least one processor, the electronic device is enabled to perform the following operations: receiving a touch instruction;

parsing a touch manner and a to-be-operated object that correspond to the touch instruction, where the touch manner includes at least one type, and each type of touch manner includes a plurality of touch operations; and successively and correspondingly displaying, based on an amplitude of each touch operation, content carried by the to-be-operated object at an upper layer of an operation interface currently browsed by a user.

According to the electronic device disclosed in this embodiment of this application, when the user views the content in the to-be-operated object, jumping between the operation interface currently browsed by the user and an app corresponding to the to-be-operated object is avoided, and CPU resource occupation of the electronic device due to an application jumping process is avoided, and freezing of the electronic device is also avoided, thereby improving user experience.

In a possible implementation of the fourth aspect of this application, when the instructions are executed by the at least one processor, the electronic device is enabled to further perform the following steps:

determining an amplitude of at least one touch operation;

when the amplitude of the touch operation is less than a first threshold, displaying first content of the to-be-operated object; and when the amplitude of the touch operation is greater than the first threshold but less than a second threshold, displaying second content of the to-be-operated object.

In a possible implementation of the fourth aspect of this application, when the instructions are executed by the at least one processor, the electronic device is enabled to further perform the following step:

when the amplitude of the touch operation is greater than the second threshold, displaying, by the electronic device, third content of the to-be-operated object.

In a possible implementation of the fourth aspect of this application, the content carried by the to-be-operated object includes a voice, and when the instructions are executed by the at least one processor, the electronic device is enabled to further perform the following steps:

converting the voice into a text, and hierarchically displaying the text and content related to the text.

In a possible implementation of the fourth aspect of this application, the content carried by the to-be-operated object includes a foreign word, and when the instructions are executed by the at least one processor, the electronic device is enabled to further perform the following steps:

translating the foreign word into a Chinese word, and hierarchically displaying the Chinese word and content related to the Chinese word.

In a possible implementation of the fourth aspect of this application, the content carried by the to-be-operated object includes a video, and when the instructions are executed by the at least one processor, the electronic device is enabled to further perform the following step:

automatically playing the video.

In a possible implementation of the fourth aspect of this application, when the instructions are executed by the at least one processor, the electronic device is enabled to further perform the following steps:

displaying notification messages from a same application in an aggregated manner; and displaying, by the electronic device, notification messages from a same source of the same application in an aggregated manner.

In a possible implementation of the fourth aspect of this application, when the instructions are executed by the at least one processor, the electronic device is enabled to further perform the following step:

synchronizing the to-be-operated object to another electronic device.

The another electronic device successively and correspondingly displays, based on the touch manner corresponding to the touch instruction and a layer of the touch operation, the content carried by the to-be-operated object.

Other features and corresponding beneficial effects of this application are described in the following of this specification. In addition, it should be understood that at least some of the beneficial effects are obvious in the descriptions in this specification of this application.

BRIEF DESCRIPTION OF DRAWINGS

FIG. 7A-1 to FIG. 7D(b) are diagrams of mobile phone interface statuses in a scenario 3 according to an embodiment of this application;

DESCRIPTION OF EMBODIMENTS

Figure 1:
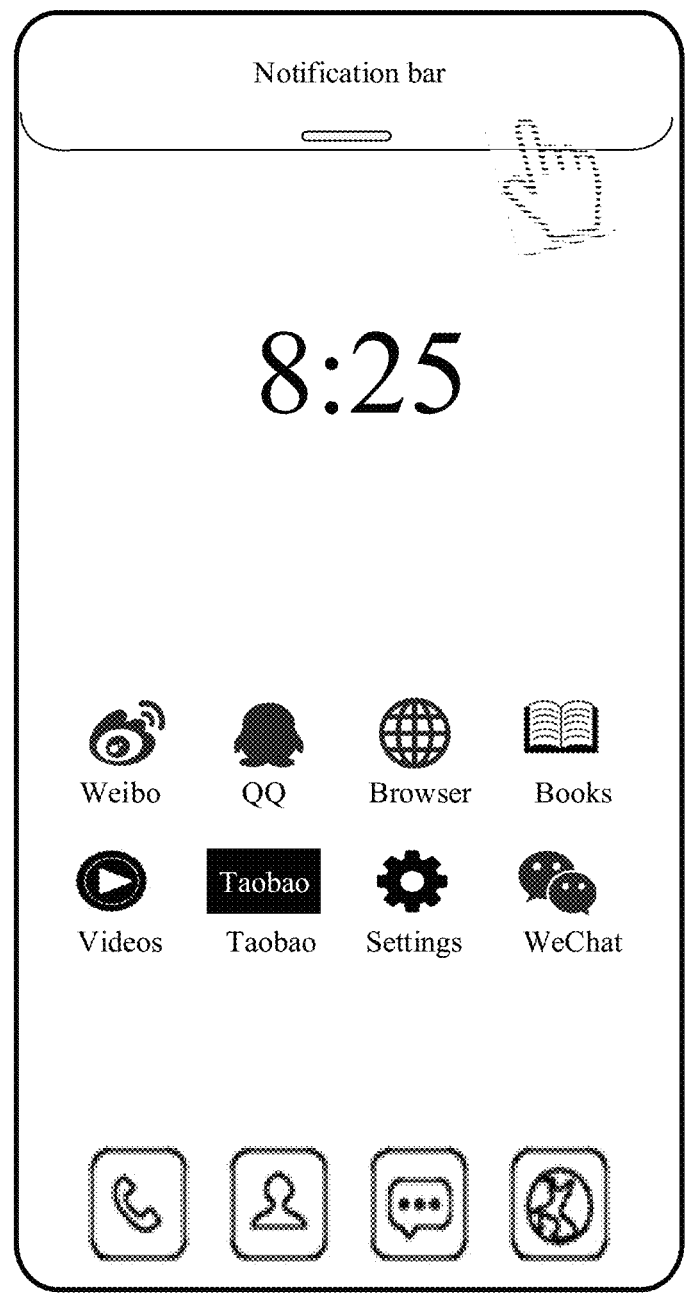
FIG. 1 is a diagram of a mobile phone interface according to an embodiment of this application.

A user may download various apps on an electronic device such as a mobile phone, a tablet, or a notebook computer, to meet daily life requirements. A mobile phone is used as an example. As shown in FIG. 1, to meet daily learning, life, and entertainment requirements, the user downloads apps such as Weibo, QQ, Calculator, Stocks, WeChat, and Taobao on the mobile phone. The user may browse videos, pictures, web pages, articles, and the like in the apps, and may also forward the videos, web pages, pictures, and articles in the apps to a friend. For an instant messaging app for instant messaging (Instant Messaging, IM), the user may send a message (a voice, a text, a picture, a video, an article, or the like) to the friend by using the instant messaging app. After receiving various types of notification messages forwarded by the user, a mobile phone of the friend displays the notification messages in a form of notification messages in a notification bar of the mobile phone. The friend taps the notification message in the notification bar, an application interface that is currently being browsed jumps to a source app of the notification message, and the friend taps the source app on a screen of the mobile phone to view detailed content in the notification message or performs an operation on the notification message based on the detailed content in the notification message, for example, replying to the user in a text or voice form in the source app, commenting on the detailed content in the notification message in the source app, and the like.

Other types of non-instant messaging apps installed on the mobile phone may also automatically push notification messages to the user. When the user taps the notification message in the notification bar, an application interface currently browsed by the user directly jumps to an app corresponding to the notification message, and the user may view detailed content information in the notification message in the app, or may perform an operation (for example, forwarding, commenting, editing, or translating) on the notification message in the app. For example, when the user is currently browsing a homepage of Taobao by using a display of the mobile phone, a WeChat friend of the user sends a voice message to the user, and the voice message appears in the notification bar as a notification message. To view content in the voice message, the user needs to tap the notification message to jump to WeChat, to play the voice message in WeChat or perform an operation (for example, converting the voice message into a text or translating the voice message) on the voice message, to achieve an objective of viewing the voice message and operating the voice message.

Currently, detailed content of a notification message in a notification bar of some mobile phones may be completely viewed in a pull-down manner or a touch and hold manner. However, when an operation is performed on the notification message, an application interface that is currently being browsed still needs to jump to an app corresponding to the notification message, to perform the operation. When the current interaction interface jumps to the app corresponding to the notification message, an execution operation is excessively cumbersome and takes a relatively long time. In addition, in a jumping process, CPU resource occupation of the mobile phone may cause freezing of the mobile phone, thereby causing relatively poor user experience.

In some embodiments of this application, when the user views the detailed content in the notification message or performs the operation on the detailed content in the notification message, to avoid jumping between the operation interface currently browsed by the user and the app corresponding to the notification message, in some embodiments of this application, after the notification message is popped up, only simple content (for example, a source app and a content type (a text, a voice, a video, a link, or the like)) of the notification message is displayed. After a touch instruction of touching the notification message by the user in the notification bar of the display of the mobile phone is received, the notification message tapped by the user is used as a to-be-operated object. When the user touches, as a first operation, (touches and holds the screen or lightly touches the screen) the display of the mobile phone for the first time to tap the notification message, the detailed content in the notification message is directly displayed on the application interface currently browsed by the user, and a function button for performing an operation on the notification message is further displayed, for example, a reply box or a forwarding function button. When the user touches (touches and holds the screen or lightly touches the screen) again, as a second operation, an interface of the notification message that has displayed the detailed content, the detailed content in the notification message is displayed on the application interface currently browsed by the user. In addition, when the user further touches an interface that displays the notification message with the detailed content and the function button of the notification message, the detailed content of the notification message and the function button for performing an operation on the notification message are displayed on the application interface currently browsed by the user, and a push (for example, an article, a video, or a picture) related to a type of the notification message and a further operation are further displayed.

In some embodiments of this application, alternatively, the user may touch the notification message and continuously slide up or down on the screen of the mobile phone along the screen of the mobile phone. As a sliding path extends, the detailed content (the text, the picture, the video, or the like) of the notification message, the function button (such as the reply box or the forwarding function button) for performing the operation on the notification message, the push (such as the article, the video, or the picture) related to the type of the notification message, and the like are displayed in sequence on the application interface currently browsed by the user.

In other words, for the sliding path on which the user touches the notification message by using the screen of the mobile phone, to-be-displayed information corresponding to the notification message is displayed in sequence on the current operation interface based on a quantity of slides of the sliding path and a continuous sliding distance of a single sliding path, without jumping to the corresponding app. This avoids CPU resource occupation of the mobile phone and freezing of the mobile, thereby improving user experience.

The following describes in detail, by using a mobile phone 100 as the foregoing electronic device, an interaction method for an electronic device provided in an embodiment of this application.

Figure 2:
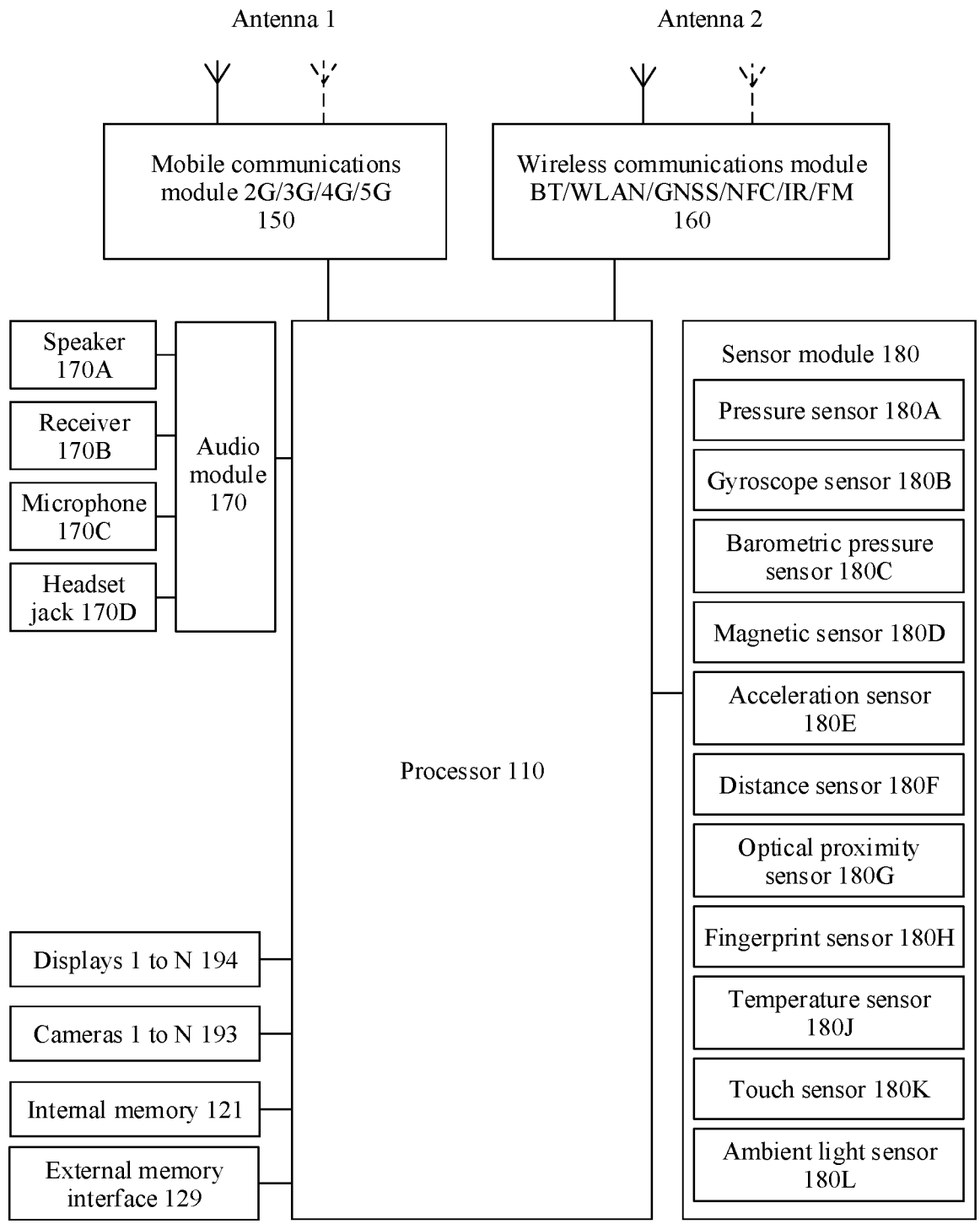
FIG. 2 is a diagram of a structure of a mobile phone according to an embodiment of this application.

First, refer to FIG. 2. FIG. 2 is a schematic diagram of a structure of the mobile phone.

The mobile phone 100 may include a processor 110, an external memory interface 120, an internal memory 121, a universal serial bus (universal serial bus, USB) connector 130, a charging management module 140, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and the like.

It may be understood that the structure shown in this embodiment of this application does not constitute a specific limitation on the mobile phone 100. In some other embodiments of this application, the mobile phone 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural network processing unit, NPU). Different processing units may be independent components, or may be integrated into one or more processors.

The processor may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, thereby improving system efficiency. For this embodiment of this application, after receiving a touch instruction that is transmitted by the touch sensor and that is of a display of the mobile phone touched by the user, the processor 110 executes the instructions stored in the processor. The instructions implement, for a quantity of touches of a notification message on the display of the mobile phone for the user, correspondingly expanding content and an operation related to the notification message.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, and a subscriber identity module (subscriber identity module) interface.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the mobile phone 100. The processor 110 communicates with the display 194 through the DSI interface, to implement a display function of the mobile phone 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

It may be understood that an interface connection relationship between the modules shown in this embodiment of this application is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

A wireless communication function of the mobile phone 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the mobile phone 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the mobile phone 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the mobile phone 100, the antenna 1 and the mobile communications module 150 are coupled, and the antenna 2 and the wireless communications module 160 are coupled, so that the mobile phone 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division synchronous code division multiple access (time-division synchronous code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The mobile phone 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile phone 100 may include one or N displays 194, where N is a positive integer greater than 1.

The mobile phone 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone 100 may include one or N cameras 193, where N is a positive integer greater than 1.

The digital signal processor is configured to process a digital signal, and may further process another digital signal in addition to the digital image signal. For example, when the mobile phone 100 selects a frequency, the digital signal processor is configured to perform Fourier transform on frequency energy.

The video codec is configured to compress or decompress a digital video. The mobile phone 100 may support one or more video codecs. In this way, the mobile phone 100 may play or record videos in a plurality of coding formats, for example, moving picture experts group (moving picture experts group, MPEG)-1, MPEG-2, MPEG-3, and MPEG-4.

The NPU is a neural network (neural network, NN) computing processor, quickly processes input information by referring to a structure of a biological neural network, for example, by referring to a mode of transmission between human brain neurons, and may further continuously perform self-learning. The NPU can implement applications such as intelligent cognition of the mobile phone 100, such as image recognition, facial recognition, speech recognition, and text understanding.

The external memory interface 120 may be configured to connect to an external memory card, for example, a micro SD card, to extend a storage capability of the mobile phone 100. The external memory card communicates with the processor 110 through the external memory interface 120, to implement a data storage function. For example, files such as music and videos are stored in the external memory card.

The internal memory 121 may be configured to store computer-executable program code, and the computer-executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like created when the mobile phone 100 is used. In addition, the internal memory 121 may include a high-speed random access memory, or may include a nonvolatile memory such as at least one disk storage device, a flash memory, or a universal flash storage (universal flash storage, UFS). The processor 110 runs instructions stored in the internal memory 121 and/or instructions stored in the memory disposed in the processor, to perform various function applications of the mobile phone 100 and data processing. In this embodiment of this application, both a cache file and an application file of an application installed on the mobile phone 100 in FIG. 1 are stored in the internal memory 121.

The mobile phone 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The mobile phone 100 may listen to music or answer a call in a hands-free mode by using the speaker 170A.

The receiver 170B, also referred to as an "earpiece", is configured to convert an audio electrical signal into a sound signal. When a call is answered or voice information is received by using the mobile phone 100, the receiver 170B may be put close to a human ear to listen to a voice.

The microphone 170C, also referred to as a "mike", is configured to convert a sound signal into an electrical signal. When making a call or sending voice information, the user may make a sound near the microphone 170C through the mouth of the user, to input a sound signal to the microphone 170C. At least one microphone 170C may be disposed in the mobile phone 100. In some other embodiments, two microphones 170C may be disposed in the mobile phone 100, to collect a sound signal and further implement a noise reduction function. In some other embodiments, three, four, or more microphones 170C may alternatively be disposed in the mobile phone 100, to collect a sound signal, implement noise reduction, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The mobile phone 100 determines pressure strength based on the change of the capacitance. When a touch operation is performed on the display 194, the mobile phone 100 detects strength of the touch operation by using the pressure sensor 180A. The mobile phone 100 may also calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an icon of Messages, an instruction for viewing an SMS message is performed. When a touch operation whose touch operation strength is greater than or equal to the first pressure threshold is performed on a notification message of an SMS message, an instruction for performing an operation (for example, replying, creating, or editing) on the SMS message is performed.

The gyroscope sensor 180B may be configured to determine a motion posture of the mobile phone 100. In some embodiments, an angular velocity of the mobile phone 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the mobile phone 100 jitters, calculates, based on the angle, a distance for which a lens module needs to compensate, and allows the lens to cancel the jitter of the mobile phone 100 through reverse motion, to implement image stabilization. The gyroscope sensor 180B may also be used in a navigation scenario and a motion-controlled gaming scenario.

The barometric pressure sensor 180C is configured to measure barometric pressure. In some embodiments, the mobile phone 100 calculates an altitude based on a barometric pressure value measured by the barometric pressure sensor 180C, to assist in positioning and navigation.

The magnetic sensor 180D includes a Hall effect sensor. The mobile phone 100 may detect opening and closing of a flip cover by using the magnetic sensor 180D. In some embodiments, when the mobile phone 100 is a flip phone, the mobile phone 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect magnitudes of accelerations in various directions (usually on three axes) of the mobile phone 100, and may detect a magnitude and a direction of gravity when the mobile phone 100 is still. The acceleration sensor 180E may be further configured to identify a posture of the mobile phone, and is applied to an application such as switching between a landscape mode and a portrait mode or a pedometer.

The distance sensor 180F is configured to measure a distance. The mobile phone 100 may measure a distance in an infrared or a laser manner. In some embodiments, in a photographing scenario, the mobile phone 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The mobile phone 100 emits infrared light by using the light-emitting diode. The mobile phone 100 detects infrared reflected light from a nearby object by using the photodiode. When sufficient reflected light is detected, the mobile phone 100 may determine that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The mobile phone 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the mobile phone 100 is in a pocket, to avoid an accidental touch.

The fingerprint sensor 180H is configured to collect a fingerprint. The mobile phone 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 lowers performance of a processor near the temperature sensor 180J, to reduce power consumption for thermal protection. In some other embodiments, when the temperature is less than another threshold, the mobile phone 100 heats the battery 142 to prevent the mobile phone 100 from being shut down abnormally because of a low temperature. In some other embodiments, when the temperature is less than still another threshold, the mobile phone 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen. The touch sensor 180K is configured to detect a touch operation performed on or near the touch sensor 180K. The touch sensor may transfer the detected touch operation to the application processor to determine a type of the touch event. The display 194 may provide a visual output related to the touch operation. In some other embodiments, the touch sensor 180K may alternatively be disposed on a surface of the mobile phone 100 at a location different from that of the display 194. After the user touches the display of the mobile phone 100, the touch sensor 180K detects a touch operation of the user, and transmits the touch operation to the processor. The processor executes the instructions stored in the processor. The instructions implement, for a quantity of touches of a notification message on the display of the mobile phone for the user, correspondingly expanding content and an operation related to the notification message.

A software system of the mobile phone 100 may use a layered architecture, an event-driven architecture, a microkernel architecture, a micro service architecture, or a cloud architecture. In this embodiment of this application, an Android system of a layered architecture is used as an example to describe the software structure of the mobile phone 100.

Figure 3:
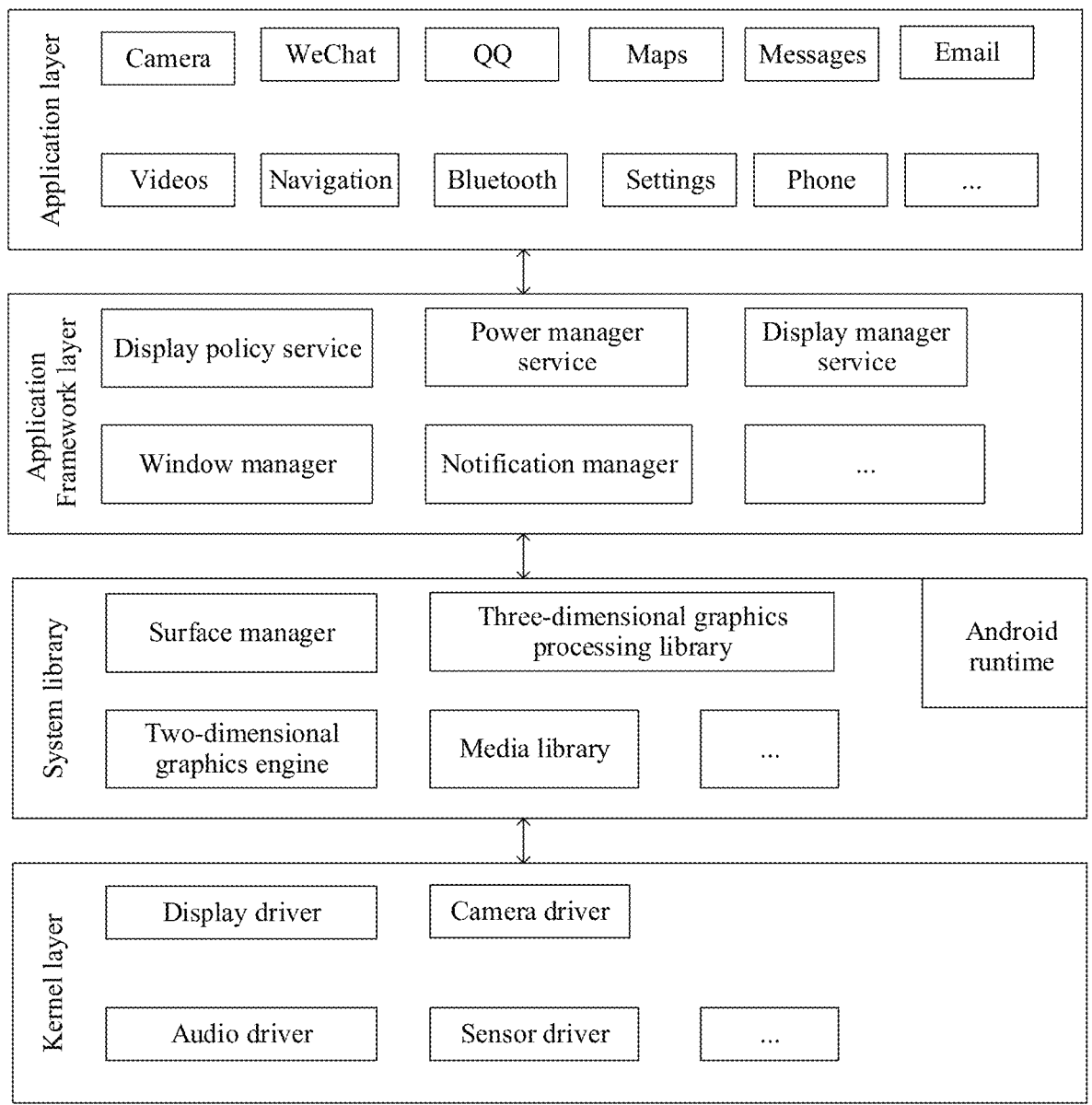
FIG. 3 is a diagram of a software structure of a mobile phone according to an embodiment of this application.

FIG. 3 is a block diagram of the software structure of the mobile phone 100 according to this embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3, the application packages may include applications such as Camera, Album, Calculator, Stocks, Weibo, QQ, an application L, Books, Weather, Videos, Taobao, WeChat, and Messages.

The application framework layer provides an application programming interface (application programming interface, API) and a programming framework for an application at the application layer. The application framework layer includes some predefined functions.

As shown in FIG. 3, the application framework layer may include a display policy service, a power management service (power management service, PMS), and a display management service (display manager service, DMS). Certainly, the application framework layer may further include an activity manager, a window manager, a content provider, a view system, a phone manager, a resource manager, a notification manager, and the like. This is not limited in this embodiment of this application.

The display policy service may be configured to obtain a touch instruction of the user from the notification manager. Further, the display policy service may display to-be-displayed content on the display based on a notification message corresponding to the touch instruction, that is, content currently displayed on the display.

For example, after the user touches the notification message in a notification bar on the display, the software system of the mobile phone receives the touch operation by using the touch sensor, and a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. When the processor identifies that the touch operation received by the touch sensor 180K is received for the first time, the display policy service directly displays, on the display, detailed content of the notification message at an upper layer of an application interface currently browsed by the user. When the user touches again an interface of the notification message that has displayed the detailed content, a touch operation is received again. When the processor identifies that the touch operation received by the touch sensor 180K is received for the second time, the display policy service displays, on the display, the detailed content of the notification message at the upper layer of the application interface currently browsed by the user, and further displays a function button for performing an operation on the notification message, for example, a reply box or a forwarding function button. When the user further touches an interface that displays the notification message with the detailed content and the function button of the notification message, and a touch operation is received for the third time. When the processor identifies that the touch operation received by the touch sensor 180K is received for the third time, the display policy service displays, on the display, the detailed the content of the notification message and the function button for performing the operation on the notification message at the upper layer of the application interface currently browsed by the user, and further displays a push (such as an article, a video, or a picture) related to a type of the notification message.

In some embodiments of this application, alternatively, the user may touch the notification message and continuously slide up or down on the screen of the mobile phone along the screen of the mobile phone. As a sliding path is longer, the detailed content of the notification message, the function button (such as the reply box or the forwarding function button) for performing the operation on the notification message, the push (such as the article, the video, or the picture) related to the type of the notification message, and the like are displayed in sequence on the application interface currently browsed by the user.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes visual controls, such as a control for displaying a text and a control for displaying a photo. The view system may be configured to construct an application. A display interface may include one or more views. For example, a display interface including an SMS message notification icon may include a text display view and a photo display view.

The phone manager is configured to provide a communication function for the mobile phone 100, for example, management of a call status (including answering, declining, or the like).

The resource manager provides various resources such as a localized character string, an icon, a photo, a layout file, and a video file for an application.

The notification manager enables an application to display notification information in a status bar, and may be configured to convey a notification type message. The displayed notification information may automatically disappear after a short pause and require no user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, an alert sound is played, the mobile phone vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver. This is not limited in this embodiment of this application.

Figure 4A:
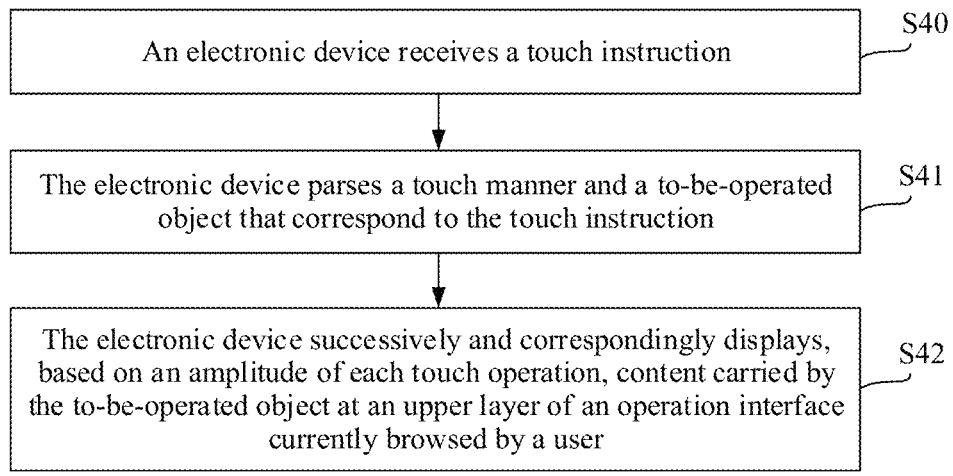
FIG. 4(a) is a schematic flowchart of an interaction method according to an embodiment of this application.
Figure 4B:
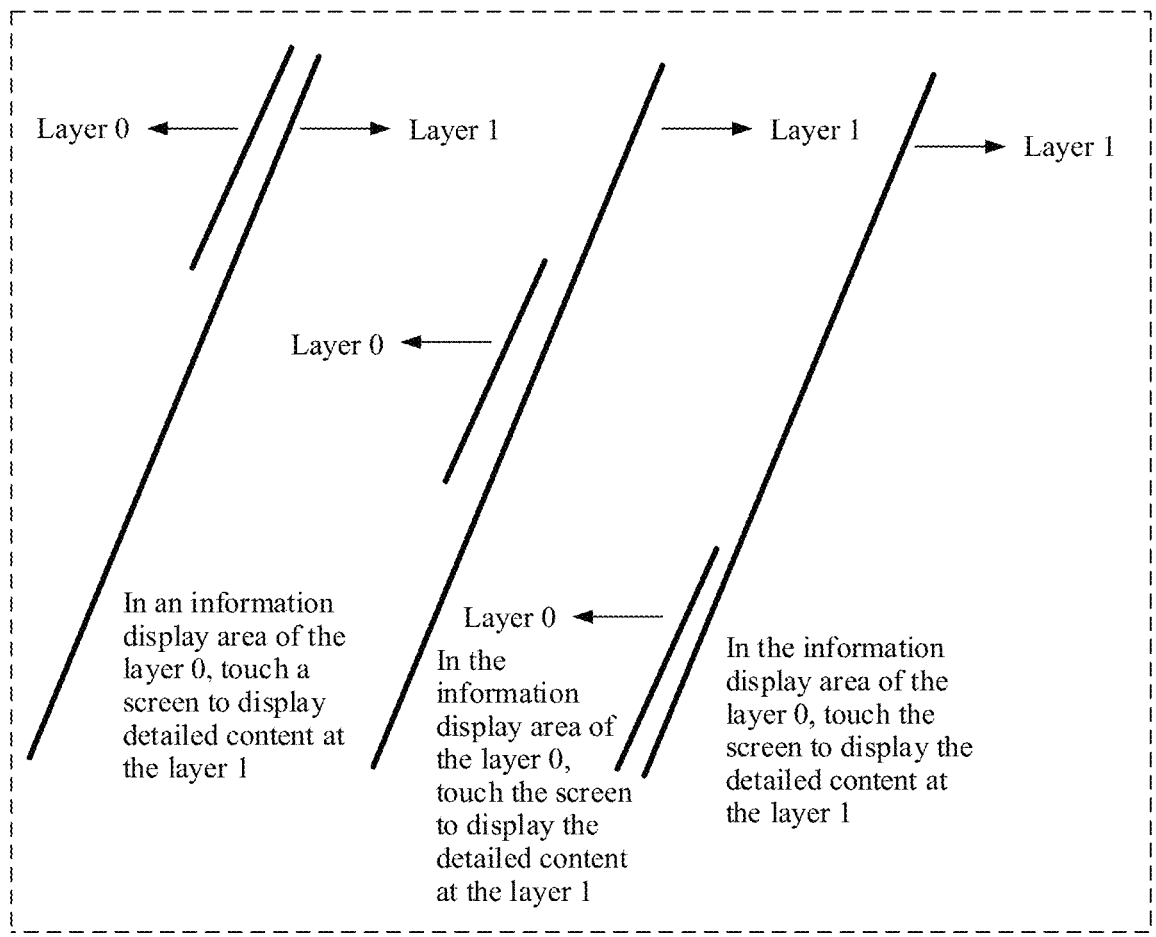
FIG. 4(b) is a schematic diagram of an information layer relationship according to an embodiment of this application.

In an embodiment of this application, as shown in a method flowchart depicted in FIG. 4(*a*), an interaction method in FIG. 4(*a*) includes the following steps.

S40: An electronic device receives a touch instruction.

S41: The electronic device parses a touch manner and a to-be-operated object that correspond to the touch instruction, where the touch manner includes at least one type, and each type of touch manner includes a plurality of touch operations.

S42: The electronic device successively and correspondingly displays, based on an amplitude of each touch operation, content carried by the to-be-operated object at an upper layer of an operation interface currently browsed by a user.

For example, the following uses a mobile phone as the electronic device, and describes in detail, with reference to the accompanying drawings, the interaction method for an electronic device provided in FIG. 4(*a*) in this embodiment of this application.

An app generates a notification bar and displays the notification bar at a layer 0 (the layer 0 indicates a layer at which the notification bar is displayed, and the layer 0 displays only a source and time of a notification message and part information of the notification message) in FIG. 4(*b*). In addition, the touch sensor of the mobile phone 100 detects a touch instruction that a location at which the notification bar appears on the display is touched. The touch instruction indicates that, after the user touches the display 194 of the mobile phone 100, the touch sensor 180K at the touch location at which the user touches the display 194 sends a signal to the processor 110 based on the touch location. The signal may be used as a touch instruction of the processor 110. The mobile phone 100 parses a touch manner corresponding to the touch instruction and a to-be-operated object at the touch location. The touch manner includes at least one of the following types: a tap, touch duration, a press, a slide, and the like.

The amplitude of the touch operation indicates a quantity of taps of tapping the to-be-operated object by the user on the display, a sliding distance of a single touch on the to-be-operated object, touch duration of a single touch on the to-be-operated object, and touch strength of tapping the to-be-operated object by the user on the display. For the quantity of taps of tapping the to-be-operated object by the user on the display, a length of the sliding distance of the single touch on the to-be-operated object, or the touch duration of the single touch on the to-be-operated object, the mobile phone may hierarchically display, in response to the quantity of taps of tapping the to-be-operated object by the user on the display, detailed information of the to-be-operated object at the upper layer of the interface currently browsed by the user, namely, the a layer 1 (the layer 1 indicates a layer at which the detailed information of the notification message is displayed) in FIG. 4(*b*). The detailed information includes but is not limited to detailed content (a text, a picture, a video, or the like) of the notification message, a function button (such as a reply box or a forwarding function button) for performing an operation on the notification message, a push (such as an article, a video, or a picture) related to a type of the notification message, and the like.

In some embodiments of this application, when the touch manner is that the user taps the to-be-operated object on the display, and the amplitude of the touch operation is the quantity of taps (the quantity of taps represents the amplitude of the corresponding touch operation), the detailed content of the to-be-operated object is correspondingly displayed in sequence based on the quantity of taps. For example, the user successively taps the to-be-operated object for three times on the display. When the user performs a touch operation such as tapping, pulling-down, or pulling-up for the first time, the mobile phone executes an instruction of displaying detailed content (a text, a picture, a video, or the like) of the notification message (used as first content) at the upper layer of the interface currently browsed by the user. When the user performs a touch operation such as tapping, pulling-down, or pulling-up for the second time, the mobile phone executes an instruction of displaying, at the upper layer of the operation interface currently browsed by the user, the detailed content (the text, the picture, the video, or the like) of the notification message and the function button (such as the reply box or the forwarding function button) for performing the operation on the notification message (used as second content, where the second content includes the first content and additional first content (the additional first content is a function button (such as a reply box or a forwarding function button) for performing an operation on the notification message)). When the user performs a touch operation such as tapping, pulling down, or pulling up for the third time, the mobile phone executes an instruction of displaying, at the upper layer of the interface currently browsed by the user, the detailed content (such as the text, the picture, or the video) of the notification message, the function button (such as the reply box or the forwarding function button) for performing the operation on the notification message, the push (such as the article, the video, or the picture) related to the type of the notification message, and the like (used as third content, where the third content includes the second content and additional second content (the additional second content includes a push (such as an article, a video, or a picture) related to a type of the notification message) and the like). It may be understood that the touch operations may be divided by setting a threshold. For example, one tap is set as a tap quantity threshold 1 (a first threshold), and two taps are set as a tap quantity threshold 2 (a second threshold).

In this embodiment of this application, when the touch manner is the touch duration of a single touch on the to-be-operated object (touching and holding), the detailed content of the to-be-operated object is correspondingly displayed in sequence based on the touch duration (namely, an amplitude of the touch duration). When the touch duration for which the user touches the display does not exceed a first duration threshold (a first threshold), the mobile phone executes the instruction of displaying the detailed content (where the text, the picture, the video, or the like is used as the first content) of the notification message at the upper layer of the interface currently browsed by the user. When the touch duration for which the user touches the display is between the first duration threshold and a second duration threshold, the mobile phone executes the instruction of displaying, at the upper layer of the interface currently browsed by the user, the detailed content (the text, the picture, the video, or the like) of the notification message and the function button (such as the reply box or the forwarding function button) for performing the operation on the notification message (used as the second content, where the second content includes the first content and the additional first content (the additional first content is the function button (such as the reply box or the forwarding function button) for performing the operation on the notification message)). When the touch duration for which the user touches the display exceeds the second duration threshold (a second threshold), the mobile phone executes the instruction of displaying, at the upper layer of the interface currently browsed by the user, the detailed content (the text, the picture, the video, or the like) of the notification, the function button (such as the reply box or the forwarding function button) for performing the operation on the notification message, the push (such as the article, the video, or the picture) related to the type of the notification message, and the like (used as the third content, where the third content includes the second content and the additional second content (the additional second content includes the push (such as the article, the video, or the picture) related to the type of the notification message)). Values of the first duration threshold and the second duration threshold may be customized. The first duration threshold and the second duration threshold are not limited in this embodiment of this application. For example, the first duration threshold is set to 1 second, and the second duration threshold is set to 2 seconds.

In this embodiment of this application, the touch manner is the touch strength of which the user taps the to-be-operated object on the display. When a touch operation is performed on the display, the mobile phone detects touch strength by using the pressure sensor, and successively and correspondingly displays the detailed content of the to-be-operated object based on a magnitude of the touch strength (namely, an interval in which the touch strength is located). The mobile phone may also calculate a touch location based on a detection signal of the pressure sensor. In some embodiments of this application, touch operations that are performed at a same touch location but have different touch operation strength may correspond to different operation instructions. For example, when a touch operation whose touch operation strength is less than a first pressure threshold is performed on the notification message, the mobile phone executes the instruction of displaying the detailed content (the text, the picture, the video, or the like) of the notification message (used as the first content) at the upper layer of the interface currently browsed by the user. When a touch operation whose touch strength is greater than or equal to the first pressure threshold (a first threshold) and less than a second pressure threshold (a second threshold) is performed on the notification message, the mobile phone executes the instruction of displaying, at the upper layer of the interface currently browsed by the user, the detailed content (the text, the picture, the video, or the like) of the notification and the function button (such as the reply box or the forwarding function button) for performing the operation on the notification message (used as the second content, where the second content includes the first content and the additional first content (the additional first content is the function button (such as the reply box or the forwarding function button) that performs the operation on the notification message)). When touch strength is greater than the second pressure threshold, the mobile phone executes the instruction of displaying, at the upper layer of the interface currently browsed by the user, the detailed content (the text, the picture, the video, or the like) of the notification message, the function button (such as the reply box or the forwarding function button) for performing the operation on the notification message, the push (such as the article, the video, or the picture) related to the type of the notification message, and the like (used as the third content, where the third content includes the second content and the additional second content (the additional second content includes the push (such as the article, the video, or the picture) related to the type of the notification message)).

In this embodiment of this application, the touch manner is the sliding distance of a single touch on the to-be-operated object. When a touch operation is performed on the display, the user taps the to-be-operated object and slides from top to bottom along the screen of mobile phone from an initial location, and the detailed content of the to-be-operated object is correspondingly displayed in sequence based on a length of a sliding distance (namely, a sliding distance interval in which the sliding distance is located). When the sliding distance from the initial location tapped by the user on the to-be-operated object to a current touch location of the user does not exceed a first distance threshold (a first threshold), the mobile phone executes the instruction of displaying the detailed content (where the text, the picture, the video, or the like is used as the first content) of the notification message at the upper layer of the interface currently browsed by the user. When the sliding distance is between the first distance threshold and a second distance threshold (a second threshold), the mobile phone executes the instruction of further displaying more detailed content (the text, the picture, the video, or the like) of the notification message at the upper layer of the interface currently browsed by the user. When the sliding distance exceeds the second distance threshold, the mobile phone executes the instruction of displaying, at the upper layer of the interface currently browsed by the user, the detailed content (the text, the picture, the video, or the like) of the notification message, the function button (such as the reply box or the forwarding function button) for performing the operation on the notification message, the push related to the type of the notification message (such as the article, the video, or the picture), and the like.

It should be noted that, for the quantity of taps of tapping the to-be-operated object by the user on the display, the sliding distance (such as pulling down or pulling up) of the single touch on the to-be-operated object, the touch duration of the single touch on the to-be-operated object, and a change of the touch strength of tapping the to-be-operated object by the user on the display, more content related to the notification message may be further displayed in a display policy service in this embodiment of this application. The content of the displayed notification message is not limited in this embodiment of this application. In addition, after the user touches the display of the mobile phone each time, content displayed on an information display interface of the notification message on the display of the mobile phone is not limited to the foregoing manners and content mentioned in this embodiment of this application. Information is displayed, according to a user requirement, on the information display interface of the notification message at a location at which the display of the mobile phone is touched each time. Moreover, the quantity of taps of tapping the to-be-operated object by the user on the display is not limited in this embodiment of this application. The touch duration of the single touch on the to-be-operated object, the touch strength of tapping the to-be-operated object, the sliding distance of the single touch on the to-be-operated object may also be divided into more layers, and are not limited to three layers obtained through division based on the first threshold or the first pressure threshold and the second threshold or the second pressure threshold (namely, a layer that is less than the first threshold or the first pressure threshold is a first layer, a layer that is between the first threshold or the first pressure threshold and the second threshold or the second pressure threshold is a second layer, and a layer that is greater than the second threshold or the second pressure threshold is a third layer).

Further, in some embodiments of this application, a message of the to-be-operated object may be displayed on the top, the bottom, the left, and the right of the screen of the mobile phone in a notification manner. For example, the to-be-operated object is a notification message of an app, or may be displayed in a form of an email, an SMS message, an attachment, or the like. Moreover, in addition to being displayed on the top and the bottom of the mobile phone in a notification message manner, the to-be-operated object may alternatively be displayed at any location on the display of the mobile phone in a prompt box, a card, a floating window, a tip (Tips), or the like. This is not limited in this embodiment of this application.

In addition, the first content, the second content, and the third content are related to each other. For example, the second content includes the first content, and the third content includes the second content. Certainly, the first content, the second content, and the third content may be independently displayed, that is, the first content, the second content, and the third content have no inclusion relationship. Details of the first content, the second content, and the third content are not limited herein in this embodiment of this application.

The first content, the second content, and the third content each may include an operation control for performing an operation on the to-be-operated object, for example, a reply function button.

Therefore, when the user views the detailed content in the notification message or performs an operation on the detailed content in the notification message, jumping between the operation interface currently browsed by the user and an app corresponding to the notification message is avoided, CPU resource occupation of the mobile phone due to an application jumping process is avoided, and freezing of the mobile phone is also avoided, thereby improving user experience.

The following describes in detail the technical solutions in embodiments of this application with reference to specific scenarios.

Scenario 1

In the scenario 1, the interaction method provided in embodiments of this application is described by using an example in which an electronic device is a mobile phone and Messages is installed on the mobile phone. When the mobile phone receives a notification message in Messages, after a touch operation corresponding to a type of touch manner is performed on the notification message of a display, for the quantity of content included in the notification message, all content included in the notification message is completely displayed at an upper layer of an operation interface currently browsed by a user. For a content type of the notification message, information (including a function button and a push that is related to the content type of the notification message) related to the content type of the notification message is further displayed based on the touch operation performed by the user on the display. Certainly, the notification message may alternatively be directly popped up on the display. Alternatively, the user may slide up or down on the screen of the mobile phone to expand the notification message. A manner of expanding the notification message is not limited in this embodiment of this application.

The content type of the notification message may be classified into text content, voice content, streaming media content, link or attachment content, foreign word content, and the like.

Figure 5A:
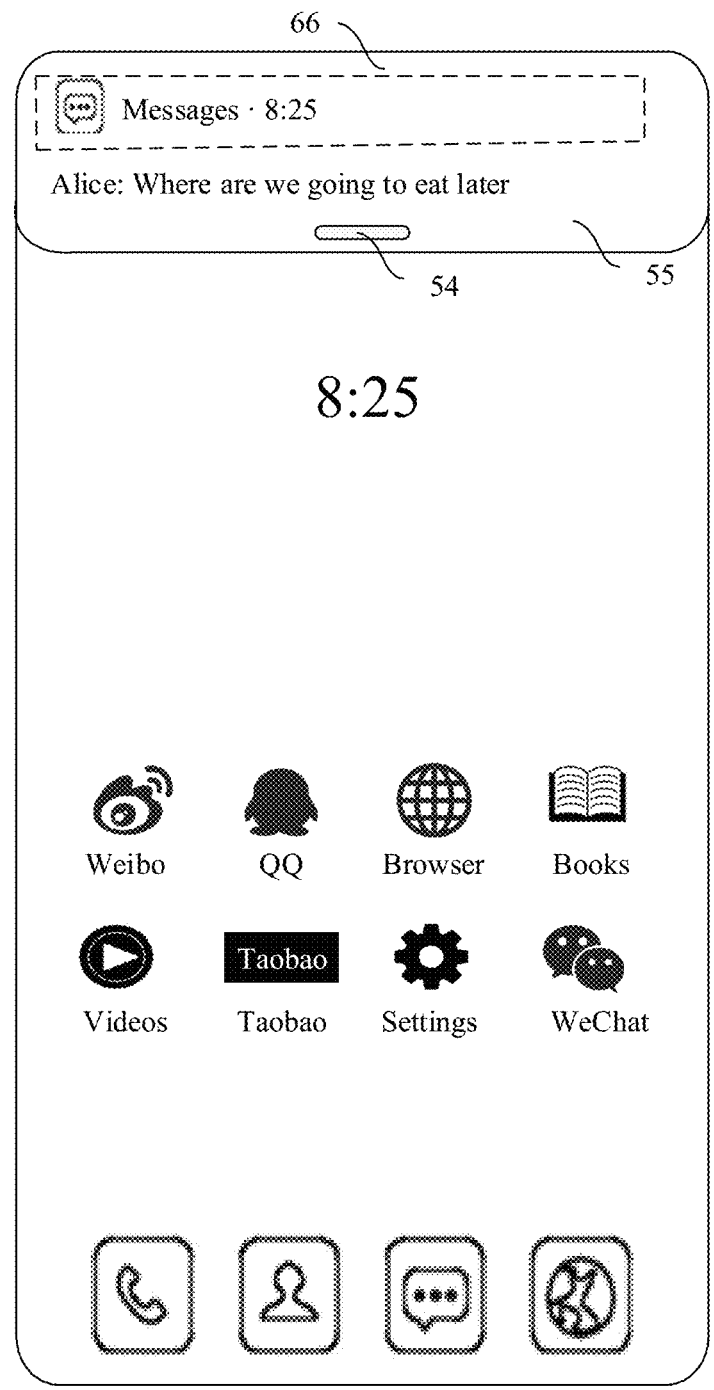
FIG. 5A(a) to FIG. 5K(b) are diagrams of mobile phone interface statuses in a scenario 1 according to an embodiment of this application.
Figure 5A:
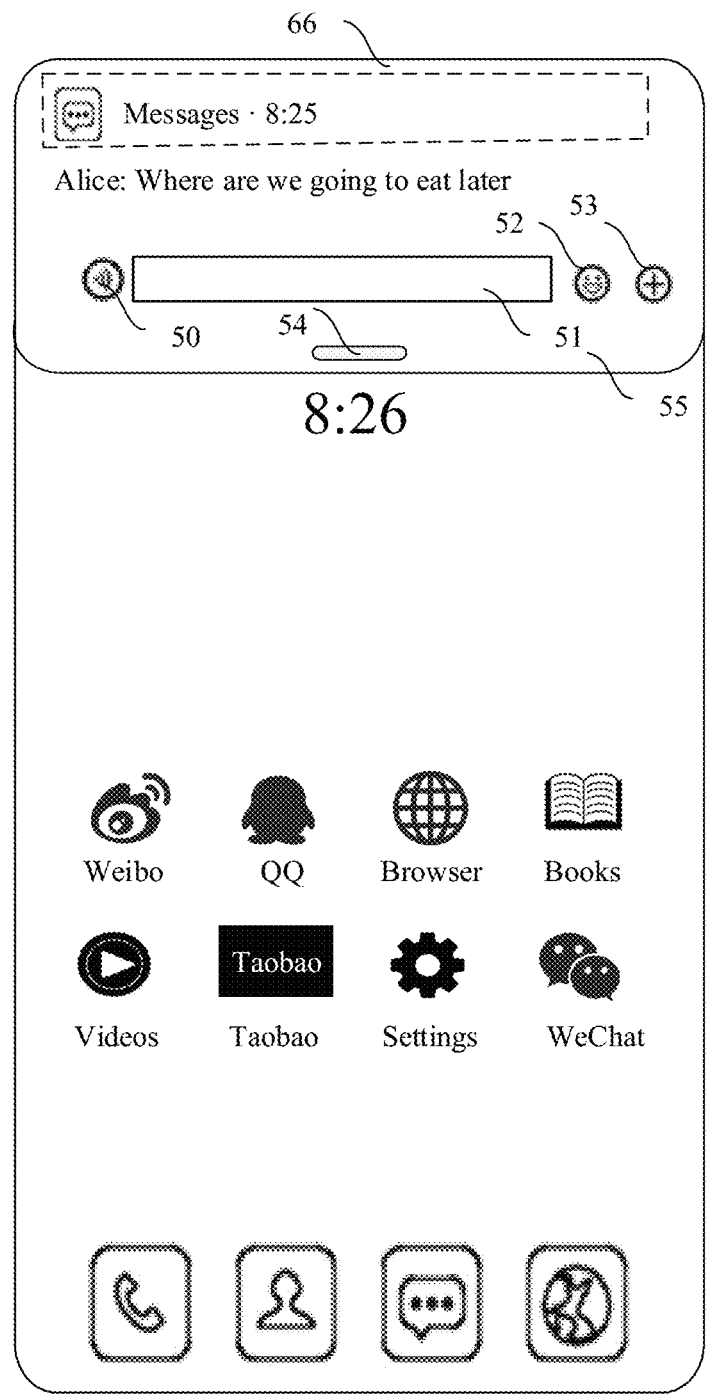
Figure 5A:
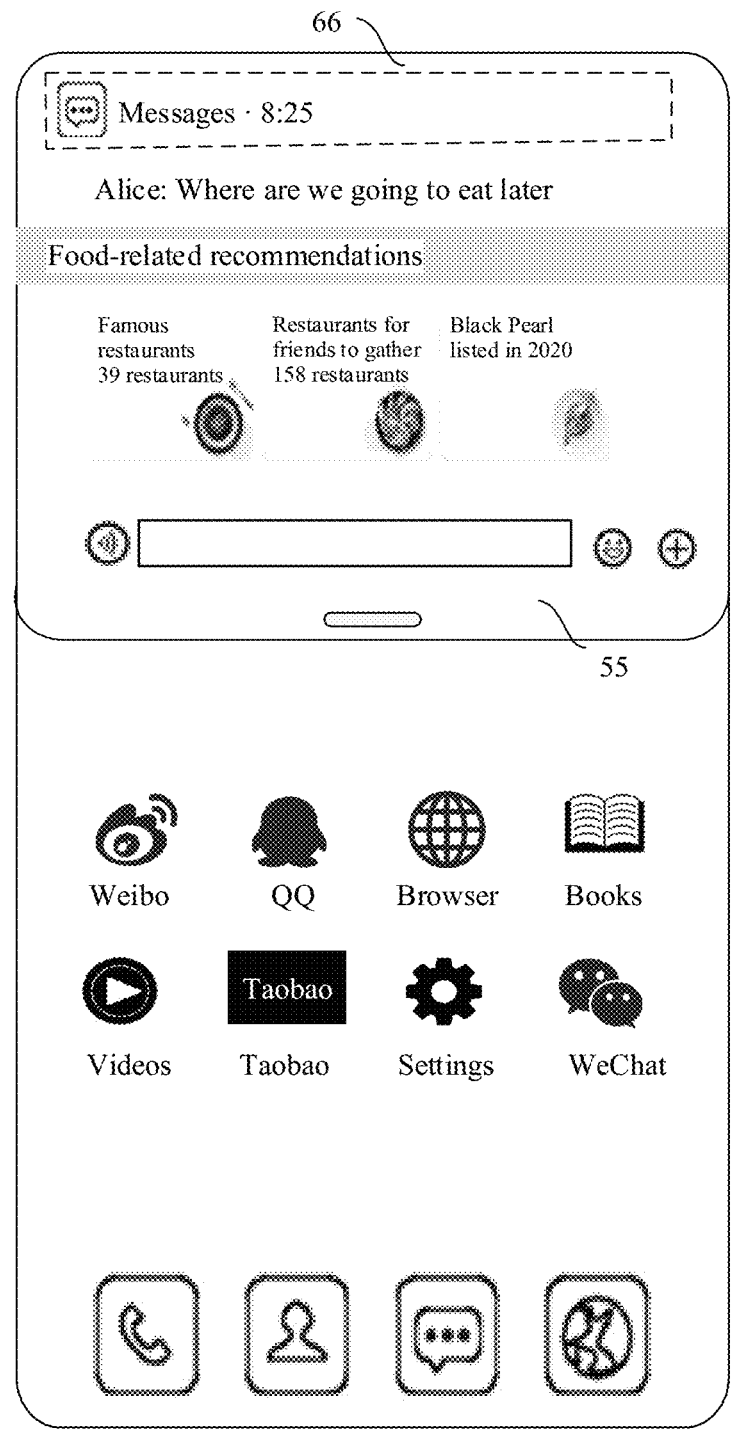

For example, as shown in FIG. 5A(a), when the mobile phone receives the notification message in Messages, the notification message may automatically be popped up, and is displayed at the upper layer of the operation interface currently browsed by the user (for example, if the user is currently browsing Taobao, the notification message in Messages is displayed at an upper layer of the currently browsed Taobao interface). Alternatively, the user may slide up or down on the display of the mobile phone to trigger the notification message to pop up, and the notification message is displayed at the upper layer of the operation interface currently browsed by the user (for example, if the user is currently browsing Taobao, the notification message in Messages is displayed at the upper layer of the currently browsed Taobao interface). At least one piece of the following information is displayed in the first line of the notification message: an icon format (ICON), a message source, and a receiving time (where the icon format (ICON), the message source, and the receiving time are indicated in a dashed box 66). Optionally, part text content "Alice: Where are we going to eat later" of the notification message may be further displayed in the second line of the notification message. As shown in FIG. 5A(b), the user touches an information display interface 55 of the notification message in Messages or taps a pull-down button 54. The pull-down button 54 may be a long bar 54 shown in FIG. 5A(a), or may be in another type of shape, such as a circle or a square. A shape of the pull-down button is not limited in this embodiment of this application. On the operation interface currently browsed by the user, the notification message is further expanded, and a reply function button (used as an operation control of a to-be-operated object) is displayed in the third line of the information display interface 55 of the notification message. A voice input button 50 (a voice reply) is on the left of the reply function button, a text input box 51 (a text, a link, or the like) is in the middle of the reply function button, and an emoji input button 52 and an additional button 53 (a video reply, a picture reply, a GIF reply, or the like) are on the right of the reply function button. The user can reply to the peer party by using the reply function button. As shown in FIG. 5A(c), when the user touches (a touch operation) again the interface of the notification message of Messages in FIG. 5A(b) or taps the pull-down button 54, on the operation interface currently browsed by the user, the notification message is further expanded, and the further expanded notification message may display recommendation information related to the content of the SMS message. For example, a processor of the mobile phone performs semantic analysis on the content of the current SMS message, and parses out a keyword "food", to display "food-related recommendations" in the third line of the notification message. Optionally, a reply function button may be further displayed in the fourth line. Specific recommendation content below "food-related recommendations" displayed in the third line may be "a quantity of famous restaurants", "a quantity of restaurants for friends to gather", and a recommended food "Black Pearl".

Further, the user may tap again the interface of the notification message or tap the pull-down button 54, to further display more content on the interface of the notification message. A type of the displayed content may be not limited herein in this embodiment of this application. It should be noted that the touch operation includes tapping, sliding down, touching and holding, or the like.

Figure 5B:
Figure 5B:
Figure 5B:
Figure 5B:
Figure 5B:
Figure 5B:
Figure 5B:
Figure 5B:
Figure 5B:
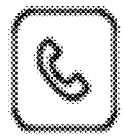
Figure 5B:
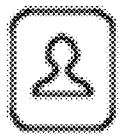
Figure 5B:
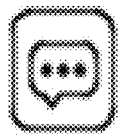
Figure 5B:
Figure 5B:
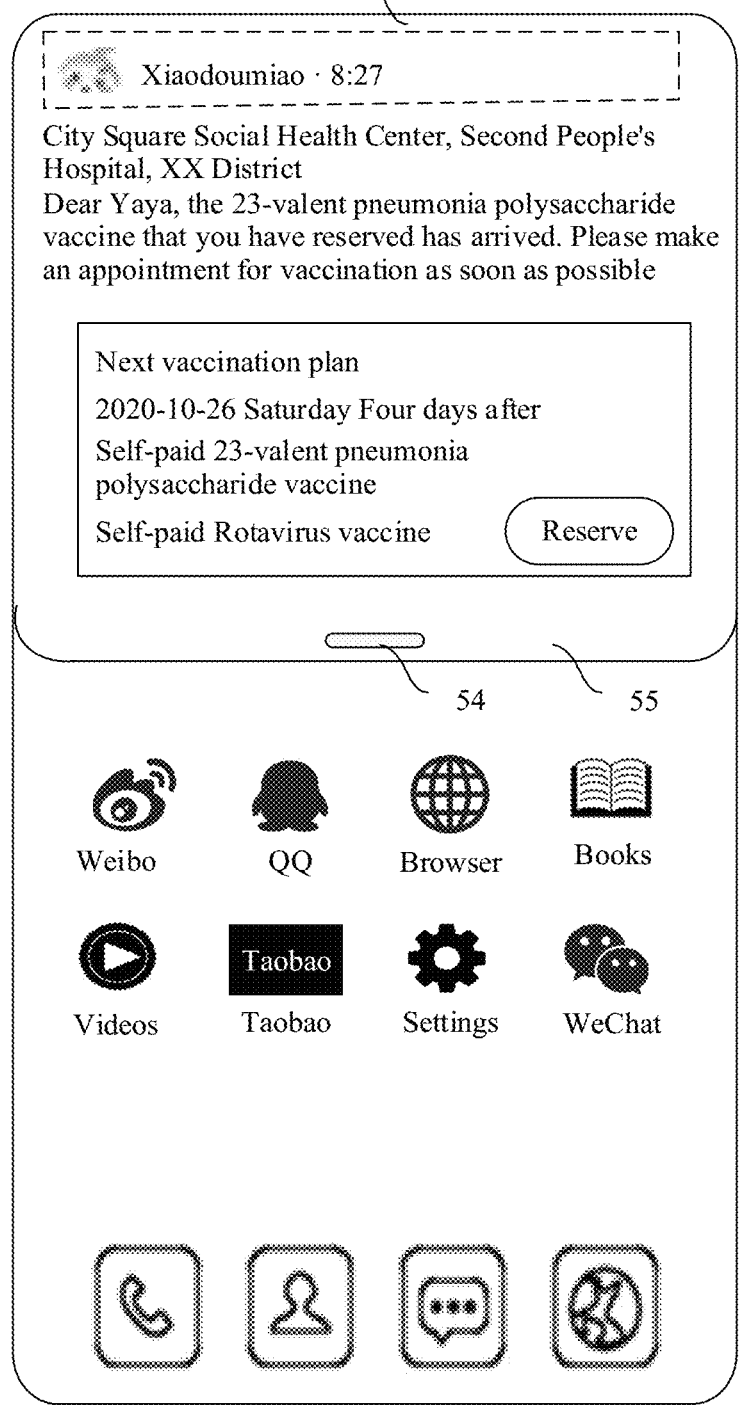
Figure 5B:
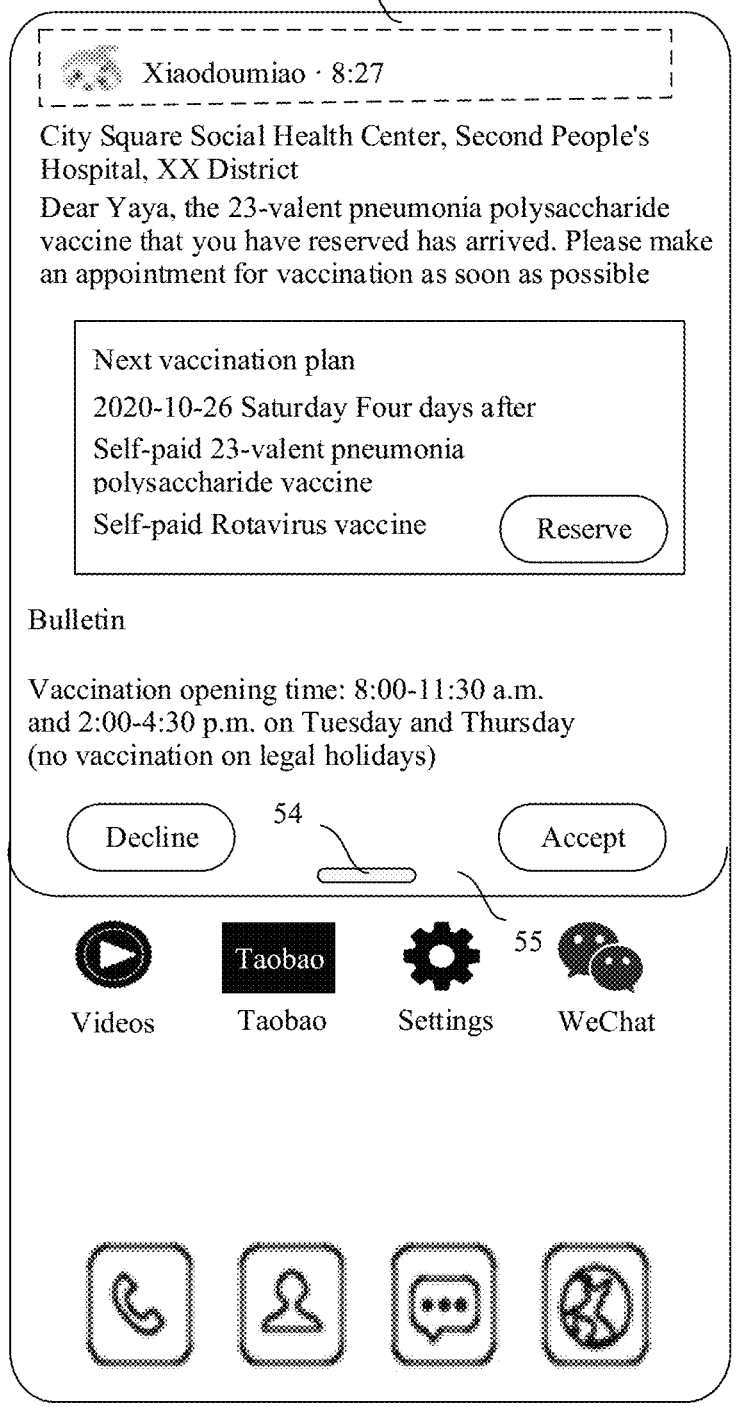
Figure 5B:
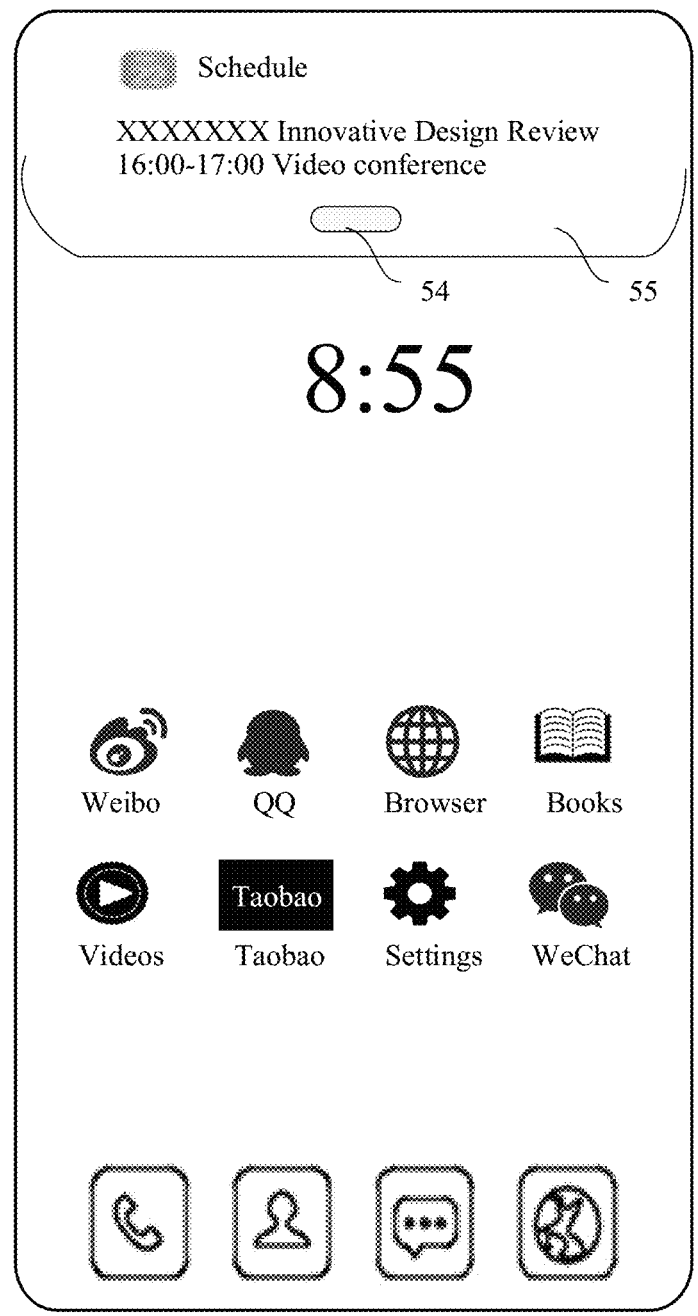
Figure 5B:
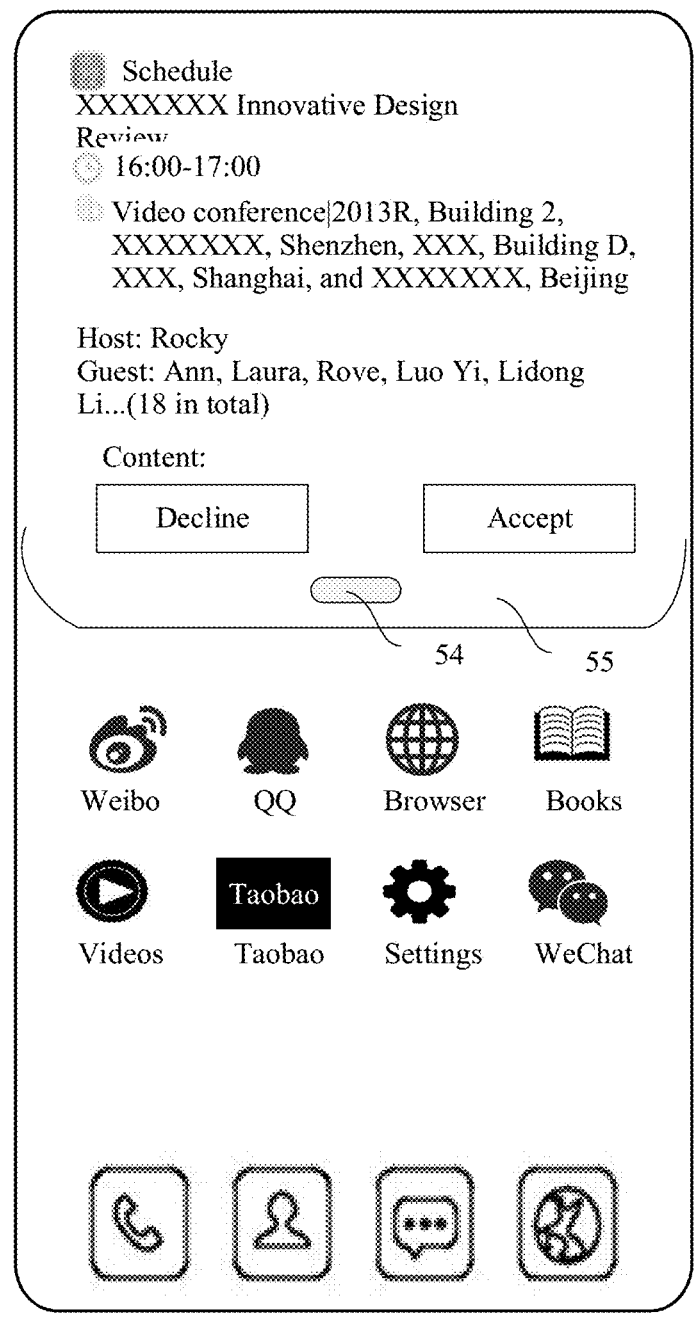

For example, as shown in FIG. 5B(a), for a notification message of a third-party application, the interaction method in embodiments of this application may also be applied to the third-party application. After a third-party application Xiaodoumiao sends a prompt-type notification message, the notification message is displayed on the top of the screen of the mobile phone and displayed at the upper layer of the operation interface currently browsed by the user. At least one piece of the following information is displayed in the first line of the notification message: an icon format (ICON), a message resource, and a receiving time (where the icon format (ICON), the message source, and the receiving time are indicated in a dashed box 67). Part text content "Dear Alice, the 23-valent pneumonia vaccine that you have reserved . . . " of the notification message may be displayed in the second line of the notification message. As show in FIG. 5B(b), when the user touches (a touch operation) an information display interface 55 of the notification message of the Xiaodoumiao application or taps the pull-down button 54 in FIG. 5B(a), on the operation interface currently browsed by the user, the notification message is further expanded. The information display interface 55 of the notification message completely displays all text information (the text shown in FIG. 5B(b)) included in the notification message, and includes a reservation button. It should be noted that the touch operation includes tapping, sliding down, touching and holding, or the like.

As shown in FIG. 5B(c), when the user touches again the information display interface 55 of the notification message in Messages shown in FIG. 5B(b) or taps the pull-down button 54, on the operation interface currently browsed by the user, the notification message is further expanded. A bulletin and all texts included in the bulletin are displayed in the notification message of Xiaodoumiao. In addition, as shown in FIG. 5B(c), icons "Decline" and "Accept" are displayed below the bulletin texts, and the user may tap "Decline" or "Accept" to accept the notification message or choose to ignore the notification message.

Further, for a prompt-type notification message, the prompt-type notification message may further be a notification message sent by a Schedule application. As shown in FIG. 5B(d), after Schedule sends a prompt-type notification message, the notification message is displayed on the top of the screen of the mobile phone and displayed at the upper layer of the operation interface currently browsed by the user. At least one type of the following information is displayed in the first line of the notification message: an icon format (ICON) and a message source. Part text content "A subject of a video conference and a time of the video conference" of the notification message may be displayed in the second line and the third line of the notification message. As shown in FIG. 5B(e), when the user touches an information display interface 55 of the notification message of the Schedule application or taps the pull-down button 54 in FIG. 5B(d), on the operation interface currently browsed by the user, the notification message is further expanded. All text information (texts shown in FIG. 5B(e)) included in the notification message is completely displayed on the information display interface of the notification message, and the operation buttons of "Decline" and "Accept" are included. It should be noted that the touch operation includes tapping, sliding down, touching and holding, or the like.

Figure 5C:
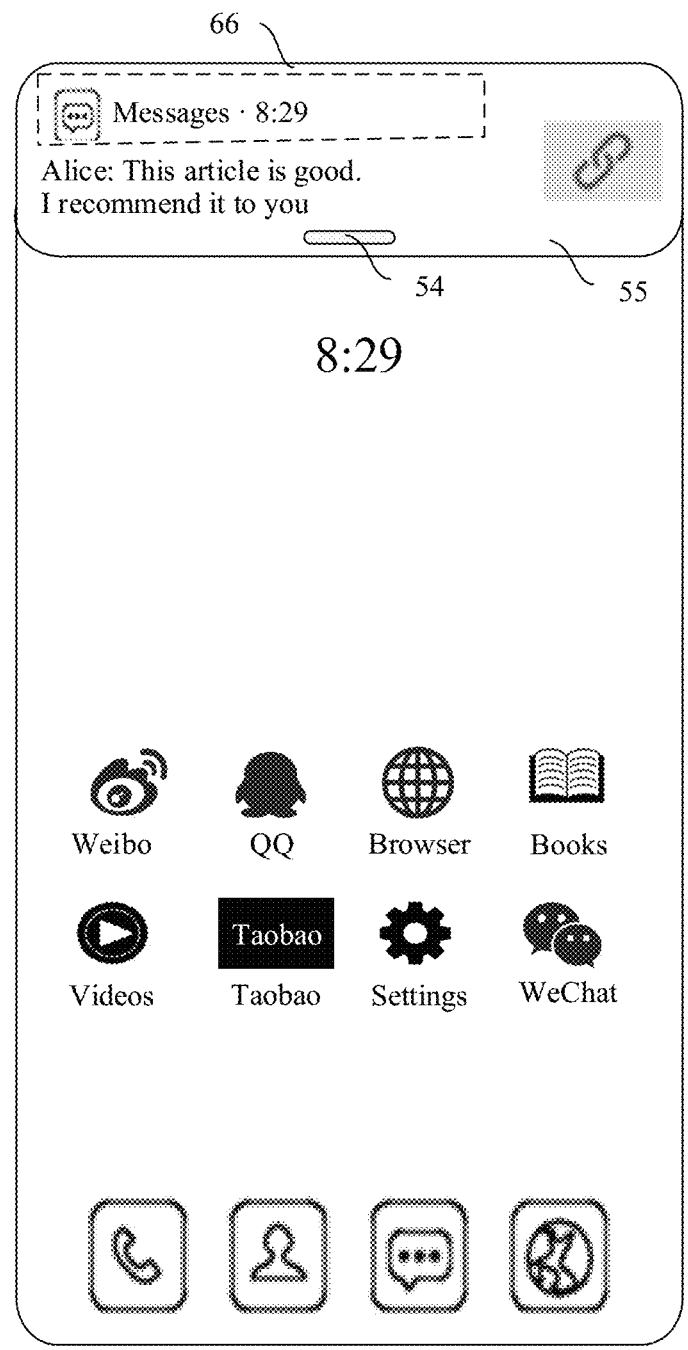
Figure 5C:
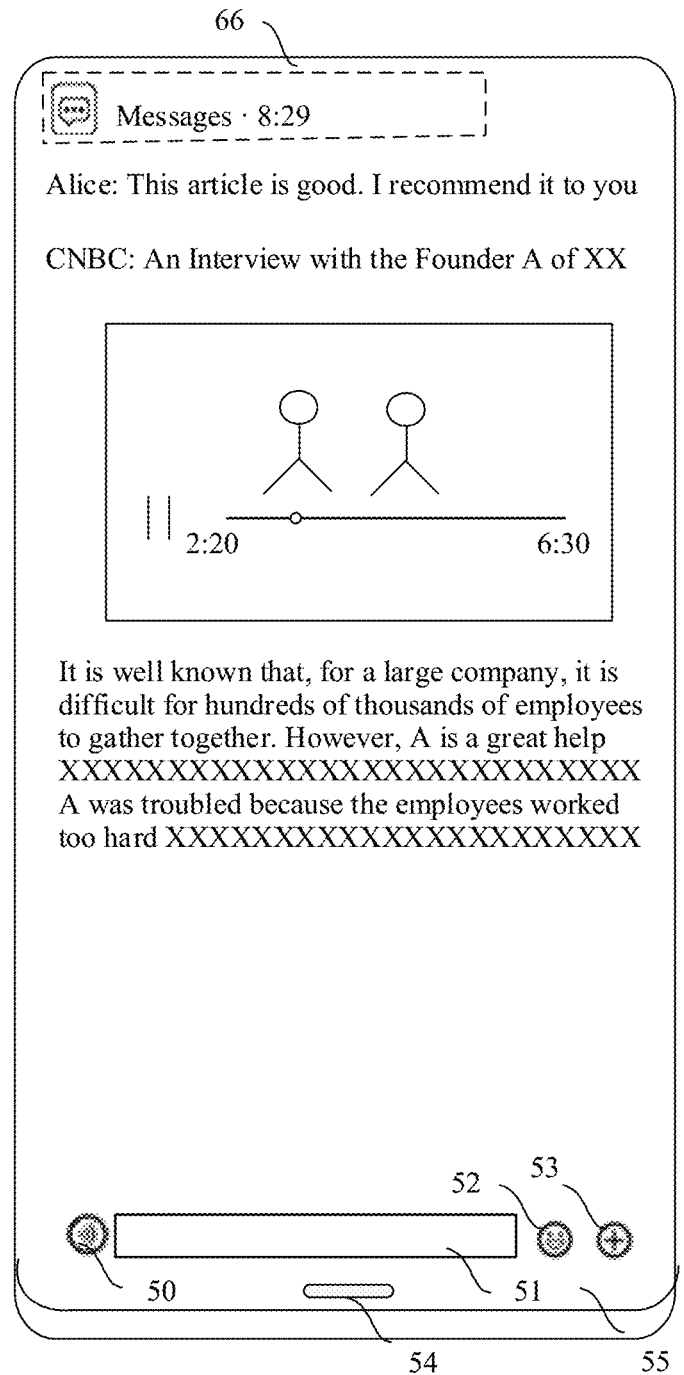
Figure 5C:
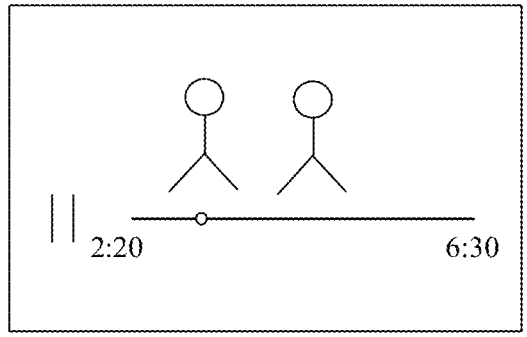

For example, as shown in FIG. 5C(a), when a notification message in Messages carries a link or an attachment, an information display interface 55 of the notification message is displayed on the top of the screen of the mobile phone and displayed at the upper layer of the operation interface currently browsed by the user. At least one type of the following information is displayed in the first line on the left of the information display interface 55 of the notification message: an icon format (ICON), a message source, and a receiving time (where the icon format (ICON), the message source, and the receiving time are indicated in the dashed box 66). Detailed text content "Alice: This article is good. I recommend it to you" may be displayed below the first line of the text display area on the left, and a link icon is displayed on the right of the information display interface 55 of the notification message. As shown in FIG. 5C(b), when the user touches the information display interface 55 of the notification message in Messages or taps the pull-down button 54 shown in 5C(a), on the operation interface currently browsed by the user, the notification message is further expanded. Because the link includes an excessively large amount of data, the information display interface 55 of the notification message may be displayed in full screen on the entire screen of the mobile phone. The reply function button is displayed on the bottom of the mobile phone, the voice input button 50 (a voice reply) is on the left of the reply function button, the text input box 51 (a text, a link, or the like) is in the middle of the reply function button, and the emoji input button 52 and the additional button 53 (a video reply, a picture reply, a GIF reply, or the like) are on the right of the reply function button. The user can reply to the peer party by using the reply function button. As shown in FIG. 5C(c), when the user touches again the information display interface 55 of the notification message in Messages shown in 5C(b) or taps the pull-down button 54, the reply function button displayed on the bottom of the screen of the mobile phone, the pull-down button, and the icon format (ICON), the message source, and the receiving time (where the icon format (ICON), the message source, and the receiving time are indicated in the dashed box 66) that are displayed in the first line on the top of the screen of the mobile are automatically hidden. The detailed text content "Alice: This article is good. I recommend it to you" and a subject "An Interview with the Founder XXX of XX" of the linked article are displayed below the first line of the text display area on the left. Only body content is displayed on the screen of the mobile phone. It should be noted that the touch operation includes tapping, sliding down, touching and holding, or the like.

In addition, in some embodiments of this application, if the content in the link cannot be completely displayed on the entire screen of the mobile phone, the user may slide up or slide down on the screen of the mobile phone in a scroll bar manner to completely view the text carried in the link.

Figure 5D:
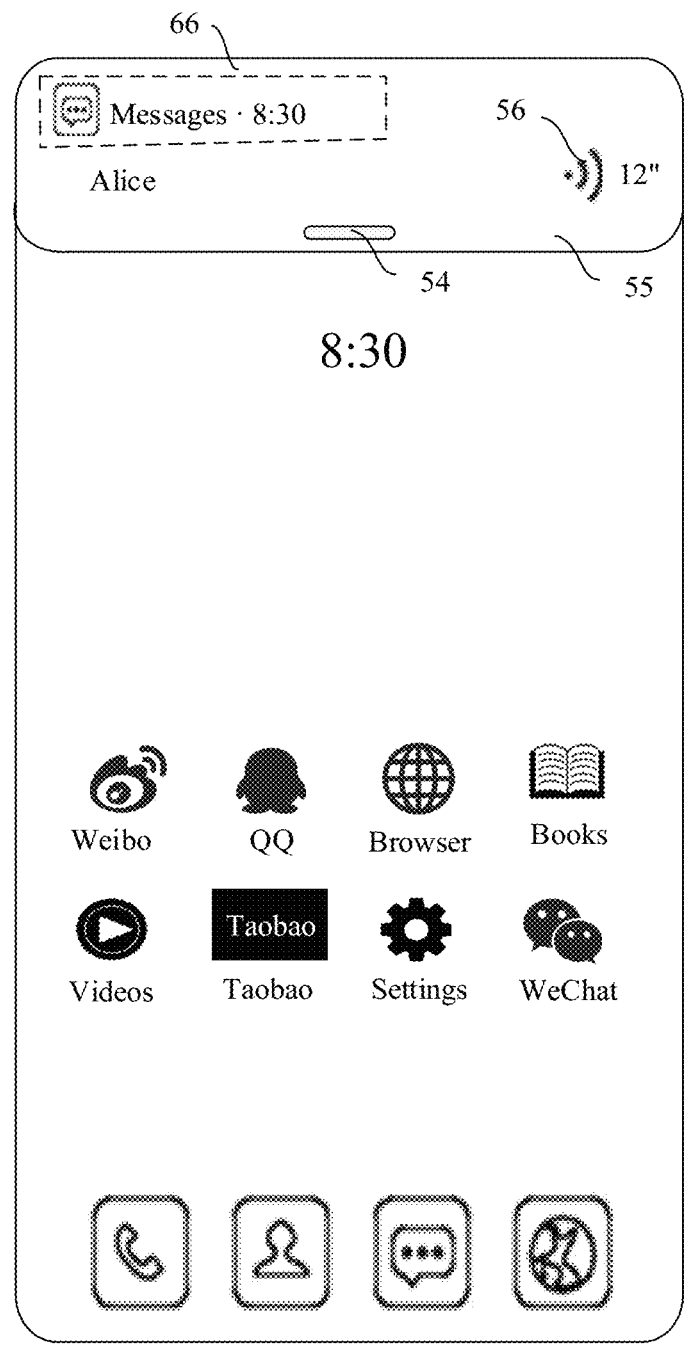
Figure 5D:
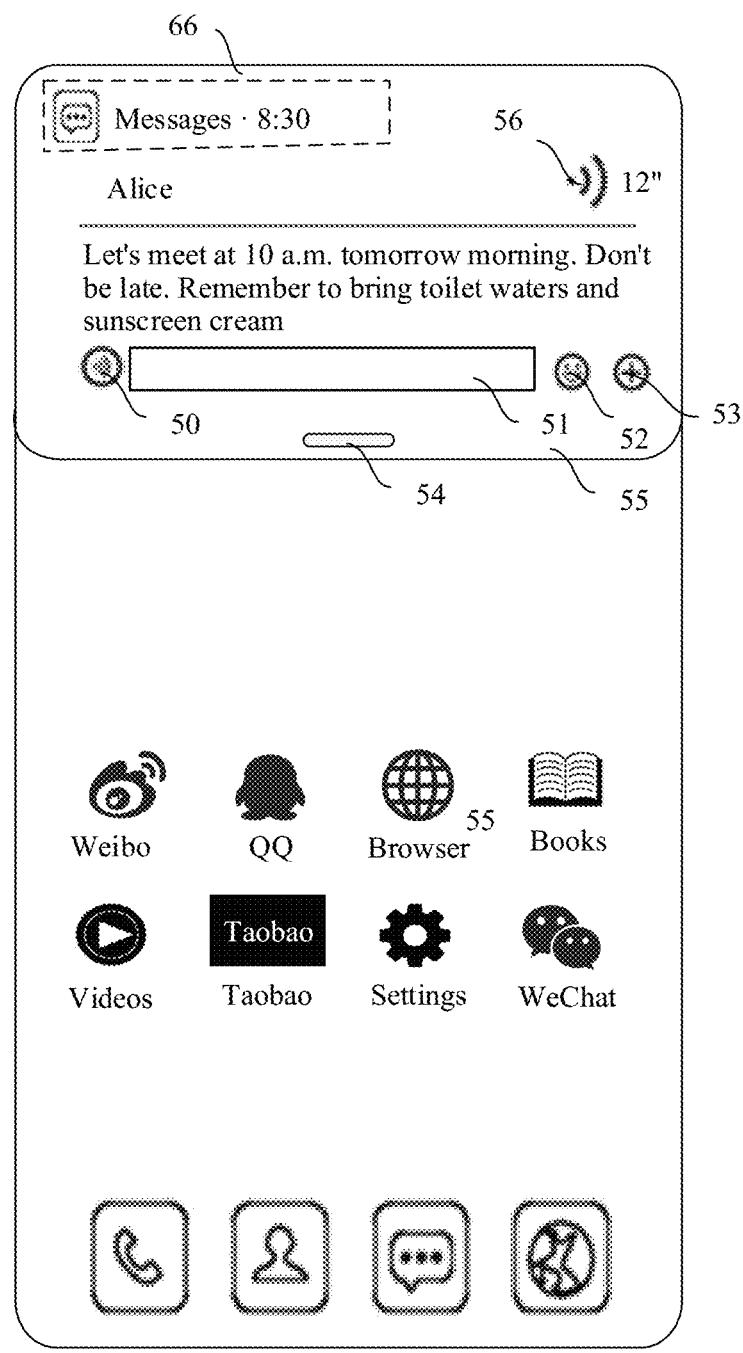

For example, as shown in FIG. 5D(a), when a notification message in Messages carries an audio icon, it indicates that the message includes an audio clip. An information display interface 55 of the notification message is displayed on the top of the screen of the mobile phone and displayed at the upper layer of the operation interface currently browsed by the user. At least one type of the following information may be displayed in the first line of the information display interface 55 of the notification message: a display icon format (ICON), a message source and a receiving time (where the icon format (ICON), the message source, and the receiving time are indicated in the dashed box 66). A source person Alice may be displayed on the left of the second line of the information display interface of the notification message, and an audio symbol 56 may be displayed on the right of the second line on the information display interface of the notification message. As shown in FIG. 5D(b), when the user touches the information display interface of the notification message in Messages shown in FIG. 5D(a) or taps the pull-down button 54, on the operation interface currently browsed by the user, the notification message is further expanded, and the audio clip included in FIG. 5D(a) is automatically converted into Chinese words and displayed on the information displaying interface 55 of the notification message. Below the translated Chinese words, the reply function button is further displayed, the voice input button 50 (a voice reply) is on the left of the reply function button, the text input button 51 (a text, a link, or the like) is in the middle of the reply function button, and the emoji input button 52 and the additional button 53 (a video reply, a picture reply, a GIF reply, or the like) are on the right of the reply function button. The user can reply to the peer party by using the reply function button. Further, when the user touches again the information display interface 55 of the notification message in Messages or taps the pull-down button 54, more information may be displayed on the information display interface 55 of the notification message, for example, a product recommendation related to the translated Chinese words "sunscreen cream". It should be noted that the touch operation includes tapping, sliding down, touching and holding, or the like.

Figure 5E:
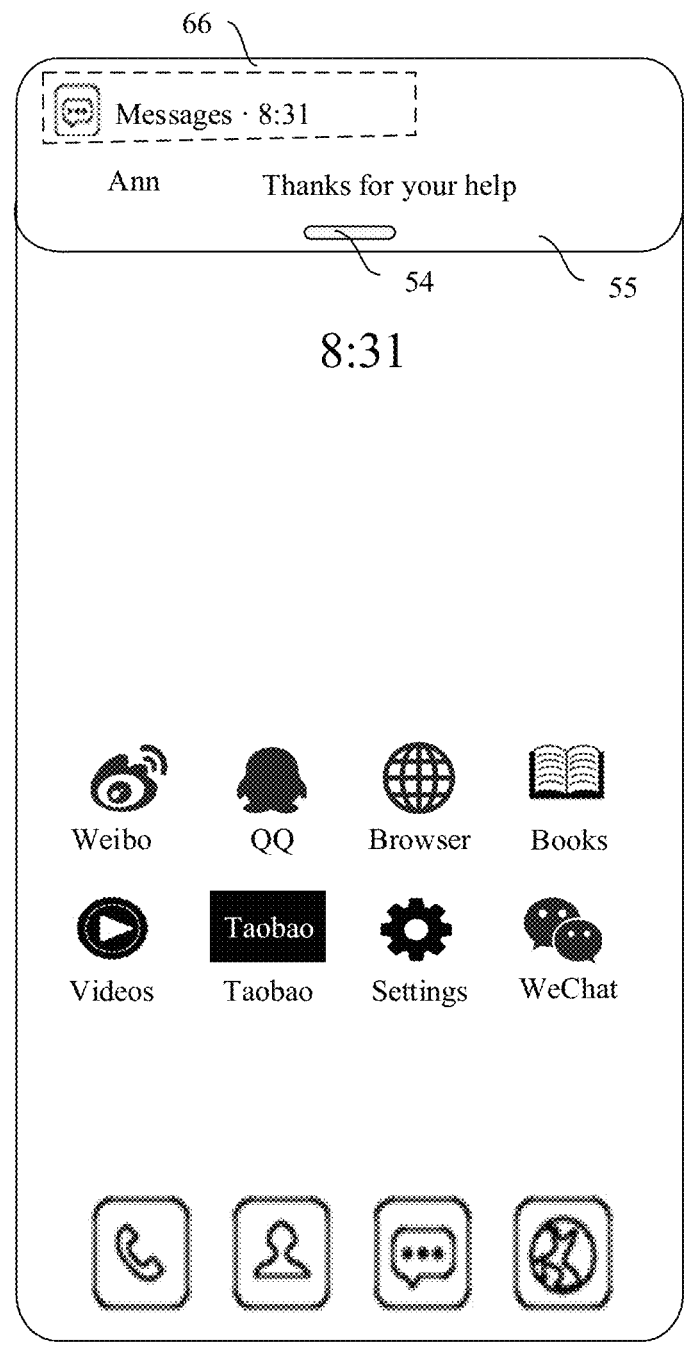
Figure 5E:
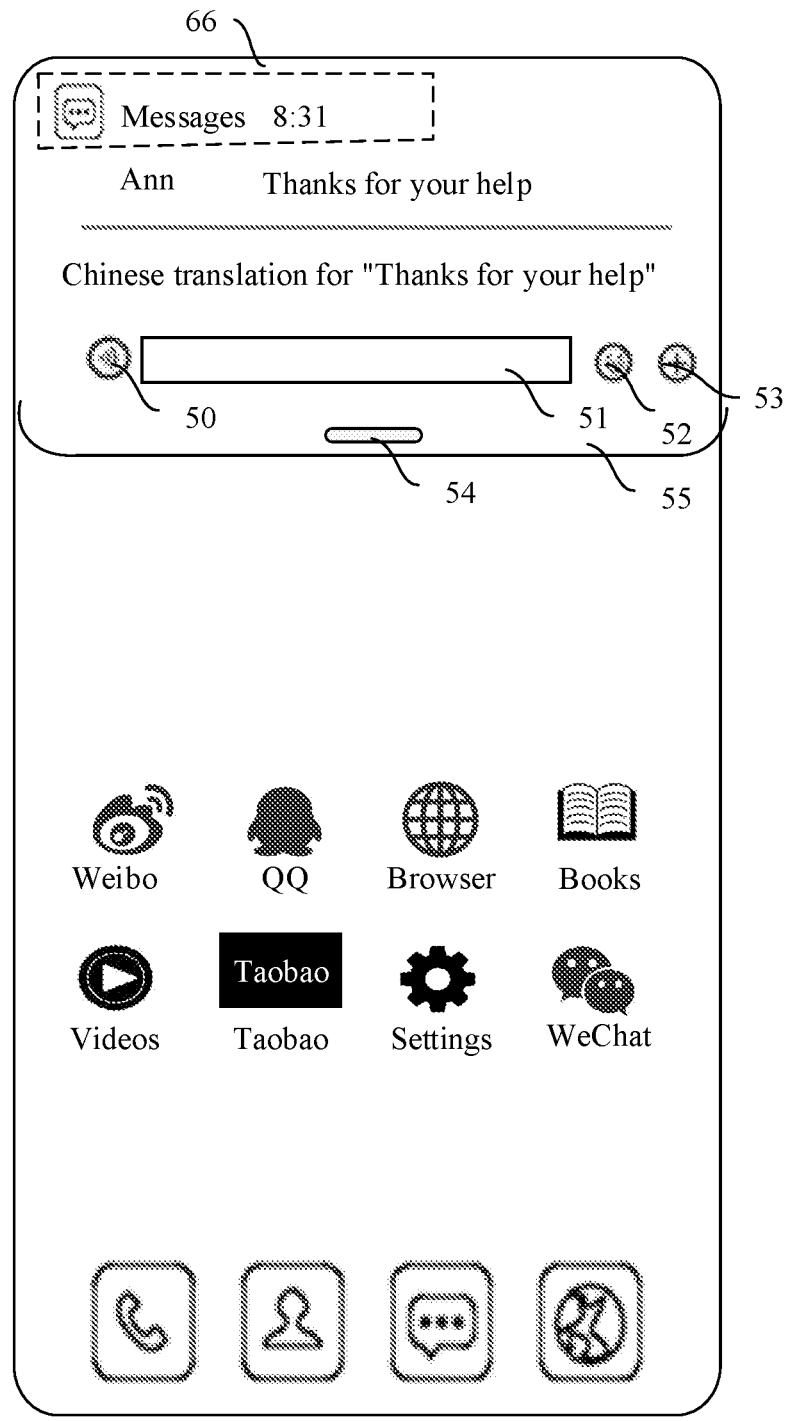

For example, as shown in FIG. 5E(a), a notification message in Messages carries a language different from a system language that is set. For example, a current operating system is in Chinese, and a received message is in English. In this case, an information display interface 55 of the notification message is displayed on the top of the screen of the mobile phone and displayed at the upper layer of the operation interface currently browsed by the user. At least one type of the following information may be displayed in the first line of the information display interface of the notification message: an icon format (ICON), a message source and a receiving time (where the icon format (ICON), the message source, and the receiving time are indicated in the dashed box 66). A source person "Ann" and foreign information "Thanks for your help" are displayed in the second line of the information display interface of the notification message. As shown in FIG. 5E(b), when the user touches the information display interface 55 of the notification message in Messages shown in FIG. 5E(a) or taps the pull-down button 54, on the operation interface currently browsed by the user, the notification message is further expanded, and the foreign words included in FIG. 5E(a) are automatically translated into Chinese words and displayed on the information display interface 55 of the notification message. Below the translated Chinese words, the reply function button is further displayed, the voice input button 50 (a voice reply) is on the left of the reply function button, the text input button 51 (a text, a link, or the like) is in the middle of the reply function button, and the emoji input button 52 and the additional button 53 (a video reply, a picture reply, a GIF reply, or the like) are on the right of the reply function button. The user can reply to the peer party by using the reply function button. Further, when the user touches again the information display interface 55 of the notification message in Messages or taps the pull-down button 54, more information may be displayed on the information display interface 55 of the notification message. For example, a corresponding gift recommendation is provided for the user to select. It should be noted that the touch operation includes tapping, sliding down, touching and holding, or the like.

In some embodiments of this application, the user may alternatively tap the notification message on the display, and slide down from the top of the screen of the mobile phone, so that the content shown in FIG. 5A(a) to FIG. 5E(c) is displayed in sequence on the information display interface of the notification message. Further, the user may alternatively touch and hold the notification message on the display. Based on touch duration for which the touch operation is performed on the display, the content shown in FIG. 5A(a) to FIG. 5E(c) is displayed in sequence on the information display interface of the notification message. Further, the notification message may alternatively be displayed on the bottom of the screen of the mobile phone and displayed at the upper layer of the operation interface currently browsed by the user. According to the forgoing descriptions, the user may touch the information display interface of the notification message in Messages, or tap the pull-down button 54, or tap the notification message on the display and slide up from the bottom of the screen of the mobile phone, so that the content shown in FIG. 5A(a) to FIG. 5E(c) is displayed in sequence on the information display interface of the notification message. Much further, the notification message may alternatively be displayed on the left or the right of the screen of the mobile phone and displayed at the upper layer of the operation interface currently browsed by the user. According to the forgoing descriptions, the user may touch the information display interface of the notification message in Messages, or tap the pull-down button 54, or tap the notification message on the display and slide from the left to the right of the screen of the mobile phone or slide from the right to the left of the screen of the mobile phone, so that the content shown in FIG. 5A(a) to FIG. 5E(c) is displayed in sequence on the information display interface of the notification message. In addition, when the user performs an operation on a notification message on the screen of the mobile phone, a sequence and content of detailed content displayed on an information display interface of the notification message are not limited to the manner and content mentioned above in this embodiment of this application. For example, the sequence of the detailed content displayed on the information display interface of the notification message may alternatively be as follows: The notification message is popped up on the top or bottom of the mobile phone. When the user taps the notification message for the first time, the content shown in FIG. 5A(c), FIG. 5B(c), and FIG. 5C(c) may be displayed on the information display interface of the notification message, and the processes in FIG. 5A(b), FIG. 5B(b), FIG. 5C(b), FIG. 5D(b), and FIG. 5E(b) do not need to be performed. When the user taps the notification message for the second time, the information display interface of the notification message may be retracted from FIG. 5A(c), FIG. 5B(c), or FIG. 5C(c) to FIG. 5A(a) or FIG. 5A(b), FIG. 5B(a) or FIG. 5B(b), FIG. 5C(a) or FIG. 5C(b), FIG. 5D(a) or FIG. 5D(b), or FIG. 5E(a) or FIG. 5E(b). Alternatively, when the user taps the notification message for the second time, the information display interface of the notification message may be retracted from FIG. 5A(c), FIG. 5B(c), or FIG. 5C(c) to FIG. 5A(b), FIG. 5B(b), FIG. 5C(b), FIG. 5D(b), or FIG. 5E(b). When the user taps the notification message for the third time, the information display interface of the notification message may be retracted from FIG. 5A(b), FIG. 5B(b), FIG. 5C(b), FIG. 5D(b), or FIG. 5E(b) to FIG. 5A(a), FIG. 5B(a), FIG. 5C(a), FIG. 5D(a), or FIG. 5E(a).

Figure 5F:
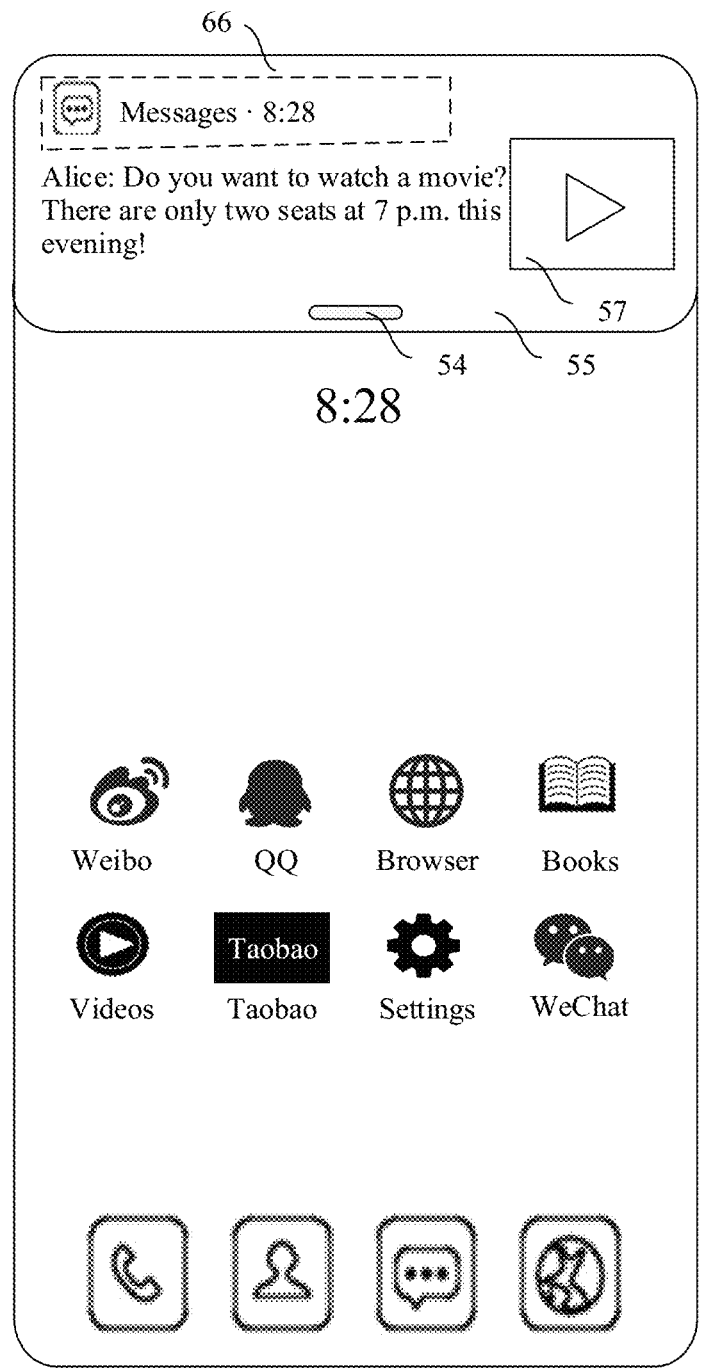
Figure 5F:
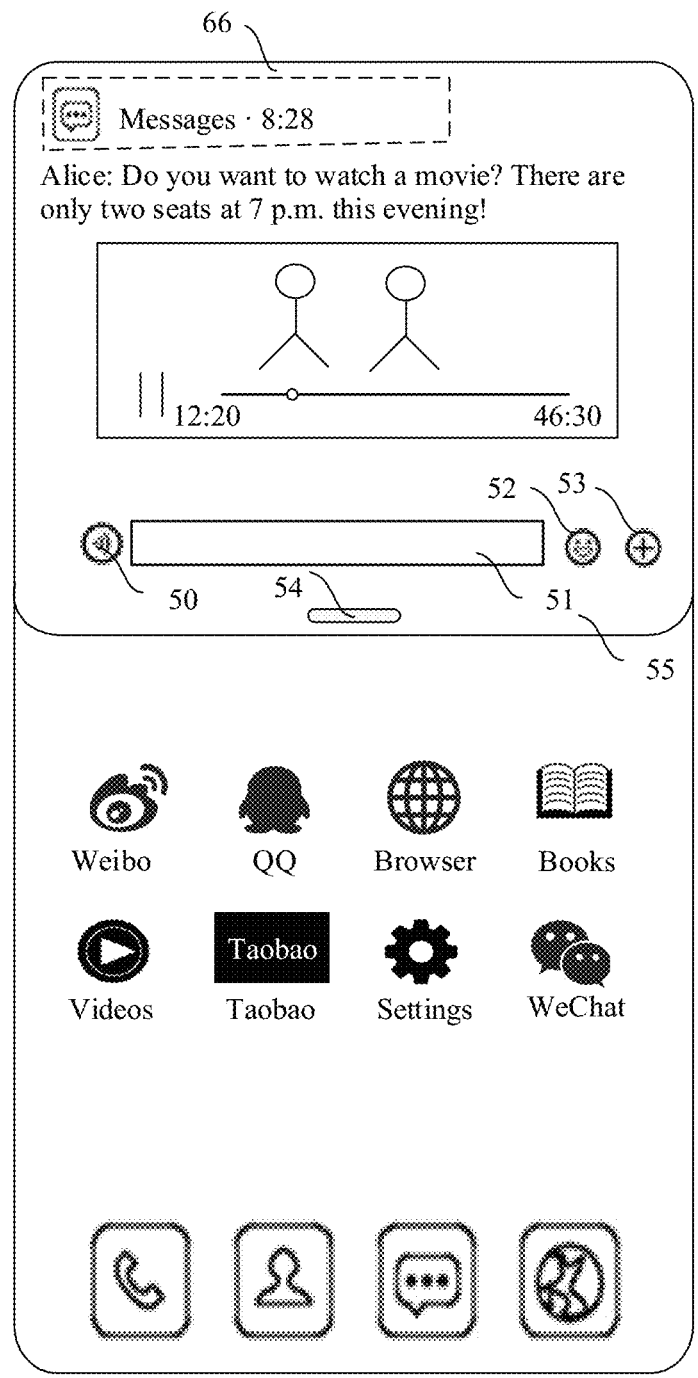
Figure 5F:
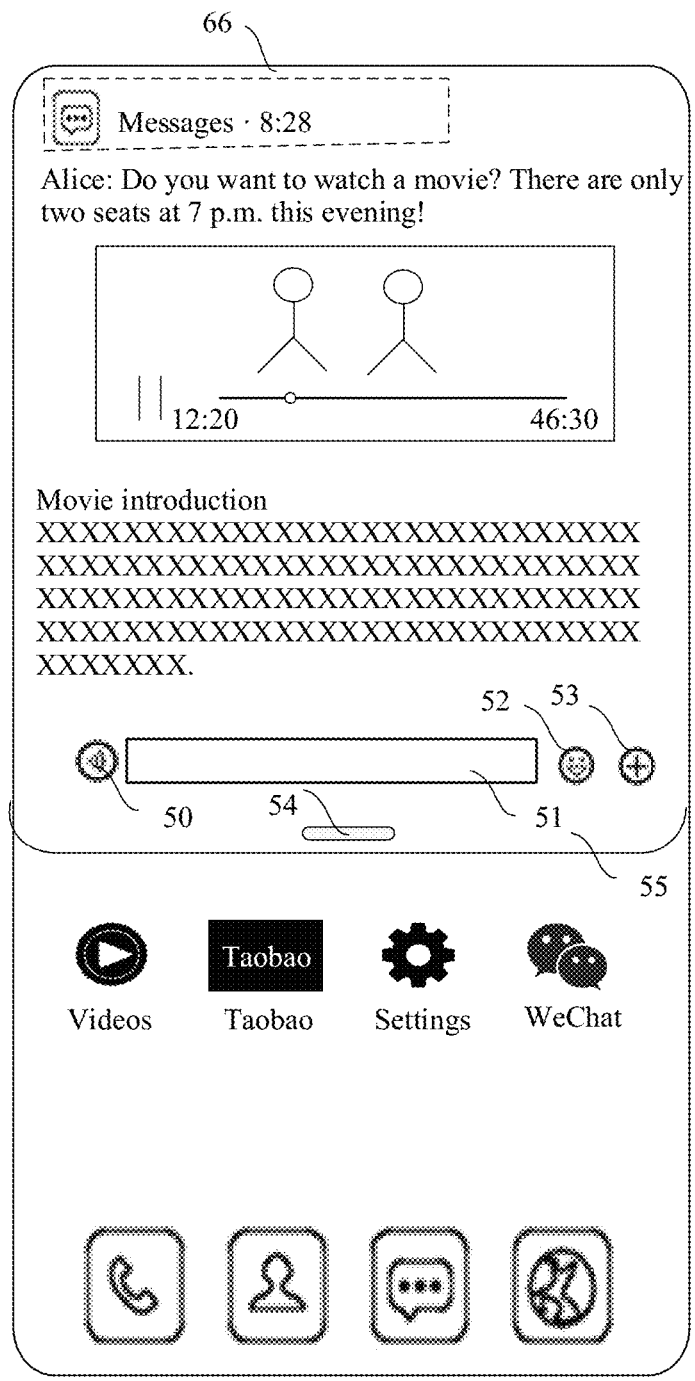

Further, the user may perform one, two, or more operations on the notification messages in FIG. 5A(a) to FIG. 5G2(c) one by one. This embodiment of this application is not limited to performing three tap operations on the notification messages in FIG. 5A(a) to FIG. 5G2(c). Therefore, as the examples shown in FIG. 5A(a) to FIG. 5G2(c), more content is hierarchically displayed at more layers. In addition, the applications in this embodiment of this application are not limited to the applications shown in FIG. 5A(a) to FIG. 5G2(c). The application may alternatively be another type of application according to a user requirement. For example, as shown in FIG. 5F(a), when the notification message in Messages carries a video, an information display interface 55 of the notification message is displayed on the top of the screen of the mobile phone and displayed at the upper layer of the operation interface currently browsed by the user. At least one type of the following text information is displayed in the first line on the left of the information display interface 55 of the notification message: an icon format (ICON), a message source, and a receiving time (where the icon format (ICON), the message source, and the receiving time are indicated in the dashed box 66). Texts "Alice: Do you want to watch a movie? There are only two seats at 7 p.m. this evening!" may be displayed below the first line of the information display interface 55, and a video interface 57 is displayed on the right of the information display interface of the notification message. When the user touches the information display interface 55 of the notification message in Messages shown in FIG. 5F(a) or taps the pull-down button 54, as shown in FIG. 5F(b), on the operation interface currently browsed by the user, the notification message is further expanded. The text information in the notification message is displayed below the icon format (ICON), the message source, and the receiving time, in other words, below the dashed box 66. Below the text information, the video in the notification message is automatically played, the reply function button can be displayed below the video that is being played. The voice input button 50 (a voice reply) is on the left of the reply function button, the text input box 51 (a text, a link, or the like) is in the middle of the reply function button, and the emoji input button 52 and the additional button 53 (a video reply, a picture reply, a GIF reply, or the like) are on the right of the reply function button. The user can reply to the peer party by using the reply function button. As shown in FIG. 5F(c), when the user touches again the interface of the notification message in Messages in FIG. 5F(b) or taps the pull-down button 54, on the operation interface currently browsed by the user, the notification message is further expanded, and an introduction to the movie is displayed between the reply function button and the video. In some embodiments of this application, a size of the information display interface 55 of the notification message may be determined based on a data amount of information included in the notification message. Specifically, a screen size of the display of the mobile phone and a quantity of texts included in the notification message are determined. The information display interface 55 of the notification message is adjusted based on the quantity of texts included in the notification message, so that the content included in the notification message is completely displayed on the information display interface 55 of the notification message. It should be noted that the touch operation includes tapping, sliding down, touching and holding, or the like.

In addition, when the user performs an operation on the screen of the mobile phone, a sequence of detailed content displayed on an information display interface of a notification message is not limited to the manner mentioned above in this embodiment of this application. For example, the sequence of the detailed content displayed on the information display interface of the notification message may alternatively be as follows: The notification message is popped up on the top or bottom of the mobile phone. When the user taps the notification message for the first time, the content shown in FIG. 5F(c) may be directly displayed and the video may be directly played on the information display interface of the notification message, and the process in FIG. 5F(b) does not need to be performed. When the user taps the notification message for the second time, the information display interface of the notification message may be retracted from FIG. 5F(c) to FIG. 5F(a) or FIG. 5F(b). Alternatively, when the user taps the notification message for the second time, the information display interface of the notification message may be retracted from FIG. 5F(c) to FIG. 5F(b) and the video is played. When the user taps the notification message for the third time, the information display interface of the notification message may be retracted from FIG. 5F(b) to FIG. 5F(a). Moreover, content of the detailed content displayed on the information display interface of the notification message is not limited to the content mentioned above in this embodiment of this application.

Further, the user may perform one, two, or more operations on the notification messages in FIG. 5F(a) to FIG. 5F(c) one by one. This embodiment of this application is not limited to performing three tap operations on the notification messages in FIG. 5F(a) to FIG. 5F(c). Therefore, as the examples shown in FIG. 5F(a) to FIG. 5F(c), more content is hierarchically displayed at more layers. In addition, the applications in this embodiment of this application are not limited to the applications shown in FIG. 5F(a) to FIG. 5F(c). The application may alternatively be another type of application according to a user requirement.

It should be noted that, in this embodiment of this application, in addition to being popped up or displayed on the top of the screen of the mobile phone, the notification message of the application may be popped up on the bottom of the screen of the mobile phone. This has a same effect as being popped up on the top of the screen of the mobile phone.

For example, as shown in FIG. 5G1(a), when the notification message is a voice call, the information display interface 55 of the notification message is displayed on the bottom of the screen of the mobile phone and displayed at the upper layer of the operation interface currently browsed by the user. At least one of a hang-up button 58, a contact name 59, call duration 60, and a hands-free button 61 of the voice call may be displayed on the information display interface 55 of the notification message. As shown in FIG. 5G1(*b*), when the user touches the information display interface 55 of the notification message in Messages shown in FIG. 5G1(*a*) or taps a pull-up button 54, on the operation interface currently browsed by the user, more content of the hang-up button 58, the contact name 59, the call duration 60, a keyboard 62, a mute button 63, and the hands-free button 61 is displayed on the information displaying interface 55 of the notification message. As shown in FIG. 5G1(*c*), when the user touches again the information display interface 55 of the notification message in Messages shown in FIG. 5G1(*b*) or taps the pull-up button 54, the real-time voice call is automatically converted into Chinese words "OK, help me get the package" and the Chinese words are displayed on the information display interface 55 of the notification message. It should be noted that the touch operation includes tapping, sliding down, touching and holding, or the like.

For example, as shown in FIG. 5G2(*a*), when the notification message is a voice call, the information display interface 55 of the notification message may be further displayed on the top of the screen of the mobile phone and displayed at the upper layer of the operation interface currently browsed by the user. At least one type of the following information in the voice call is displayed on the information display interface 55 of the notification message: the hang-up button 58, the contact name 59, the call duration 60, and the hands-free button 61. As shown in FIG. 5G2(*b*), when the user touches the information display interface 55 of the notification message in Messages shown in FIG. 5G2(*a*) or taps the pull-down button 54, on the operation interface currently browsed by the user, the notification message is further expanded, and more content of the hang-up button 58, the contact name 59, the call duration 60, the keyboard 62, the mute button 63, and hands-free button 61 is displayed on the information displaying interface 55 of the notification message. As shown in FIG. 5G2(*c*), when the user touches again the information display interface 55 of the notification message in Messages shown in FIG. 5G2(*b*) or taps the pull-down button 54, the real-time voice call is automatically converted to the Chinese words "OK, help me get the package" and the Chinese words are displayed on the notification page. It should be noted that the touch operation includes tapping, sliding down, touching and holding, or the like.

In some embodiments of this application, when the notification message is a voice call, the information display interface 55 of the notification message is displayed on the top of the screen of the mobile phone and displayed at the upper layer of the operation interface currently browsed by the user. The user may further tap the notification message on the display and slide down from the top of the screen of the mobile phone, so that the content shown in FIG. 5G1(*a*), FIG. 5G1(*b*), FIG. 5G1(*c*), FIG. 5G2(*a*), FIG. 5G2(*b*), and FIG. 5G2(*c*) on the information display interface 55 of the notification message is displayed in sequence. Further, the user may alternatively touch and hold the notification message on the display. Based on touch duration for which the touch operation is performed on the display, the content shown in FIG. 5G1(*a*), FIG. 5G1(*b*), FIG. 5G1(*c*), FIG. 5G2(*a*), FIG. 5G2(*b*), and FIG. 5G2(*c*) is displayed in sequence on the information display interface 55 of the notification message. Furthermore, according to the forgoing descriptions, the user may touch the information display interface of the notification message in Messages or tap the pull-down button 54, so that the content shown in FIG. 5G1(*a*), FIG. 5G1(*b*), FIG. 5G1(*c*), FIG. 5G2(*a*), FIG. 5G2(*b*), and FIG. 5G2(*c*) is displayed on the information display interface 55 of the notification message. Much further, the notification message may alternatively be displayed on the left or the right of the screen of the mobile phone and displayed at the upper layer of the operation interface currently browsed by the user. According to the forgoing descriptions, the user may touch the information display interface 55 of the notification message of the voice call, or tap the pull-down button 54, or tap the notification message on the display and slide from the left to the right of the screen of the mobile phone or slide from the right to the left of the screen of the mobile phone, so that the content shown in FIG. 5G1(*a*), FIG. 5G1(*b*), FIG. 5G1(*c*), FIG. 5G2(*a*), FIG. 5G2(*b*), and FIG. 5G2(*c*) is displayed in sequence on the information display interface 55 of the notification message. In addition, for the content shown in FIG. 5G1(*a*), FIG. 5G1(*b*), FIG. 5G1(*c*), FIG. 5G2(*a*), FIG. 5G2(*b*), and FIG. 5G2 (*c*), sequences of FIG. 5G1(*a*), FIG. 5G1(*b*), FIG. 5G1(*c*), FIG. 5G2(*a*), FIG. 5G2(*b*), and FIG. 5G2 (*c*) are not limited to the foregoing type in this embodiment of this application. For example, when the user performs tapping in FIG. 5G1(*a*) and FIG. 5G2(*a*), FIG. 5G1(*c*) and FIG. 5G2(*c*) may be directly displayed on the display of the mobile phone, and the processes shown in FIG. 5G1(*b*) and FIG. 5G2(*b*) do not need to be performed. When the user performs tapping in FIG. 5G1(*c*) and FIG. 5G2 (*c*) again, FIG. 5G1(*c*) and FIG. 5G2(*c*) may be converted into FIG. 5G1(*b*) and FIG. 5G2 (*b*) for display.

Further, the user may perform one, two, or more operations on the notification messages in FIG. 5A(*a*) to FIG. 5G2(*c*) one by one. This embodiment of this application is not limited to performing three tap operations on the notification messages in FIG. 5A(*a*) to FIG. 5G2(*c*). Therefore, as the examples shown in FIG. 5A(*a*) to FIG. 5G2(*c*), more content is hierarchically displayed at more layers. In addition, the applications in this embodiment of this application are not limited to the applications shown in FIG. 5A(*a*) to FIG. 5G2(*c*). The application may alternatively be another type of application according to a user requirement.

In some embodiments of this application, a type of the pull-down button is not limited to the horizontal bar 54, and the pull-down button may alternatively be an icon of another type such as an arrow, a circle, or a square. For the manners in which the foregoing message is displayed on the top, the bottom, the left, and the right of the screen of the mobile phone in a notification manner, the message may alternatively be displayed at any location of the display of the mobile phone in a manner such as a prompt box, a card, a floating window, or a tip (Tips). This is not limited in this embodiment of this application.

Figure 5H:
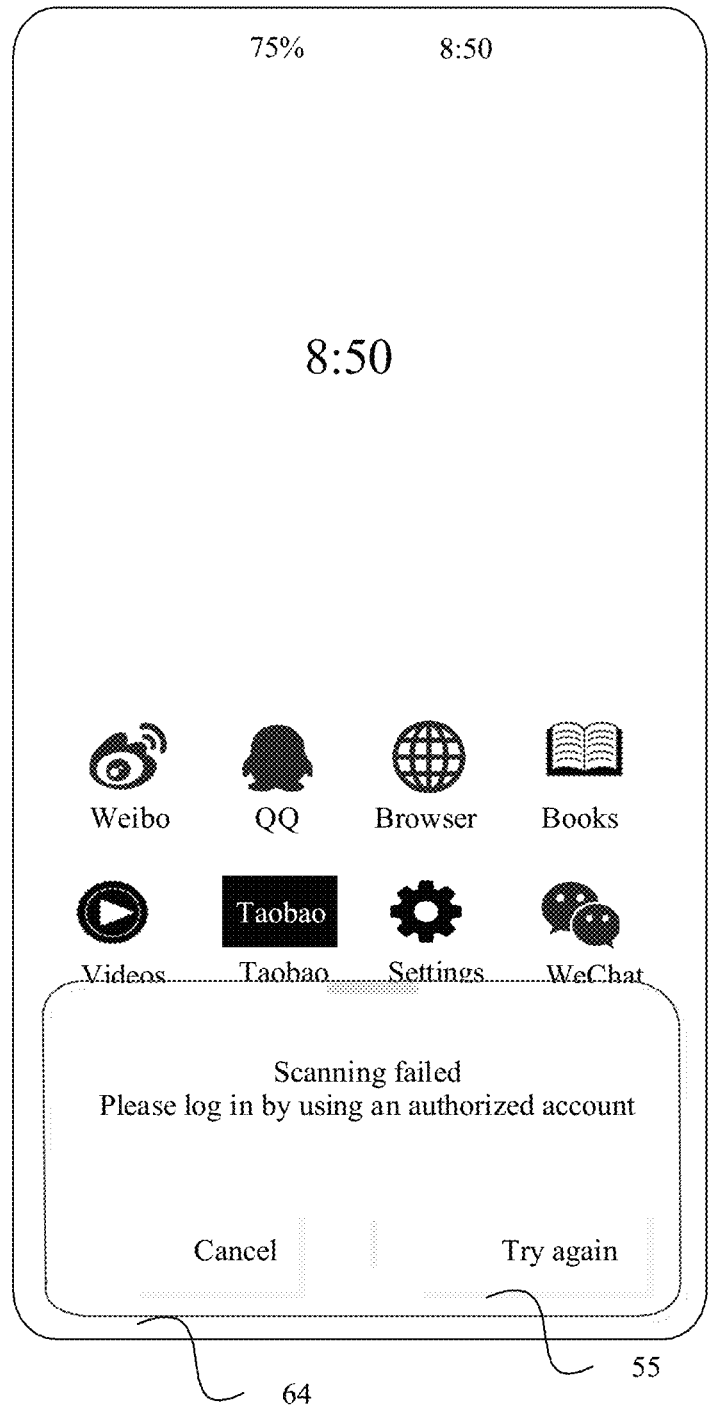
Figure 5H:
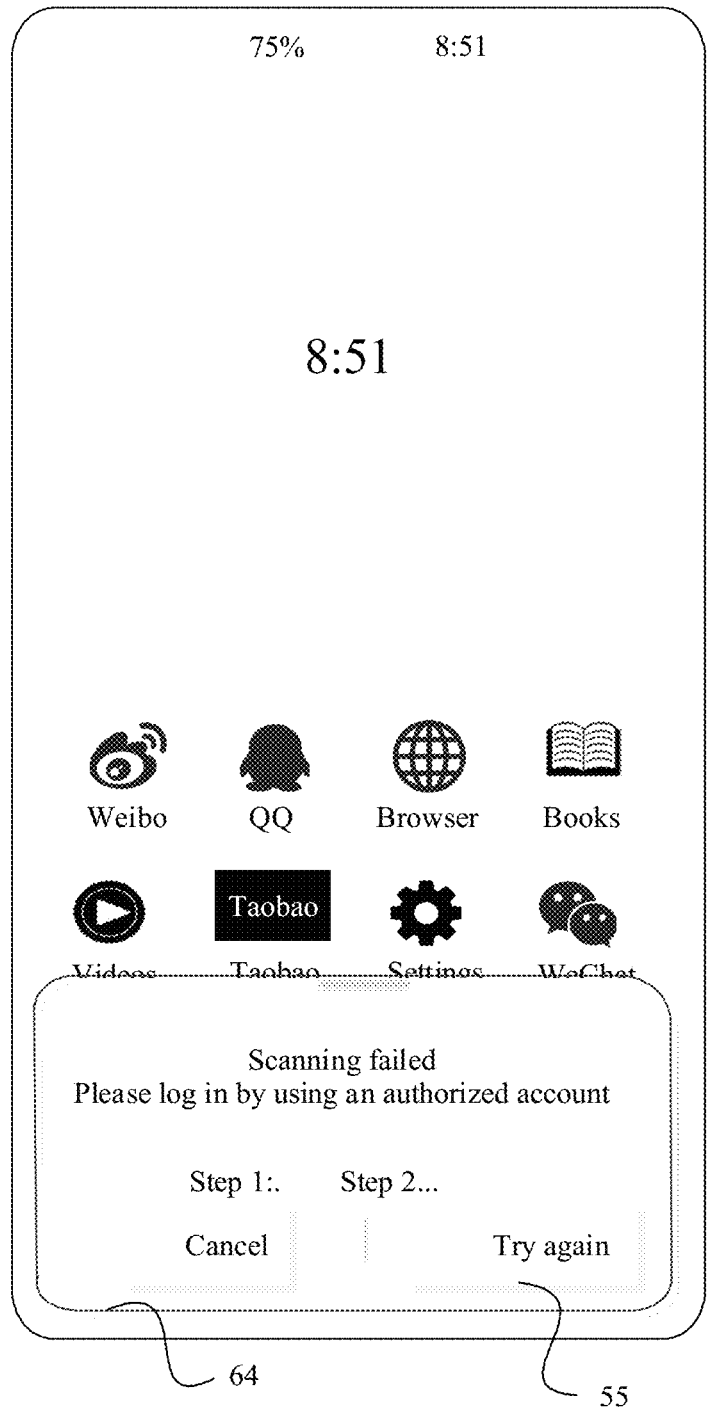

In some embodiments of this application, as shown in FIG. 5H(*a*), when the user fails to scan a code, a prompt box 64 is popped up on the bottom of the screen of the mobile phone. The prompt box 64 reminds the user that the scanning fails and indicates the user to log in by using an "authorized account", and selection buttons "Cancel" and "Try again" are displayed. Therefore, the user may perform targeted selection. As shown in FIG. 5H(*b*), when the user touches again the prompt box 64 shown in FIG. 5H(*a*), more content such as detailed login steps is further displayed on the information display interface 55 of the prompt box 64. It should be noted that the touch operation includes tapping, sliding down, touching and holding, or the like.

Figure 5I:
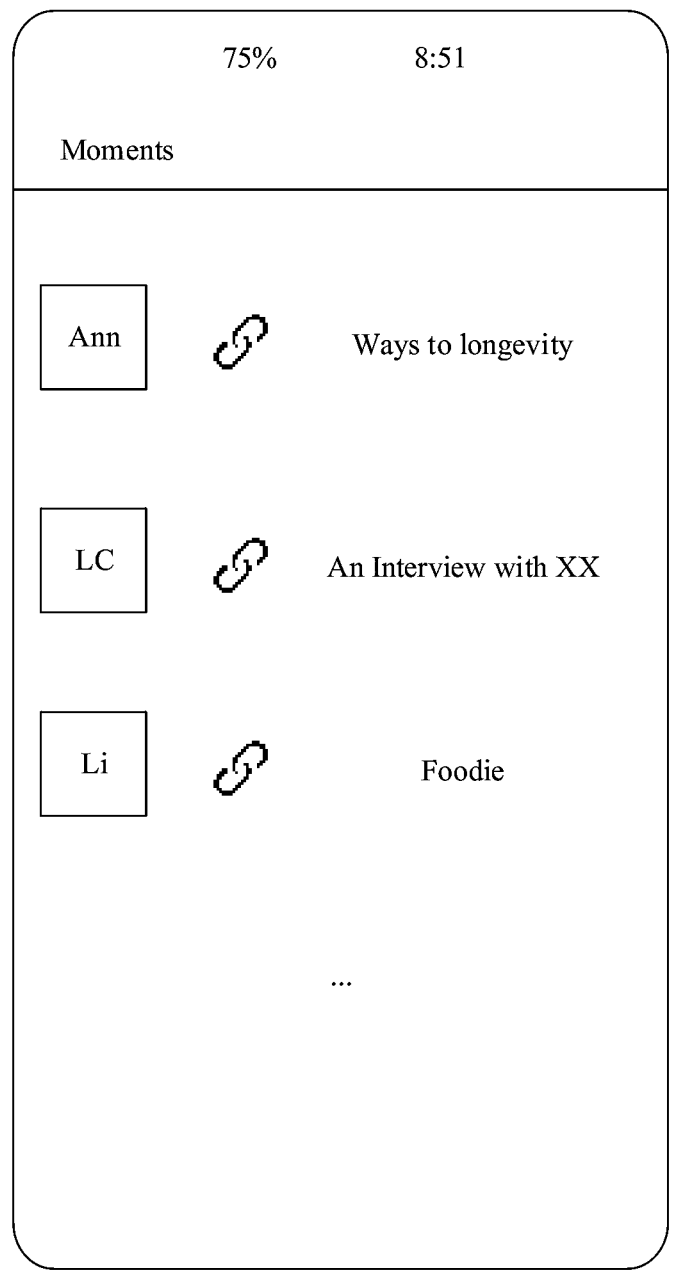
Figure 5I:
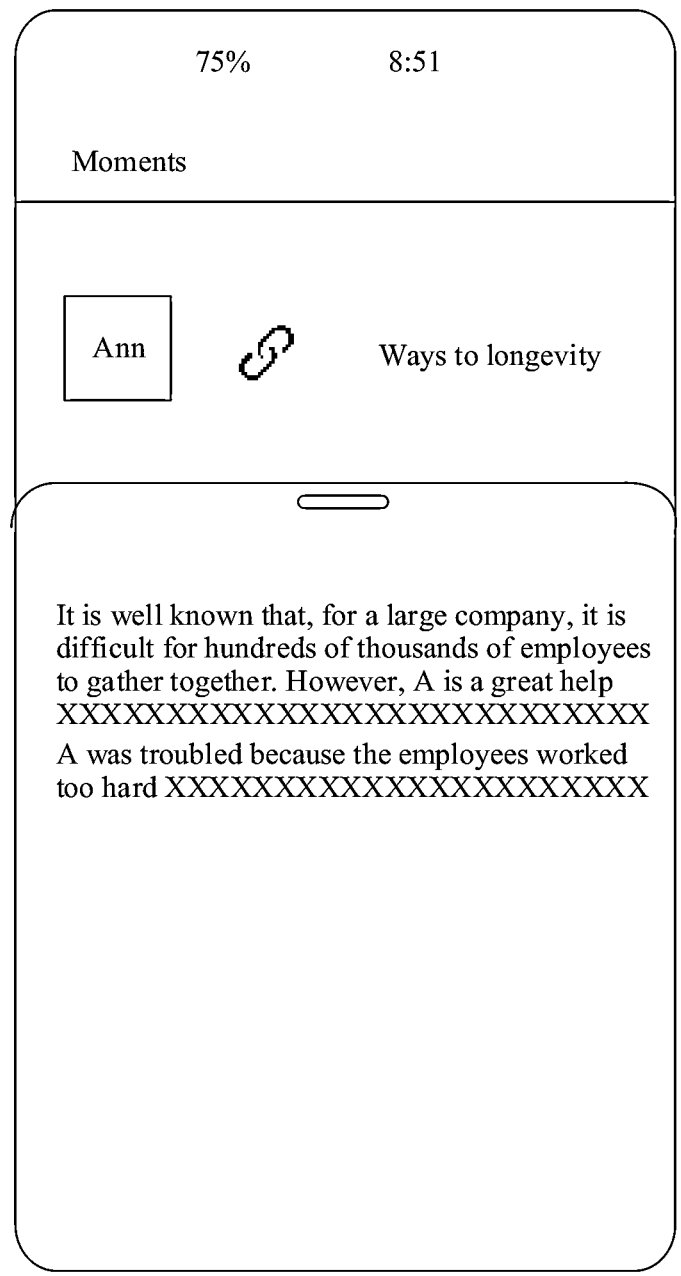

In some embodiments of this application, as shown in FIG. 5I(*a*), after some users share links in Moments, any user touches the link or slides down at a location of the link. As shown in FIG. 5I(b), content in the link on the current Moments interface may be directly opened. It should be noted that the touch operation includes tapping, sliding down, touching and holding, or the like.

Figure 5J:
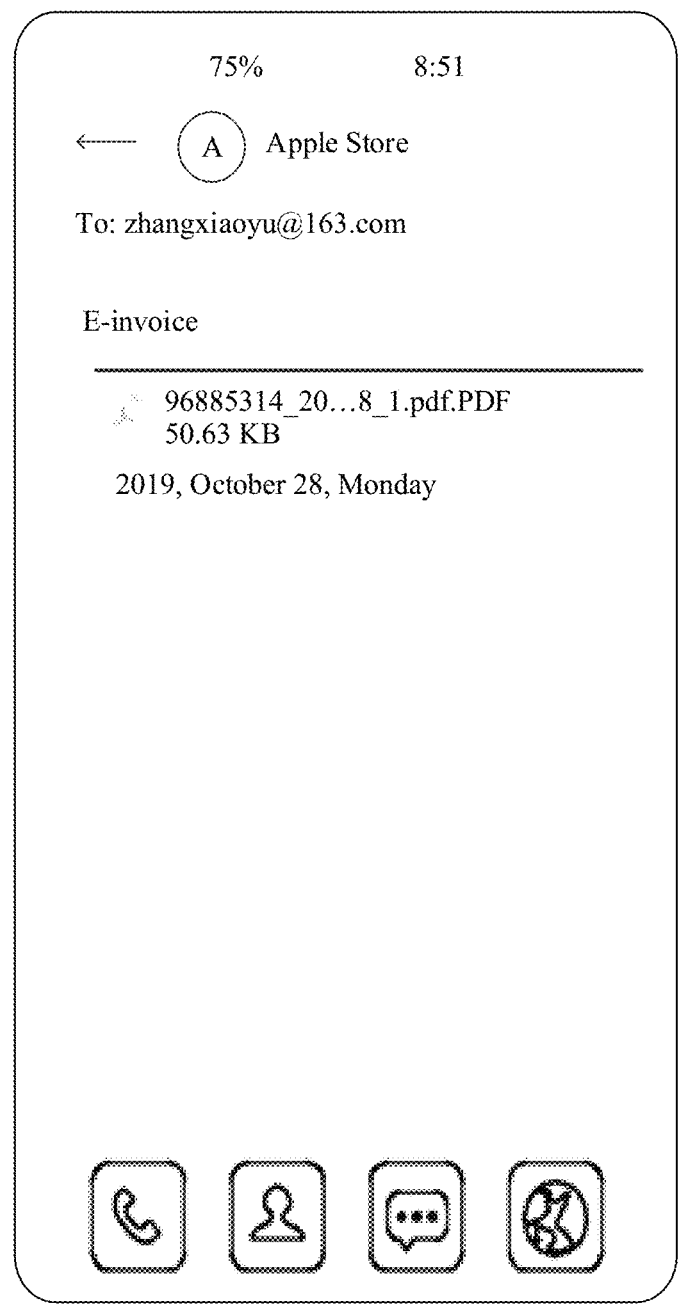
Figure 5J:
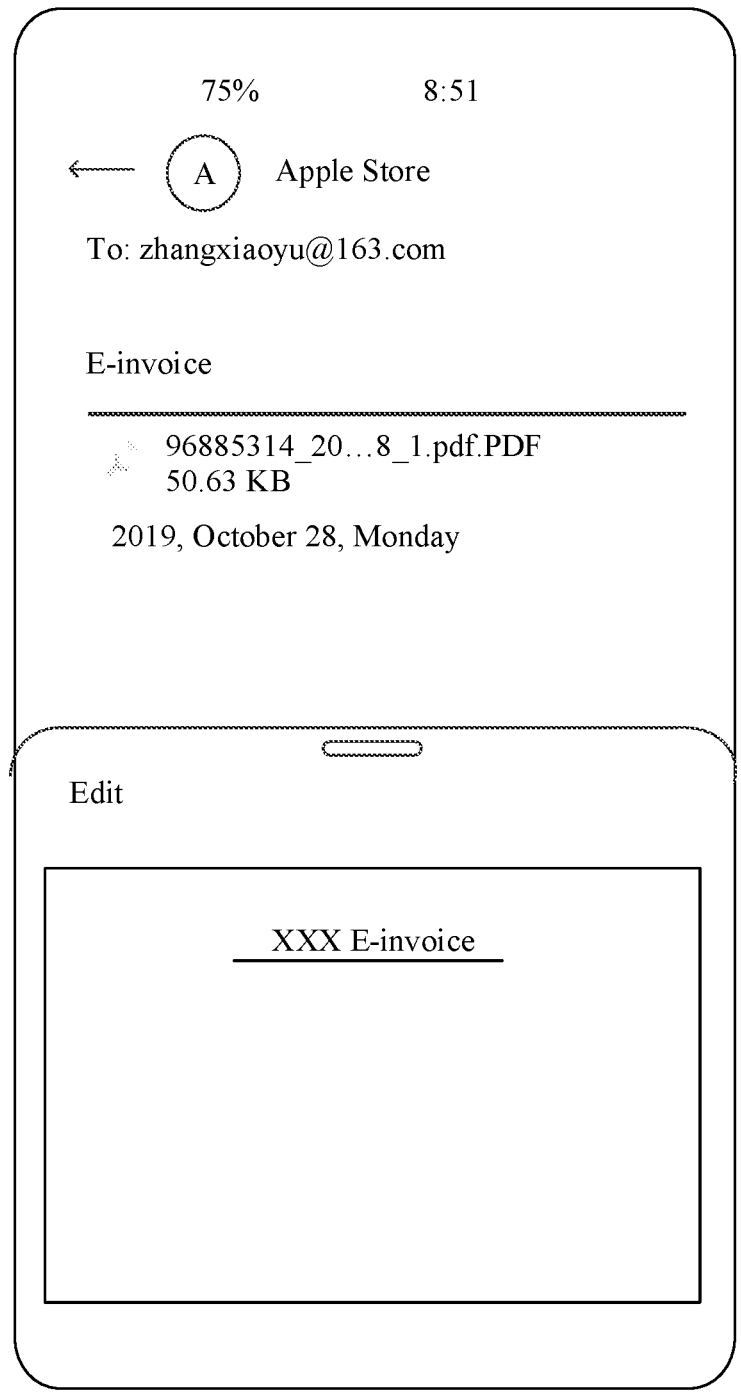

In some embodiments of this application, as shown in FIG. 5J(a), when the user sends an email with an attachment, the user may touch the attachment or slide down at a location of the attachment, to directly display detailed content of the email on an email interface. It should be noted that the touch operation includes tapping, sliding down, touching and holding, or the like.

Figure 5K:
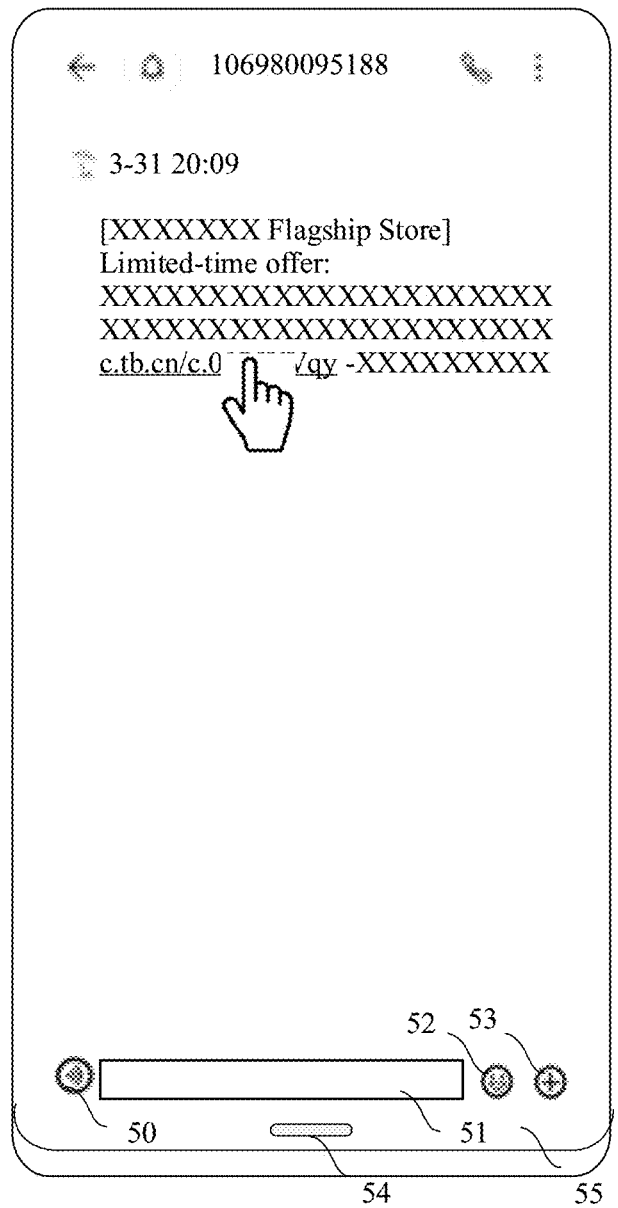
Figure 5K:
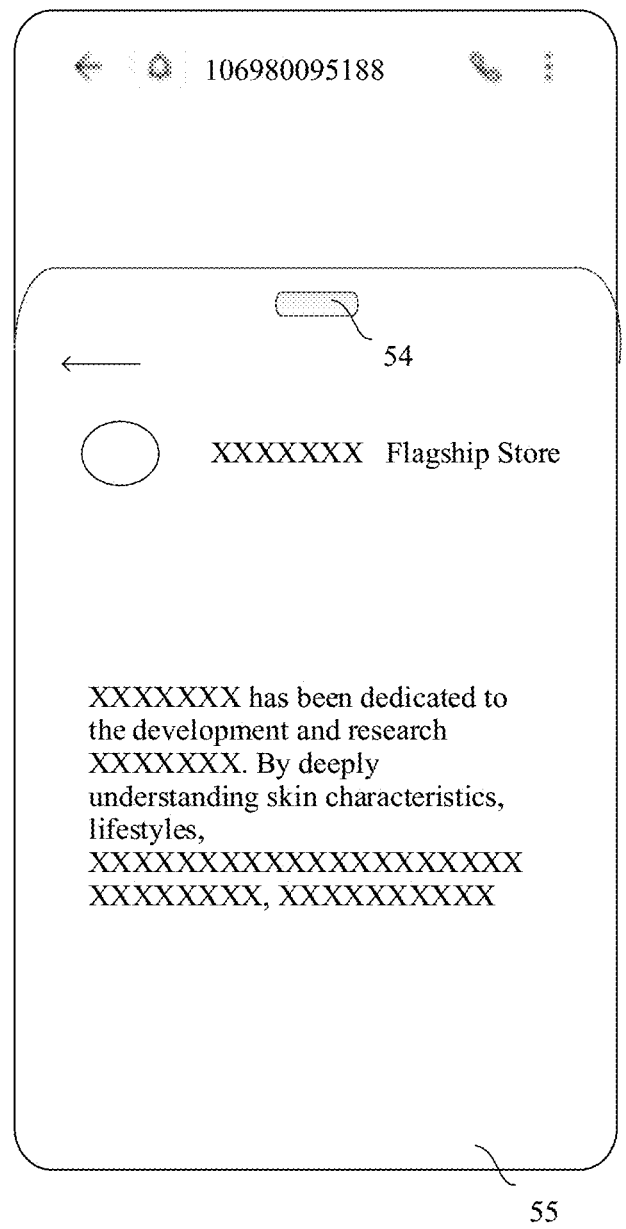

In some embodiments of this application, as shown in FIG. 5K(a), the mobile phone receives an SMS message sent by a user, and the SMS message includes but is not limited to a linked website, the reply function button, and the pull-down bar 54. The voice input button 50 (a voice reply) is on the left of the reply function button, the text input box 51 (a text, a link, or the like) is in the middle of the reply function button, and the emoji input button 52 and the additional button 53 (a video reply, a picture reply, a GIF reply, or the like) are on the right of the reply function button. The user can reply to the peer party by using the reply function button. The user taps or touches and holds the linked website or slide down the linked website by using a finger. As shown in FIG. 5K(b), content in the link and an operation on the link content may be displayed on an operation interface (an operation interface of the SMS message) currently browsed by the user without jumping to a linked application, to avoid freezing of the mobile phone. It should be noted that, when the user taps or touches and holds the linked website or slides down the linked website in FIG. 5K(b) by using the finger, the information display interface 55 of the notification message is popped up from the bottom of the mobile phone to the top of the mobile phone and expanded. The detailed content of the link is displayed on the information display interface. Certainly, when the user taps or touches and holds the linked website or slides down the linked website in FIG. 5K(a) by using the finger, the information display interface 55 of the notification message may alternatively be popped up from the top of the mobile phone to the bottom of the mobile phone and expanded. This is not limited in this embodiment of this application.

According to the interaction method disclosed in the scenario 1, when the user views the detailed content in the notification message or performs an operation on the detailed content in the notification message, jumping between the operation interface currently browsed by the user and an app corresponding to the notification message is avoided, CPU resource occupation of the mobile phone due to an application jumping process is avoided, and freezing of the mobile phone is also avoided, thereby improving user experience.

Scenario 2

In the scenario 2, the interaction method provided in embodiments of this application is described by using an example in which the electronic device is the mobile phone and Messages is installed on the mobile phone. The mobile phone receives a plurality of notification messages of a same application. For example, when the mobile phone receives a plurality of notification messages sent by a plurality of contacts in Messages, information display pages of the notification messages of the plurality of contacts are displayed in an aggregated manner on the top of the screen of the mobile phone (or may be displayed on the bottom of the mobile phone or at another location). The user may slide left or right on the display of the mobile phone, to view the notification messages sent by different contacts. A plurality of notification messages sent by a same contact (as a same source) can be displayed on an information display page of one notification message in an aggregated manner.

Figure 6A:
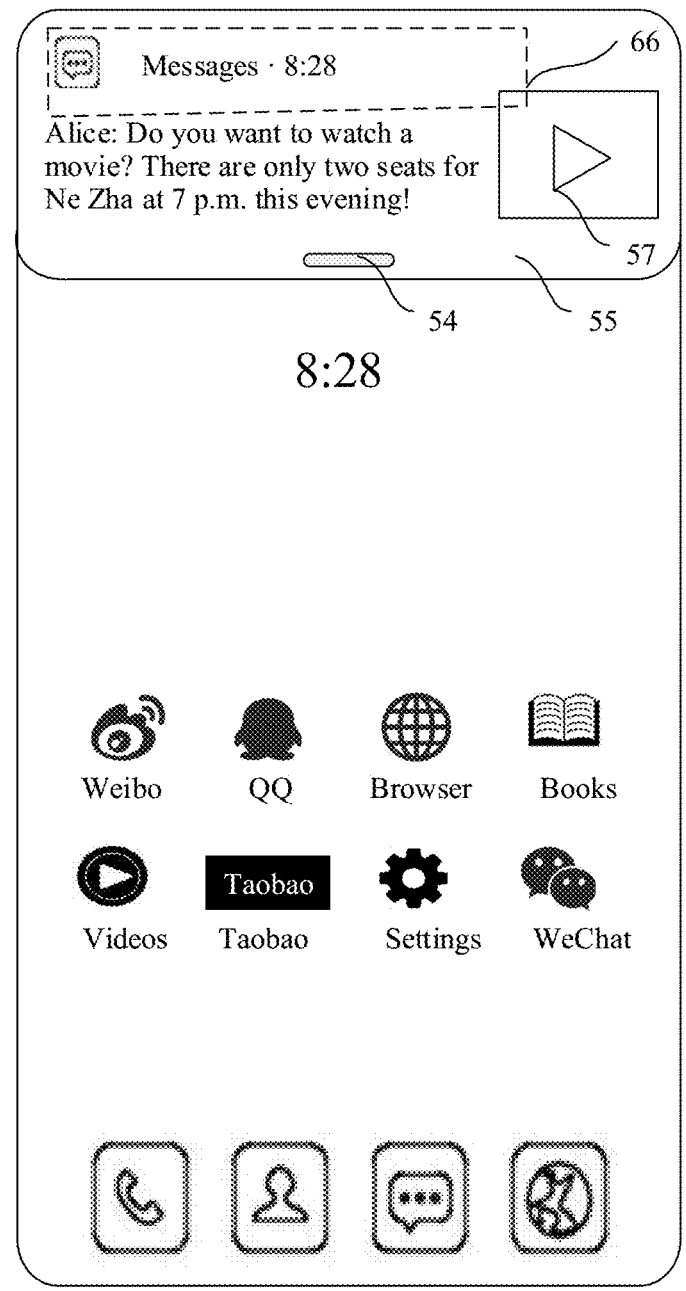
FIG. 6A(a) to FIG. 6B(b) are diagrams of mobile phone interface statuses in a scenario 2 according to an embodiment of this application.
Figure 6A:
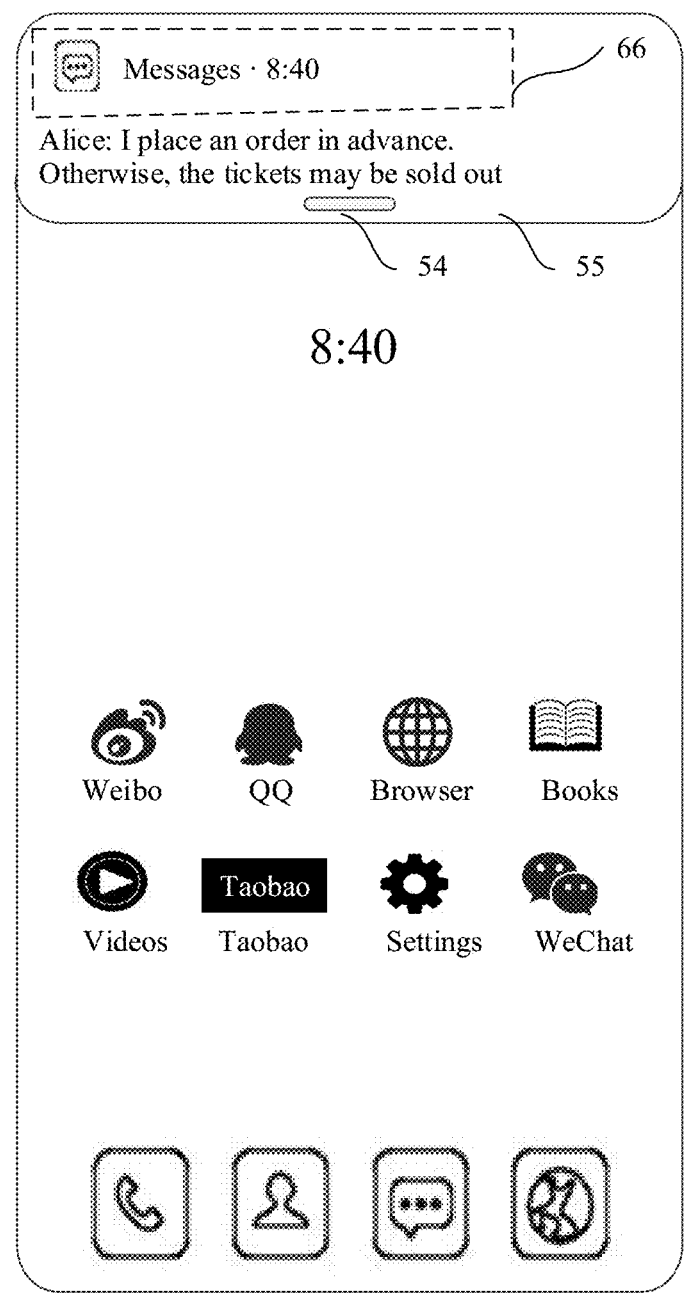
Figure 6A:
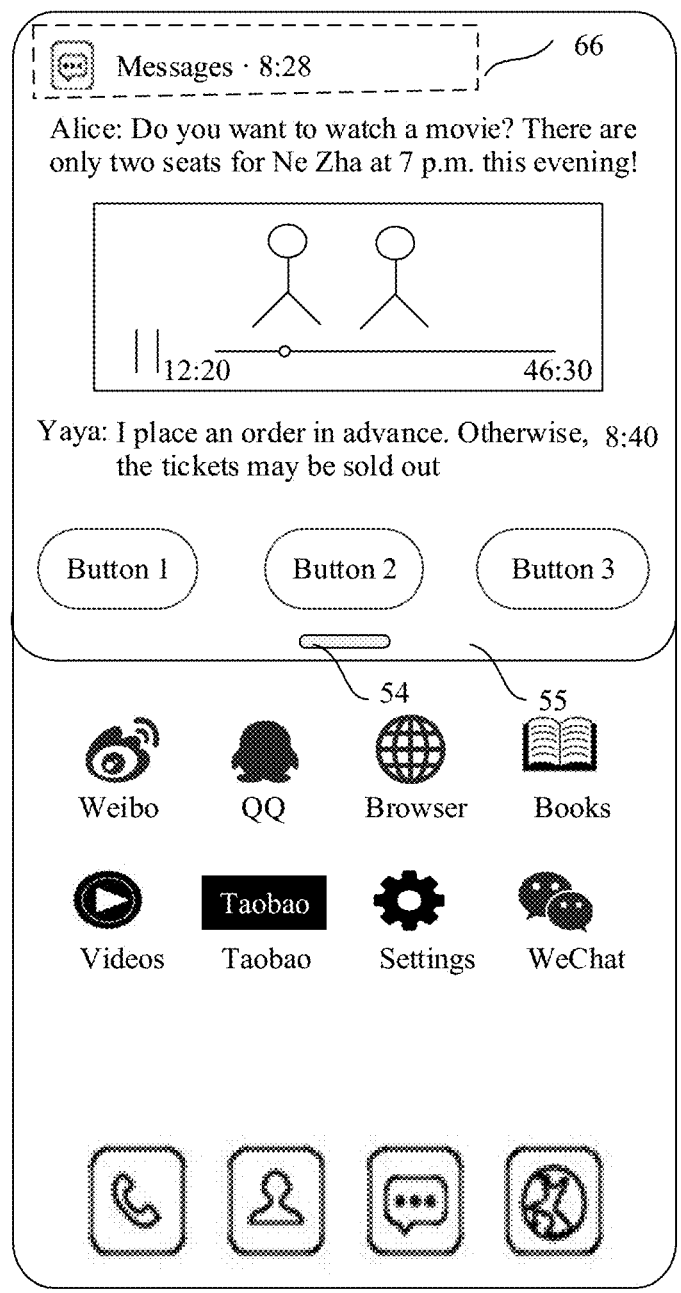
Figure 6B:
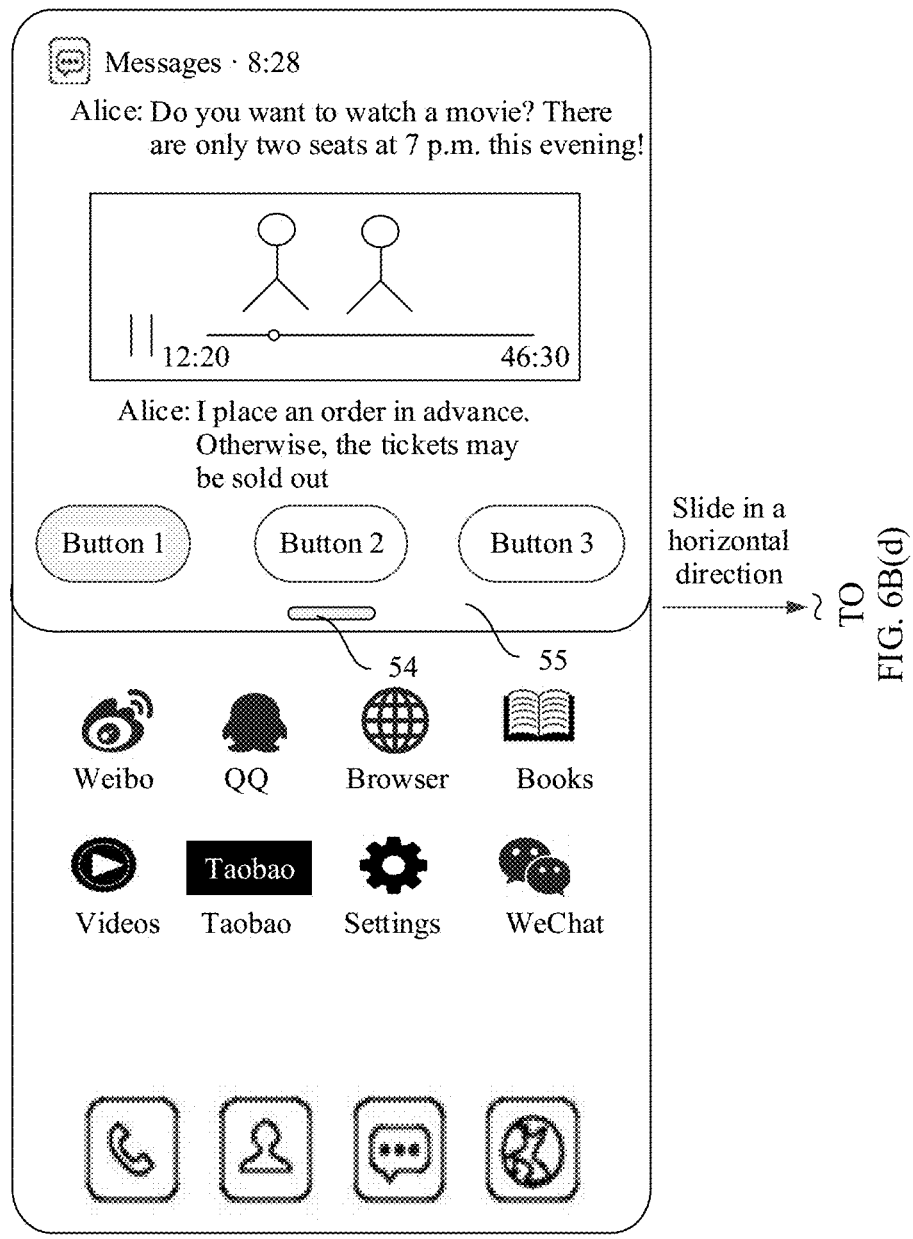
Figure 6B:
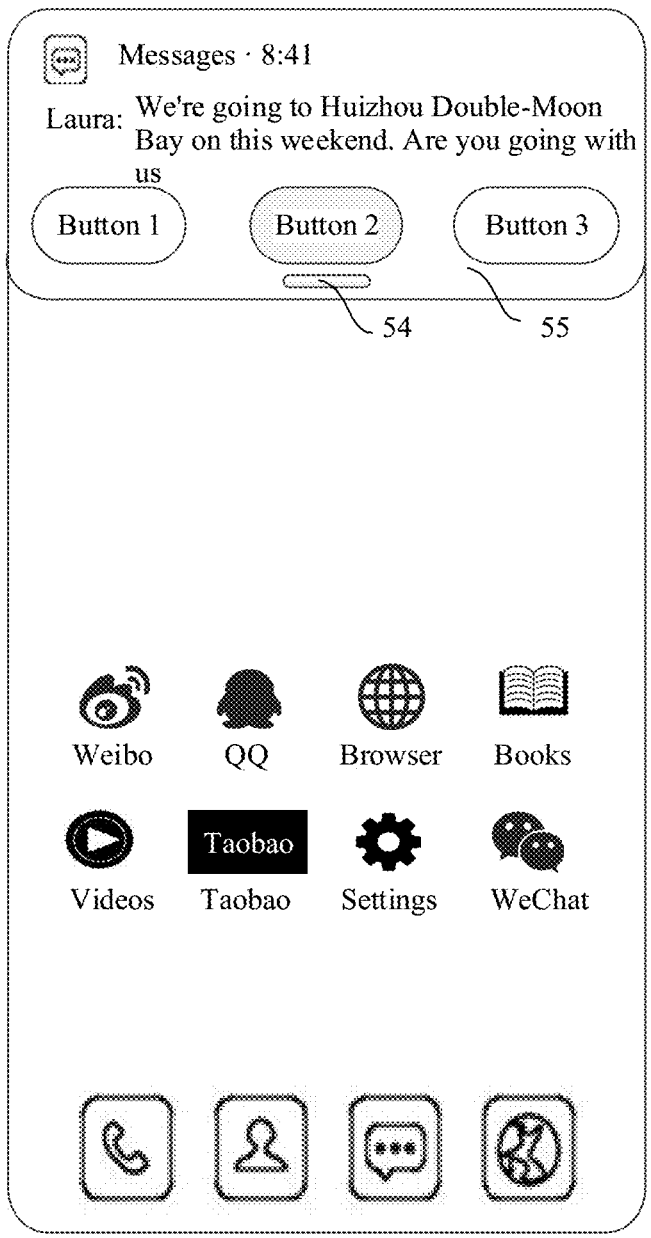

The following describes in detail a technical solution in the application scenario 2 of this application with reference to FIG. 6A(a) to FIG. 6B(b).

As shown in FIG. 6A(a), when the mobile phone receives an SMS message sent by a contact Alice in Messages, a receiving time of the mobile phone is 8:28. For example, when the notification message in Messages carries a video, an information display interface 55 of the notification message is displayed on the top of the screen of the mobile phone and is displayed at an upper layer of an operation interface currently browsed by the user. At least one type of the following text information is displayed in the first line on the left of the information display interface 55 of the notification message: an icon format (ICON), a message source, and a receiving time (where the icon format (ICON), the message source, and the receiving time are indicated in the dashed box 66).

The texts "Alice: Do you want to watch a movie? There are only two seats at 7 p.m. this evening!" may be displayed below the first line of the information display interface 55, and a video interface 57 is displayed on the right of the information display interface of the notification message. When the contact "Alice" sends a new SMS message "I place an order in advance. Otherwise, the tickets may be sold out", as shown in FIG. 6A(b), a time at which the mobile phone receives the new SMS message is 8:40, and an information display interface 55 of a notification message of the new SMS message received by the mobile phone is displayed on the top of the screen of the mobile phone and displayed at the upper layer of the operation interface currently browsed by the user. At least one type of the following text information is displayed in the first line on the left of the information display interface 55 of the notification message: an icon format (ICON), a message source, and a receiving time (where the icon format (ICON), the message source, and the receiving time are indicated in the dashed box 66), and the texts "I place an order in advance. Otherwise, the tickets may be sold out" are displayed below the first line of the information display interface.

When the user touches the information display interface 55 of the notification message in Messages shown in FIG. 6A(b) or taps the pull-down button 54, as shown in FIG. 6A(c), on the operation interface currently browsed by the user, the notification message is further expanded, and the content of the SMS message sent by the contact Alice is displayed in an aggregated manner in a text display area of the notification message. The video attached to the SMS message can also be automatically played when the notification message is further expanded. In addition, buttons are displayed below the new SMS message "I place an order in advance. Otherwise, the tickets may be sold out" (where the information display interface of Alice's notification message corresponds to a Button 1, and a name of the Button 1 may be an application name of a notification message source (for example, Messages), the source contact Alice in Messages, or the like), indicating that SMS messages of some contacts are still not processed at this time. When the user touches again the interface of the notification message sent by Alice, the reply function button is displayed below the video that is being played, the voice input button is on the left of the reply function button, the text input box is in the middle of the reply function button, and the emoji input button and the additional button are on the right of the reply function button. It should be noted that, the content and the display sequence in FIG. 6A(a), FIG. 6A(b), and FIG. 6A(c) are not limited herein in this embodiment of this application. After the notification message is displayed in FIG. 6A(a), that is, after the user performs tapping to display the notification message in FIG. 6A(a), the content shown in FIG. 6A(c) may be directly displayed, and the process shown in FIG. 6A(b) does not need to be performed, or when the user performs tapping in FIG. 6A (c) again, the content shown in FIG. 6A(b) is then displayed. In other words, based on a sequence of operations performed by the user on the notification message, the content displayed on the information display page of the notification message may alternatively be displayed in a reverse order (where the detailed content on the information display page is hierarchically displayed in descending order). In addition, the user may further perform one, two, or more operations on Messages shown in FIG. 6A(a) one by one, to hierarchically display more messages in Messages. In this embodiment of this application, a quantity of operations performed on the notification message and content displayed on an information display page of a notification message at each layer are not limited herein.

It should be noted that the touch operation includes tapping, sliding down, touching and holding, or the like.

For example, as shown in FIG. 6B(a), when the user touches a Button 2 displayed in an aggregated manner on the information display page in FIG. 6B(a) (where a name of the Button 2 may be an application name Messages, or a contact name Laura), or slides right on the screen of the mobile phone, the information display interface 55 that is of the notification message of the contact Alice and that is currently browsed by the user is switched to an information display interface 55 of a notification message sent by the corresponding contact Laura, and a time "8:41" and content "We're going to Huizhou Double-Moon Bay on this weekend. Are you going with us?" of the SMS message sent by Laura are displayed. When the user taps the information display interface 55 of the notification message sent by Laura in FIG. 6B(b) or taps the pull-down button 54, the notification message may be further expanded, to display more content. When the user touches the Button 1 or slide left on the screen of the mobile phone, the mobile phone switches the information display interface 55 of the notification message sent by Laura corresponding to the Button 2 to the information display interface 55 of the notification message sent by Alice corresponding to the Button 1. All SMS message content and related content sent by Alice are displayed on the information display interface of the notification message sent by Alice corresponding to the Button 1. It should be noted that the touch operation includes tapping, sliding down, touching and holding, or the like.

According to the interaction method disclosed in the scenario 2, when the user views the detailed content in the notification message or performs an operation on the detailed content in the notification message, jumping between the operation interface currently browsed by the user and an app corresponding to the notification message is avoided, CPU resource occupation of the mobile phone due to an application jumping process is avoided, and freezing of the mobile phone is also avoided, thereby improving user experience.

In addition, notification messages sent by a same user can be displayed in an aggregated manner on a same information display interface, instead of being displayed one by one as in the conventional technology, thereby facilitating user processing and improving user experience.

Moreover, a plurality of notification messages sent by a plurality of users may be viewed by sliding left or right on the screen of the mobile phone, so that the user does not need to complete processing of a notification message before processing a next notification message, and no notification message is missed, thereby further improving user experience.

Scenario 3

In the scenario 3, the interaction method provided in embodiments of this application is described by using an example in which the electronic device is a notebook computer and WeChat is installed on the notebook computer. Data of an application on the mobile phone may be synchronized to the computer for synchronous display, or a notification message sent by an application installed on the computer may also be displayed in the manner in the foregoing scenario 1 and scenario 2. It should be noted that the electronic device in this embodiment of this application is not limited to a notebook computer, and the electronic device may alternatively be a tablet, a laptop computer, or the like, and applications installed on the mobile phone and the notebook computer are not limited to WeChat.

Figures 1, 7A:
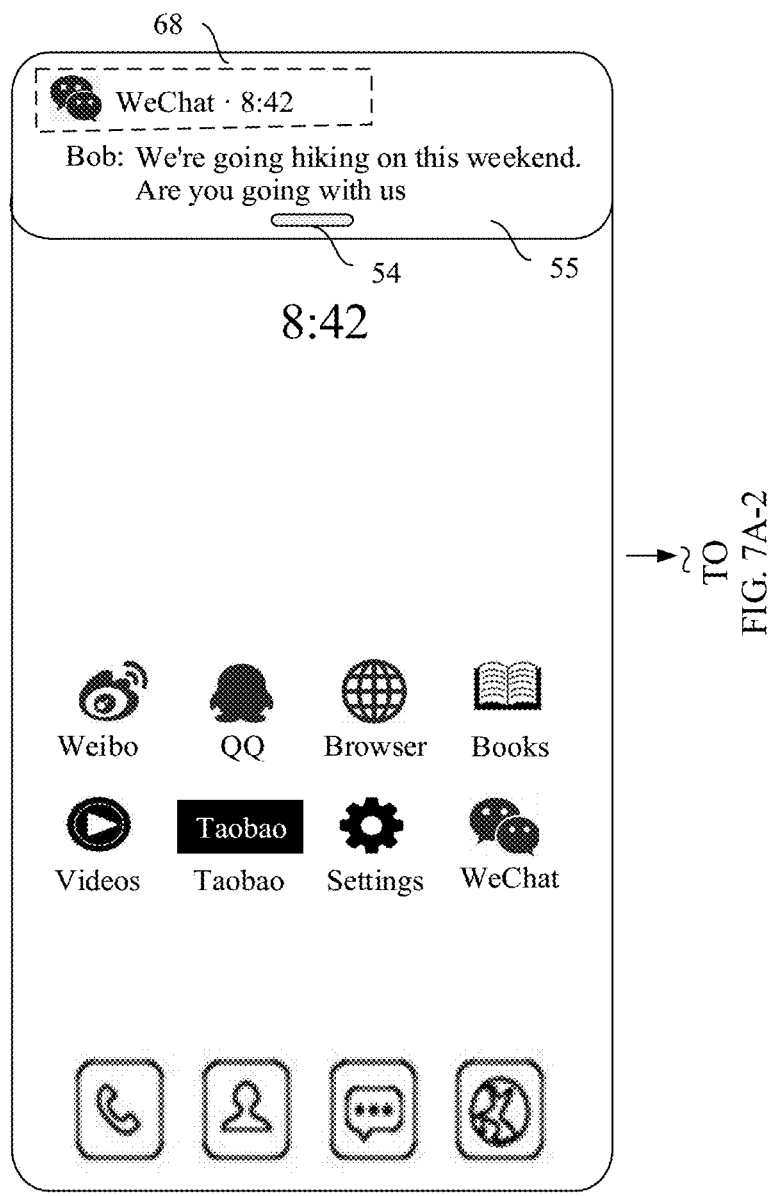
Figures 2, 7A:
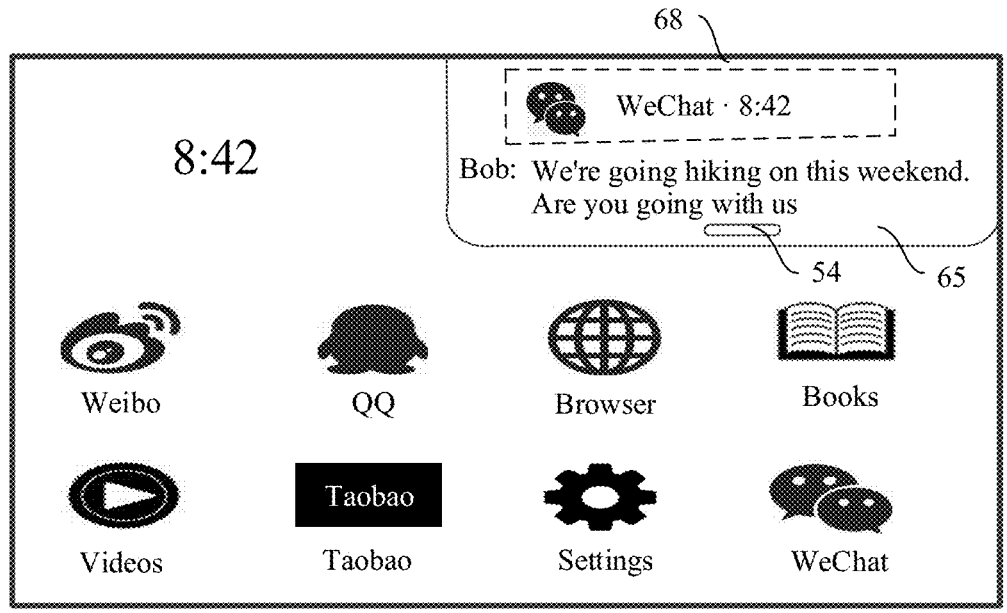

For example, refer to FIG. 7A-1 and FIG. 7A-2. After the mobile phone receives a notification message sent by WeChat, the notification message is synchronously displayed in an upper left corner of a display of the computer, and content displayed on an information display interface 55 of the notification message of the mobile phone and an information display page 65 of the computer includes but is not limited to: an icon format (ICON), a message source, and a receiving time (where the icon format (ICON), the message source, and the receiving time are indicated in a dashed box 68) that are displayed in the first line and detailed text content "We're going hiking on this weekend. Are you going with us" sent by a contact Bob that is displayed in the second line. It may be understood that the notification message sent by WeChat may alternatively be synchronously displayed in an upper right corner, a lower left corner, or a lower right corner of the display of the computer, or at any location of the display of the computer. In addition, for an operation performed on the notification message sent by WeChat in FIG. 7A-1 and FIG. 7A-2, the same operation may be performed in FIG. 7B(a) to FIG. 7B(c). In addition, for the operation performed on the notification message of WeChat in FIG. 7A-1 and FIG. 7A-2, the same operation may be performed according to the scenario 1 and the scenario 2. Therefore, the content in the notification message of WeChat is hierarchically displayed on the mobile phone. For a display manner of the notification message of WeChat on the display of the computer in FIG. 7A-1 and FIG. 7A-2, the manner may be the same as the display manner of displaying without covering the entire display of the computer or the mobile phone in FIG. 7A-1 and FIG. 7A-2, or may be a manner of covering the entire display of the computer or the mobile phone. This is not limited in this embodiment of this application.

Figure 7B:
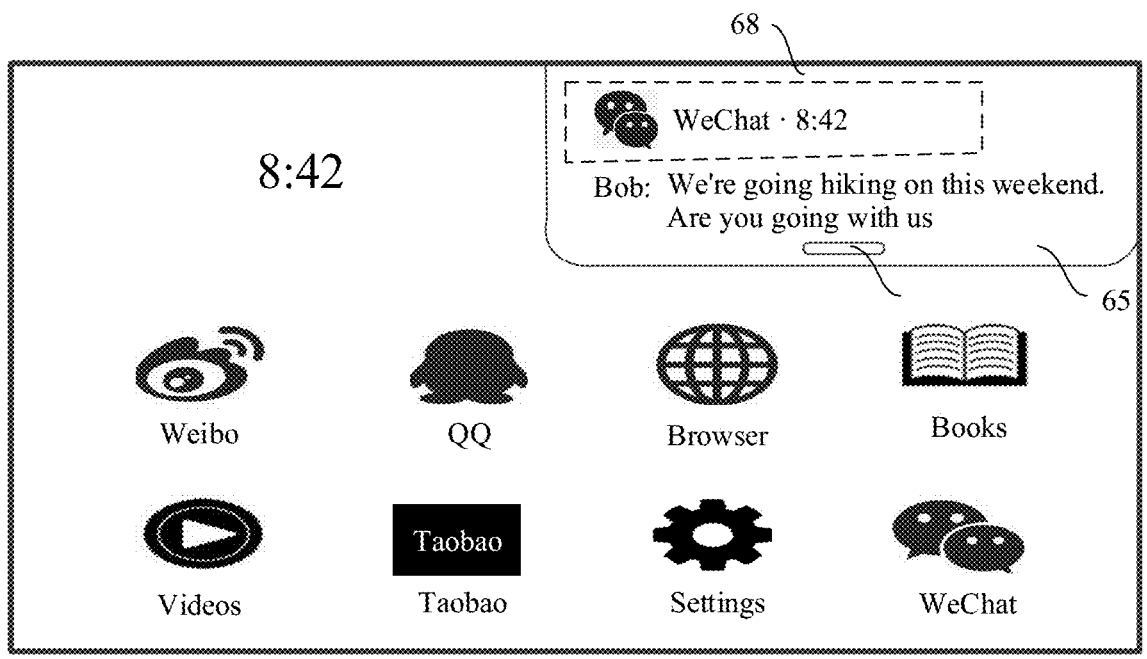
Figure 7B:
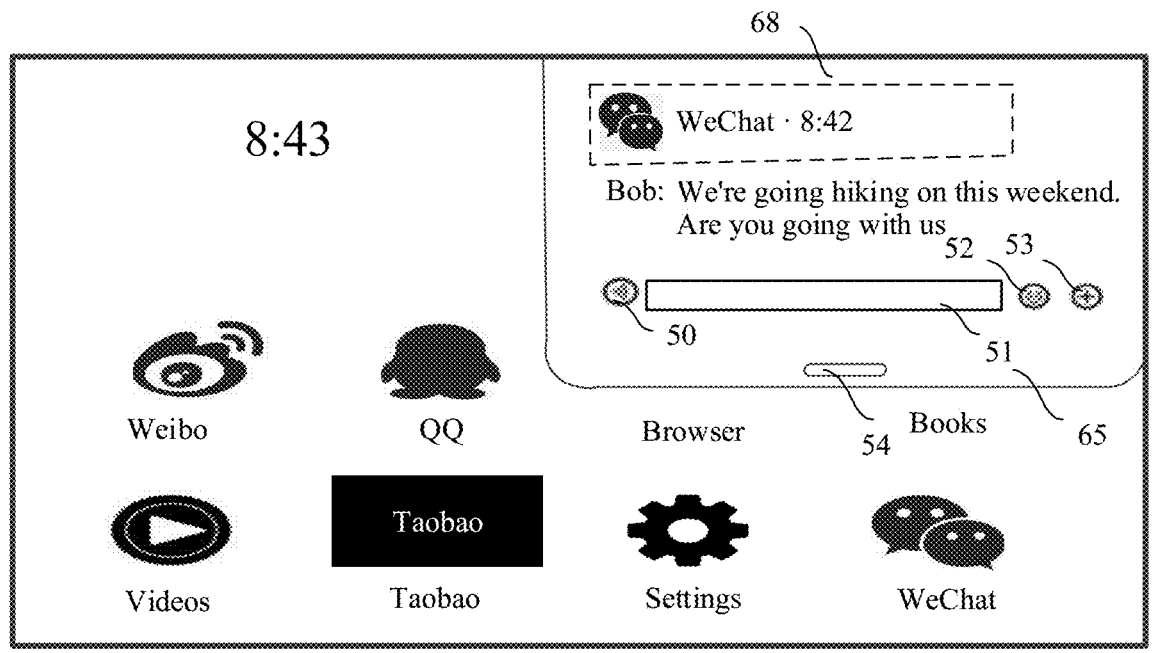
Figure 7B:
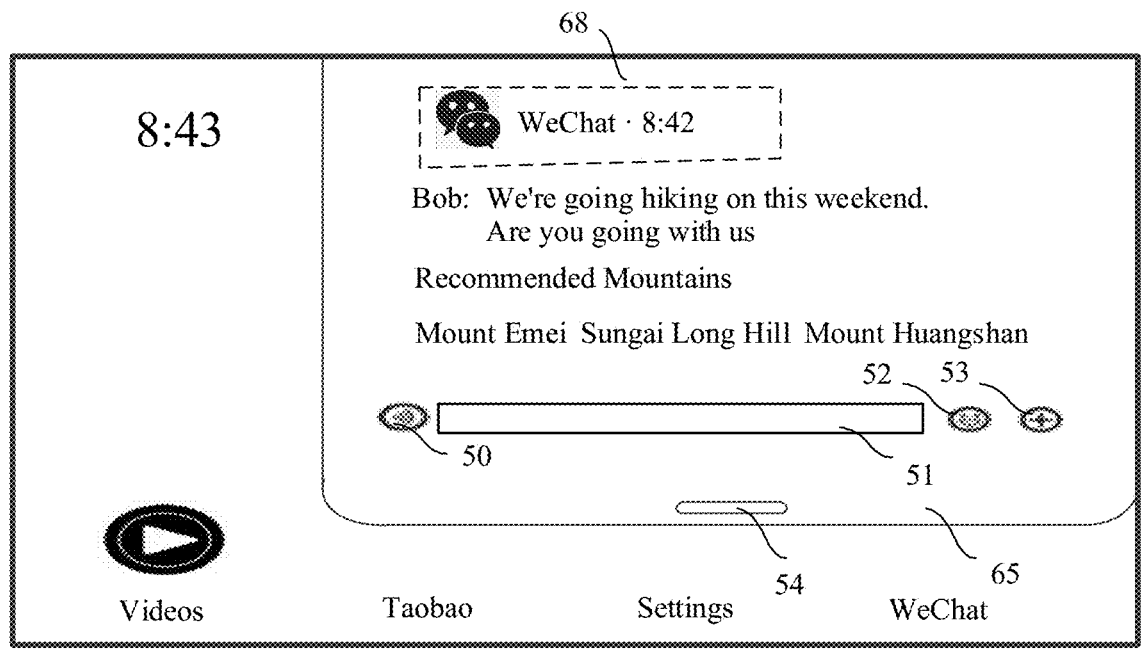

For example, refer to FIG. 7B(a). When the notebook computer receives the notification message of WeChat, the information display interface 65 of the notification message is displayed in the upper left corner of the notebook computer and displayed at an upper layer of an operation interface currently browsed by the user. At least one type of the following information is displayed in the first line of the notification message: a display icon format (ICON), a message source, and a receiving time (where the icon format (ICON), the message source, and the receiving time are indicated in the dashed box 68). At least the WeChat message sent by the contact Bob and the text content of the WeChat message may be displayed in the second line of the notification message.

As shown in FIG. 7B(b), when the user touches the information display interface of the notification message of WeChat in FIG. 7B(a) or touches the pull-down button 54 by using a finger, or clicks the information display interface 65 of the notification message of WeChat or clicks the pull-down button 54 by using a mouse of the computer, on the operation interface currently browsed by the user, the notification message is further expanded. The reply function button is displayed in the third line of the information display interface 65 of the notification message, the voice input button 50 (a voice reply) is on the left of the reply function button, the text input box 51 (a text, a link, or the like) is in the middle of the reply function button, and the emoji input button 52 and the additional button 53 (a video reply, a picture reply, a GIF reply, or the like) are on the right of the reply function button. The user can reply to the peer party by using the reply function button.

Figure 7C:
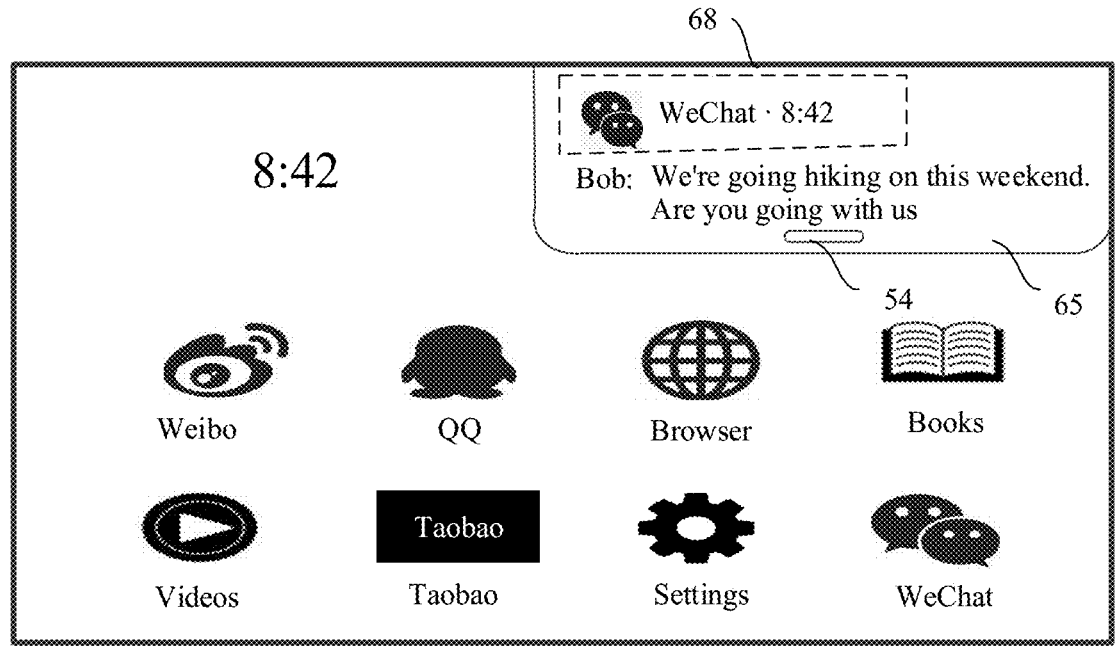
Figure 7C:
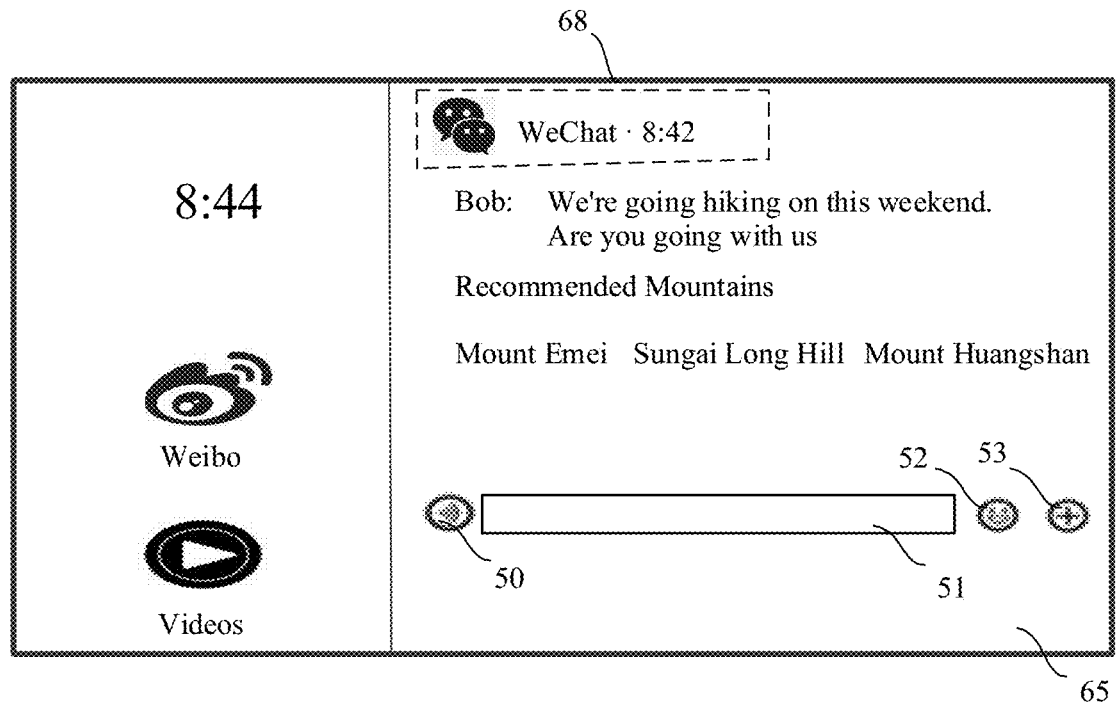

As shown in FIG. 7B(c), when the user touches the interface 65 of the notification message in short message application shown in FIG. 7B(b) or taps the pull-down button 54 again, or clicks the information display interface 65 of the notification message of WeChat by using the mouse of the computer or click the pull-down button 54 again, on the operation interface currently browsed by the user, the notification message is further expanded. The processor of the mobile phone performs semantic analysis on the texts on WeChat, parses out the keyword "hiking" in the texts, and accesses a network to search for a mountain-related recommendation on a network server. At least the mountain-related recommendation is displayed in the third line of the notification message, and at least the reply function button is displayed in the fourth line. Detailed recommended content such as Mount Emei, Sungai Long Hill, and Mount Huangshan is displayed below the mountain-related recommendation in the third line. Moreover, the user may tap the interface of the notification message or tap the pull-down button 54 again, to further display more content on the interface of the notification message. Based on a type of displayed content and a quantity of times that user taps the interface of the notification message, more content is hierarchically displayed. This is not limited in this embodiment of this application. It should be noted that the touch operation includes tapping, sliding down, touching and holding, or the like. For example, as shown in FIG. 7C(a), when the notebook computer receives the notification message of WeChat, the information display interface 65 of the notification message is displayed in the upper right corner of the notebook computer and is displayed at the upper layer of the operation interface currently browsed by the user. At least the icon format (ICON), the message source, and the receiving time (where the icon format (ICON), the message source, and the receiving time are indicated in the dashed box 68) are displayed in the first line of the notification message, and at least the text content of the WeChat message sent by the contact Bob is displayed in the second line of the notification message. As shown in FIG. 7C(b), the user uses the mouse to click or the finger to touch the information display interface 65 of the notification message shown in FIG. 7C(a) and continuously slides to a lower edge of the computer, and when the user releases the mouse or leaves the finger from the display of the computer, the notification message is automatically displayed on a split screen of the display of the notebook computer. In FIG. 7C(b), at least the mountain-related recommendation is displayed in the third line of the information display page 65 of the notification message, and at least the reply function button is displayed in the fourth line. The detailed recommended content such as Mount Emei, Sungai Long Hill, and Mount Huangshan is displayed below the mountain-related recommendation in the third line. Moreover, the user may tap the interface of the notification message or tap the pull-down button 54 again, to further display more content on the interface of the notification message. Based on a type of displayed content and a quantity of times that user taps the interface of the notification message, more content is hierarchically displayed. This is not limited in this embodiment of this application. It should be noted that the touch operation includes tapping, sliding down, touching and holding, or the like.

The voice input button 50 (a voice reply) is on the left of the reply function button, the text input box 51 (a text, a link, or the like) is in the middle of the reply function button, and the emoji input button 52 and the additional button 53 (a video reply, a picture reply, a GIF reply, or the like) are on the right of the reply function button. The user can reply to the peer party by using the reply function button.

Figure 7D:
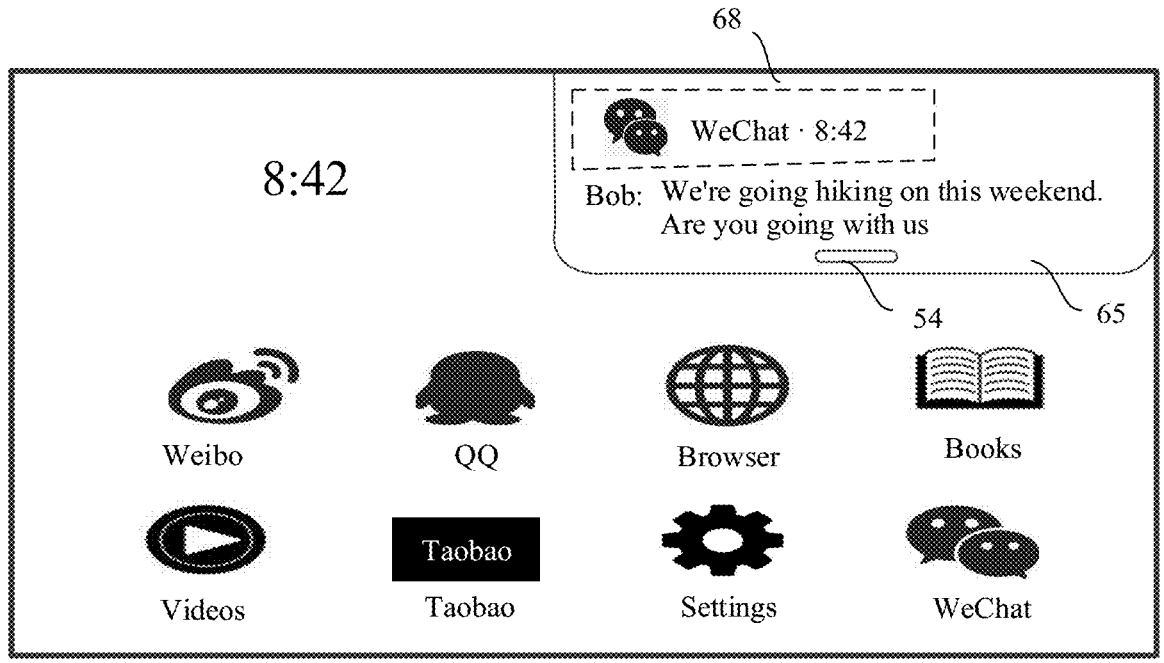
Figure 7D:
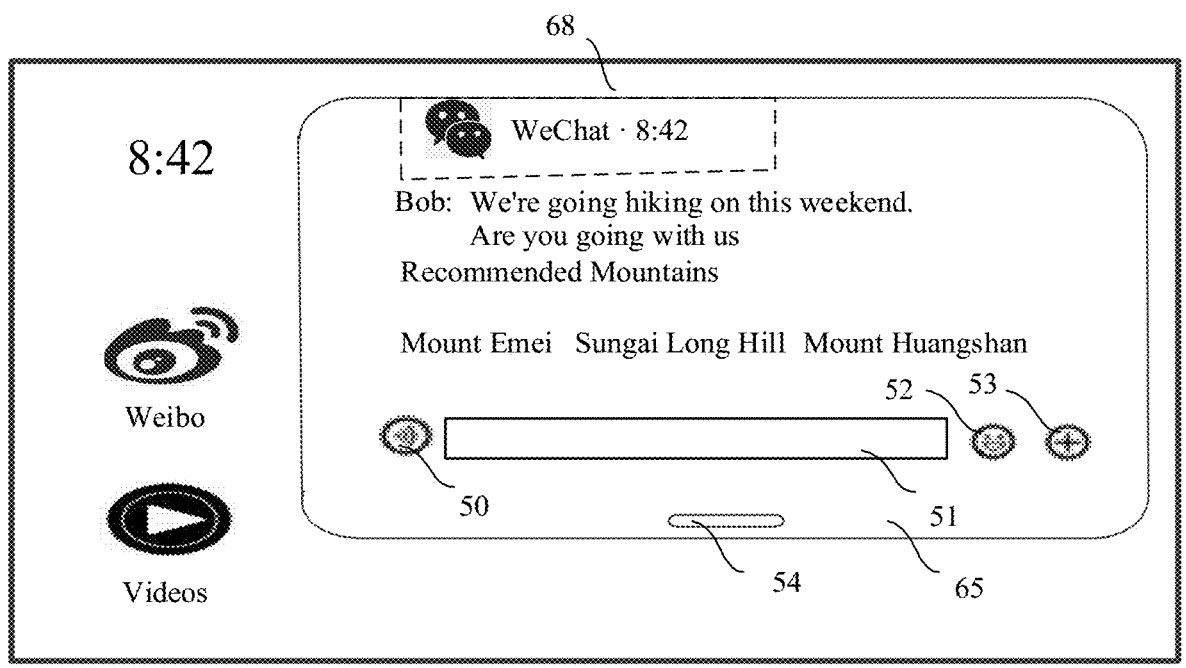

For example, refer to FIG. 7D(a). When the notebook computer receives the notification message of WeChat, the information display interface 65 of the notification message is displayed in the upper right corner of the notebook computer and displayed at the upper layer of the operation interface currently browsed by the user. At least the display icon format (ICON), the message source, and the receiving time (where the icon format (ICON), the message source, and the receiving time are indicated in the dashed box 68) are displayed in the first line of the notification message. At least the text content of the WeChat message sent by the contact Bob may be displayed in the second line of the notification message. As shown in FIG. 7D(b), the user uses the mouse to click or the finger to touch the pull-down button of the notification message shown in FIG. 7D(a) and slides, and when the user releases the mouse or leaves the finger from the display of the computer, the notification message is automatically displayed in a form of a floating window on the display of the notebook computer.

In FIG. 7D(b), at least the mountain-related recommendation is displayed in the third line of the information display page 65 of the notification message, and at least the reply function button is displayed in the fourth line. The detailed recommended content such as Mount Emei, Sungai Long Hill, and Mount Huangshan is displayed below the mountain-related recommendation in the third line. Moreover, the user may tap the interface of the notification message or tap the pull-down button 54 again, to further display more content on the interface of the notification message. Based on a type of displayed content and a quantity of times that user taps the interface of the notification message, more content is hierarchically displayed. This is not limited in this embodiment of this application. It should be noted that the touch operation includes tapping, sliding down, touching and holding, or the like.

The voice input button 50 (a voice reply) is on the left of the reply function button, the text input box 51 (a text, a link, or the like) is in the middle of the reply function button, and the emoji input button 52 and the additional button 53 (a video reply, a picture reply, a GIF reply, or the like) are on the right of the reply function button. The user can reply to the peer party by using the reply function button.

In addition, when the user performs an operation on the screen of the notebook computer, a sequence of the detailed content displayed on the information display interface of the notification message of WeChat is not limited to the manner mentioned above in this embodiment of this application. For example, the sequence of the detailed content displayed on the information display interface of the notification message of WeChat may alternatively be as follows: When the user operates the notification message of WeChat on the notebook computer for the first time, the content shown in FIG. 7B(c) may be directly displayed on the information display interface of the notification message of WeChat, and the process in FIG. 7B(b) does not need to be performed. When the user taps the notification message of WeChat for the second time, the information display interface of the notification message of WeChat may be retracted from FIG. 7B(c) to FIG. 7B(a) or FIG. 7B(b). Alternatively, when the user taps the notification message of WeChat for the second time, the information display interface of the notification message may be retracted from FIG. 7B(c) to FIG. 7B(b). When the user taps the notification message of WeChat for the third time, the information display interface of the notification message may be retracted from FIG. 7B(b) to FIG. 7B(a). In addition, the detailed content displayed on the information display interface of the notification message of WeChat is not limited to the content mentioned above in this embodiment of this application. In other words, based on a sequence of operations performed by the user on the notification message, the content displayed on the information display page of the notification message may alternatively be displayed in a reverse order (where the detailed content on the information display page is hierarchically displayed in descending order).

In addition, the user may further perform one, two, or more operations on WeChat shown in FIG. 7A-1 to FIG. 7D(b) one by one, to hierarchically display more content of WeChat. In this embodiment of this application, a quantity of operations performed on the notification message of WeChat and content displayed on the information display page of the notification message of WeChat of each layer are not limited herein. It should be noted that, in this embodiment of this application, a manner of displaying the notification message on the computer and a manner of expanding the notification message on the mobile phone in the foregoing scenario may be mutually referenced. This is not limited in this embodiment of this application.

According to the interaction method disclosed in the scenario 3, when the user views the detailed content in the notification message or performs an operation on the detailed content in the notification message, jumping between the operation interface currently browsed by the user and an app corresponding to the notification message is avoided, and CPU resource occupation of the notebook computer due to an application jumping process is avoided, thereby improving user experience.

In addition, data of a same application may be synchronized between the mobile phone and the computer, and the user may view a notification message of the application in a plurality of ways by using the mobile phone and the computer, thereby further improving user experience.

Figure 8:
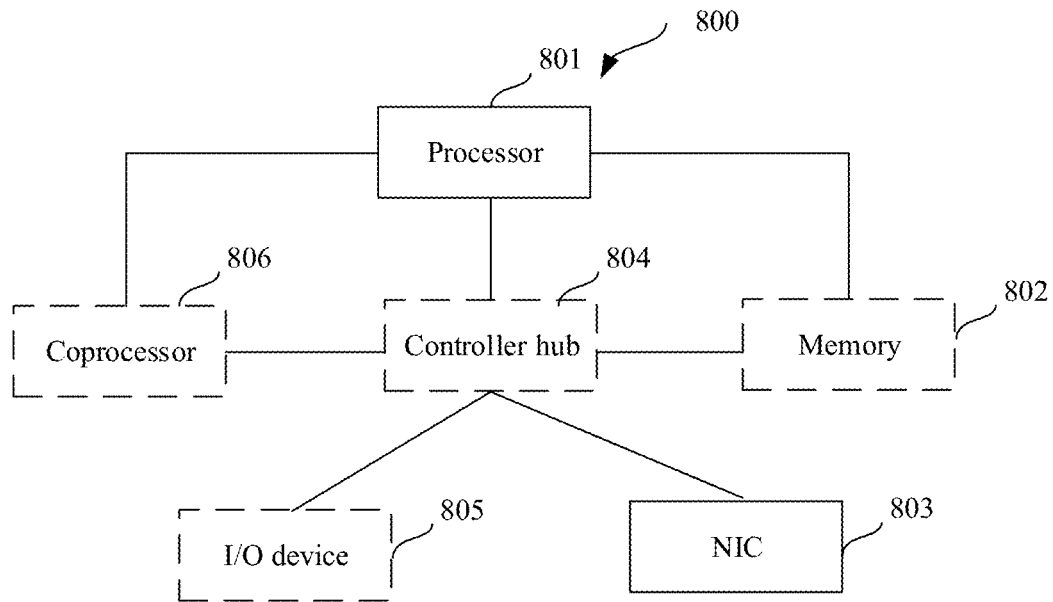
FIG. 8 is a schematic diagram of a structure of an electronic device according to an embodiment of this application.

In some embodiments of this application, an electronic device is further provided. The following describes the electronic device in embodiments of this application with reference to FIG. 8. FIG. 8 is a schematic diagram of a structure of an electronic device disclosed in an embodiment of this application.

In at least one embodiment, a controller hub 804 communicates with a processor 801 through a multi-branch bus such as a front side bus (FSB), a point-to-point interface such as a quick path interconnect (QPI), or a similar connection. The processor 801 executes instructions for controlling a general type of data processing operation. In an embodiment, the controller hub 804 includes but is not limited to a graphics memory controller hub (GMCH) (not shown in the figure) and an input/output hub (IOH) (which may be on separate chips) (not shown in the figure). The GMCH includes a memory and a graphics controller, and is coupled to the IOH.

The electronic device 800 may further include a coprocessor 806 and a memory 802 that are coupled to the controller hub 804. Alternatively, at least one of the memory 802 and the GMCH may be integrated into the processor 801 (as described in this application), and the memory 802 and the coprocessor 806 are directly coupled to the processor 801 and the controller hub 804. The controller hub 804 and the IOH are located in a single chip.

In an embodiment, the memory 802 may be, for example, a dynamic random access memory (DRAM), a phase change memory (PCM), or a combination thereof. The memory 802 may include one or more tangible and non-transitory computer-readable media for storing data and/or instructions. The computer-readable storage medium stores instructions, and specifically, stores temporary and permanent copies of the instructions.

In an embodiment, the coprocessor 806 is a dedicated processor such as a high-throughput MIC processor, a network or communications processor, a compression engine, a graphics processor, a GPGPU, or an embedded processor. An optional property of the coprocessor 806 is shown by a dashed line in FIG. 8.

In an embodiment, the electronic device 800 may further include a network interface (NIC) 803. The network interface 803 may include a transceiver, configured to provide a radio interface for the device 800 to communicate with any other proper device (such as a front-end module or an antenna). In various embodiments, the network interface 803 may be integrated with another component of the electronic device 800. The network interface 803 can implement a function of the communications unit in the foregoing embodiment.

In an embodiment, as shown in FIG. 8, the electronic device 800 may further include an input/output (I/O) device 805. The input/output (I/O) device 805 may include: a user interface, where this design enables a user to interact with the electronic device 800; a peripheral component interface, where this design enables the peripheral component can also interact with the electronic device 800; and/or a sensor, where this design is configured to determine an environmental condition and/or location information related to electronic device 800.

It should be noted that FIG. 8 is merely an example. To be specific, although FIG. 8 shows that the electronic device 800 includes a plurality of components such as the processor 801, the controller hub 804, and the memory 802, in actual application, a device using the methods in this application may include only some of the components of the electronic device 800. For example, the device includes only the processor 801 and the NIC 803. In FIG. 8, properties of the optional components are shown by using dashed lines.

In some embodiments of this application, that the computer-readable storage medium of the electronic device 800 stores the instructions may include: When the instructions are executed by at least one unit in the processor, the instructions used for information interaction of the electronic device mentioned in the scenario 1, the scenario 2, and the scenario 3 are executed. When the instructions are run on a computer, the computer is enabled to perform the information interaction methods for the electronic devices mentioned in the scenario 1, the scenario 2, and the scenario 3.

Figure 9:
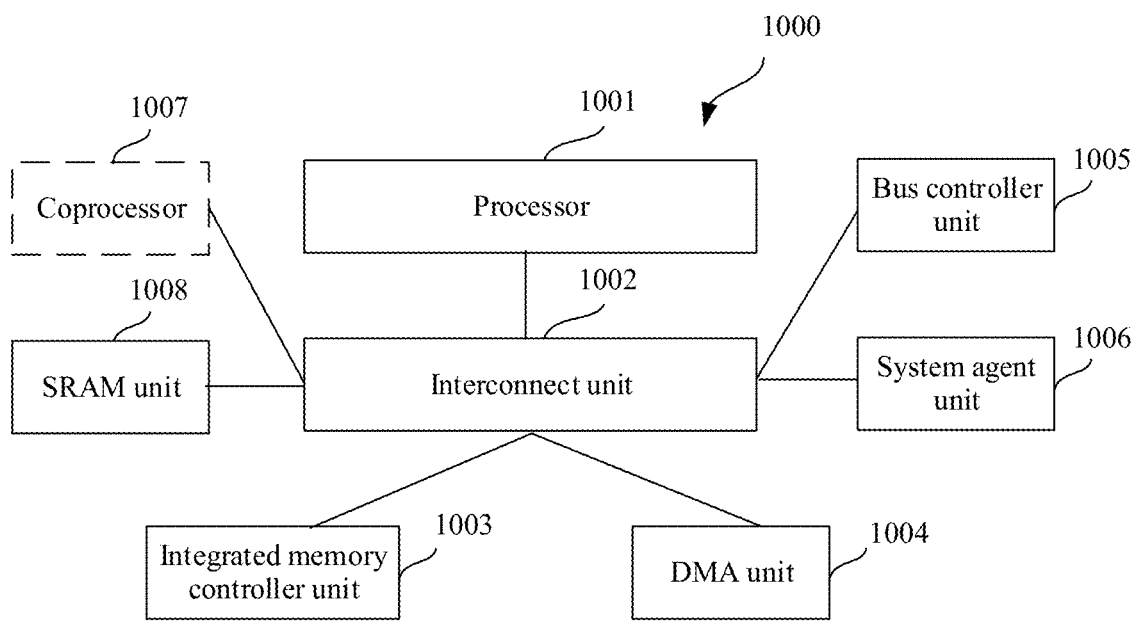
FIG. 9 is a schematic diagram of a structure of an SOC according to an embodiment of this application.

FIG. 9 is a schematic diagram of a structure of an SOC according to an embodiment of this application, and is a block diagram of an SoC (System on Chip, system on chip) 1000 according to an embodiment of this application. In FIG. 9, similar parts have a same reference numeral. In addition, a dashed box is an optional feature of a more advanced SoC. The SoC may be applied to an electronic device according to an embodiment of this application, and can implement corresponding functions according to instructions stored in the SoC.

In FIG. 9, the SoC 1000 includes an interconnect unit 1002 coupled to a processor 1001; a system agent unit 1006; a bus controller unit 1005; an integrated memory controller unit 1003; one group of or one or more coprocessors 1007 that may include integrated graphics logic, an image processor, an audio processor, and a video processor; a static random access memory (SRAM) unit 1008; and a direct memory access (DMA) unit 1004. In an embodiment, the coprocessor 1007 includes a dedicated processor, for example, a network or communications processor, a compression engine, a GPGPU, a high throughput MIC processor, or an embedded processor.

The static random access memory (SRAM) unit 1008 may include one or more computer-readable media for storing data and/or instructions. The computer-readable storage medium may store instructions, and specifically, store temporary and permanent copies of the instructions.

When the SoC 1000 is applied to the electronic device according to this application, the instructions stored in the computer-readable storage medium may include instructions that enable, when being executed by at least one unit of the processor, the electronic device to implement the instructions used for information interaction of the electronic device mentioned in the scenario 1, the scenario 2, and the scenario 3. When the instructions are run on a computer, the computer is enabled to perform the instructions for information interaction of the electronic devices mentioned in the scenario 1, the scenario 2, and the scenario 3.

In addition, an embodiment of this application further discloses a computer-readable storage medium. The computer-readable storage medium stores a processing program. When the processing program is executed by a processor, instructions used for information interaction of an electronic device mentioned in the scenario 1, the scenario 2, and the scenario 3 are implemented.

The computer-readable storage medium may be a read-only memory, a random access memory, a hard disk, an optical disc, or the like.

What is claimed is:

1. An interaction method for an electronic device, wherein the interaction method comprises:
   recognizing, by the electronic device, a first touch operation on a first display object of a first application displayed on a display of the electronic device,
      wherein the first display object is displayed over a portion of a user interface of a second application displayed on the display of the electronic device,
      wherein the display of the first display object does not interfere with a user of the electronic device interacting with the second application by way of the user interface, and
      wherein the first display object includes a notification message for notifying the user of available information sourcing from the first application;
   in response to the first touch operation, displaying, by the electronic device, a second display object of the first application that includes initial content sourcing from the first application while continuing to display the user interface of the second application that is responsive to user interaction;
   recognizing, by the electronic device, a second touch operation on the second display object; and
   in response to the second touch operation, displaying, by the electronic device, a third display object that includes additional content related to the initial content while continuing to display the user interface of the second application that is responsive to user interaction;
   wherein the third display object includes recommendation information related to the initial content;
   wherein the recommendation information is obtained based on semantic analysis on the initial content performed by the electronic device, and is displayed within the notification message.

2. The interaction method according to claim 1, wherein touch operation amplitudes of the first touch operation and the second touch operation are different in a touch manner.

3. The interaction method according to claim 2, wherein,
   based on an amplitude of the first touch operation being less than a first threshold, presenting, by the electronic device, the initial content sourcing from the first application;
   based on the amplitude of the second touch operation being greater than the first threshold but less than a second threshold, presenting, by the electronic device, the additional content sourcing from the first application.

4. The interaction method according to claim 3, wherein,
   based on the amplitude of the second touch operation being greater than the second threshold, presenting, by the electronic device, still further content sourcing from the first application.

5. The interaction method according to claim 2, wherein the amplitudes of the first touch operation and the second touch operation are press strength.

6. The interaction method according to claim 4, wherein the additional content includes the initial content, and the still further content comprises the initial and additional content.

7. The interaction method according to claim 2, wherein the first and second touch operations generate electrical signals having amplitudes,
   wherein the amplitudes of the first touch operation and the second touch operation are tap times, and wherein a tap time associated with the first touch operation is different a tap time associated with the second touch operation.

8. The interaction method according to claim 2, wherein the first and second touch operations generate electrical signals having amplitudes,
   wherein the amplitudes of the first touch operation and the second touch operation are touch duration, and wherein a touch duration associated with the first touch operation is different from a touch duration associated with the second touch operation.

9. The interaction method according to claim 1, wherein at least one of the first, second and third display objects comprises an operation control for an associated operation executed by the first application.

10. The interaction method according to claim 1, wherein based on the first display object comprising at least one of a voice, a foreign language, or a video, displaying the second display object presenting the initial content sourcing from the first application comprises:
in response to the first touch operation, presenting, by the electronic device, the at least one of the voice, the foreign language, or the video.

11. The interaction method according to claim 1, further comprising aggregating, by the electronic device, notification messages from the first application.

12. The interaction method according to claim 1, further comprising:
synchronizing, by the electronic device, the first display object to another electronic device; and
recognizing, by the another electronic device, a touch operation on the first display object, and presenting the initial content.

13. An electronic device comprising: at least one processor and at least one memory, wherein;
the at least one memory stores an instruction which is executed by the at least one processor to cause the electronic device to perform operations including:
recognizing a first touch operation on a first display object of a first application displayed on a display of the electronic device,
wherein the first display object is displayed over a portion of a user interface of a second application displayed on the display of the electronic device,
wherein the display of the first display object does not interfere with a user of the electronic device interacting with the second application by way of the user interface, and
wherein the first display object includes a notification message for notifying the user of available information sourcing from the first application;
displaying, in response to the first touch operation, a second display object of the first application that includes initial content sourcing from the first application while continuing to display the user interface of the second application that is responsive to user interaction;
recognizing a second touch operation on the second display object; and
in response to the second touch operation, displaying a third display object that includes additional content related to the initial content while continuing to display the user interface of the second application that is responsive to user interaction;
wherein the third display object includes recommendation information related to the initial content;
wherein the recommendation information is obtained based on semantic analysis on the initial content performed by the electronic device, and is displayed within the notification message.

14. The electronic device according to claim 13, wherein touch operation amplitudes of the first touch operation and the second touch operation in a touch manner are different in a touch manner.

15. The electronic device according to claim 14, wherein the operations further include:
presenting the initial content sourcing from the first application based on the amplitude of the first touch operation being less than a first threshold, and
based on the amplitude of the second touch operation being greater than a first threshold but less than a second threshold, presenting the additional content sourcing from the first application.

16. The electronic device according to claim 15, wherein the operations further include:
based on the amplitude of the second touch operation being greater than the second threshold, presenting, still further content sourcing from the first application.

17. The electronic device according to claim 13, wherein the first display object comprises at least one of voice, a foreign language, or a video, and the operations further include:
in response to the first touch operation, presenting the at least one of the voice, the foreign language, or the video.

18. The electronic device according to claim 13, wherein the operations further include aggregating and displaying notification messages from the first application.

19. The electronic device according to claim 13, wherein the operations further include:
synchronizing the first display object to another electronic device;
recognizing a touch operation on first display object; and
presenting the initial content.

20. The electronic device according to claim 13, wherein the first and second touch operations generate electrical signals having amplitudes, wherein
the amplitudes of the first touch operation and the second touch operation are determined by tap times, and a tap time associated with the first touch operation is different from a tap time associated with the second touch operation; or
the amplitudes of the first touch operation and the second touch operation are touch duration, and a touch duration associated with the first touch operation is different from a touch duration associated with the second touch operation; or
the amplitudes of the first touch operation and the second touch operation are press strength, and a press strength associated with the first touch operation is different from a press strength associated with the second touch operation.

* * * * *